(12) United States Patent
Meenakshisundaram et al.

(10) Patent No.: US 12,350,885 B2
(45) Date of Patent: Jul. 8, 2025

(54) SYSTEMS FOR POST-PROCESSING ADDITIVELY MANUFACTURED OBJECTS

(71) Applicant: Align Technology, Inc., San Jose, CA (US)

(72) Inventors: Viswanath Meenakshisundaram, Santa Clara, CA (US); Srinivas Kaza, Mountain View, CA (US); Chunhua Li, Cupertino, CA (US); Lance Robert Pickens, Campbell, CA (US); Shawn Stromenger, Milpitas, CA (US); Jun Sato, San Jose, CA (US); Siobhan O'Leary, Santa Clara, CA (US); Peter Webber, San Francisco, CA (US); Brett E. Kelly, Oakland, CA (US); Jennifer Chavez, Fremont, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 18/593,534

(22) Filed: Mar. 1, 2024

(65) Prior Publication Data

US 2024/0198595 A1 Jun. 20, 2024

Related U.S. Application Data

(63) Continuation of application No. 18/050,802, filed on Oct. 28, 2022, now Pat. No. 11,945,166.

(Continued)

(51) Int. Cl.
*B29C 64/35* (2017.01)
*A61C 7/08* (2006.01)

(Continued)

(52) U.S. Cl.
CPC ............ *B29C 64/35* (2017.08); *B08B 7/0071* (2013.01); *B08B 7/04* (2013.01); *B29C 35/0805* (2013.01); *B29C 64/30* (2017.08); *B29C 64/357* (2017.08); *B29C 64/379* (2017.08); *B29C 64/386* (2017.08); *B29C 71/04* (2013.01); *B33Y 40/20* (2020.01); *B33Y 50/00* (2014.12);

(Continued)

(58) Field of Classification Search
CPC ....... B29C 64/30; B29C 64/35; B29C 64/357; B29C 64/40; B29C 64/393; B29C 64/386; B33Y 40/20; B22F 2003/247; B22F 2003/248

See application file for complete search history.

(56) References Cited

U.S. PATENT DOCUMENTS

2017/0144371 A1* 5/2017 Lussier .................. B33Y 50/02
2019/0202112 A1* 7/2019 Gmeiner ................ B33Y 50/02

(Continued)

*Primary Examiner* — John J DeRusso
*Assistant Examiner* — Inja Song
(74) *Attorney, Agent, or Firm* — FORTEM IP LLP

(57) ABSTRACT

Systems for post-processing additively manufactured objects are disclosed herein. In some embodiments, a system includes a rotor configured to support a plurality of additively manufactured objects having excess material thereon, an actuator configured to spin the rotor so as to remove the excess material from the plurality of additively manufactured objects, and an energy source configured to apply energy to the plurality of additively manufactured objects to selectively alter a material property of a portion of each of the plurality of additively manufactured objects.

27 Claims, 34 Drawing Sheets

Related U.S. Application Data

(60) Provisional application No. 63/263,212, filed on Oct. 28, 2021.

(51) Int. Cl.
| | | |
|---|---|---|
| *B08B 7/00* | (2006.01) | |
| *B08B 7/04* | (2006.01) | |
| *B29C 35/08* | (2006.01) | |
| *B29C 64/124* | (2017.01) | |
| *B29C 64/30* | (2017.01) | |
| *B29C 64/357* | (2017.01) | |
| *B29C 64/379* | (2017.01) | |
| *B29C 64/386* | (2017.01) | |
| *B29C 71/04* | (2006.01) | |
| *B33Y 40/20* | (2020.01) | |
| *B33Y 50/00* | (2015.01) | |
| *B33Y 80/00* | (2015.01) | |
| *B29L 31/00* | (2006.01) | |

(52) U.S. Cl.
CPC ............... *B33Y 80/00* (2014.12); *A61C 7/08* (2013.01); *B29C 64/124* (2017.08); *B29L 2031/753* (2013.01)

(56) References Cited

U.S. PATENT DOCUMENTS

| | | | |
|---|---|---|---|
| 2020/0001541 A1* | 1/2020 | Eiriksson | B33Y 10/00 |
| 2020/0078831 A1* | 3/2020 | Converse | B29C 64/20 |
| 2020/0130266 A1* | 4/2020 | DeSimone | B29C 64/379 |
| 2020/0198242 A1* | 6/2020 | John | B29C 64/35 |
| 2021/0086450 A1* | 3/2021 | Murillo | B29C 64/35 |
| 2022/0040915 A1* | 2/2022 | Rao | B33Y 10/00 |
| 2022/0048248 A1* | 2/2022 | Yu | B22F 12/22 |
| 2022/0234296 A1* | 7/2022 | Feller | B29C 71/009 |
| 2022/0250991 A1* | 8/2022 | Barbati | C04B 35/6346 |
| 2023/0067017 A1 | 3/2023 | Salfity et al. | |
| 2023/0080581 A1* | 3/2023 | Wynne | B29C 64/393 264/51 |

* cited by examiner

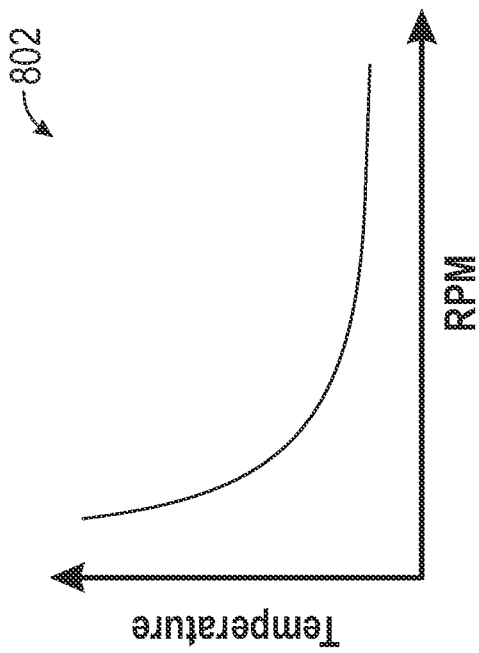
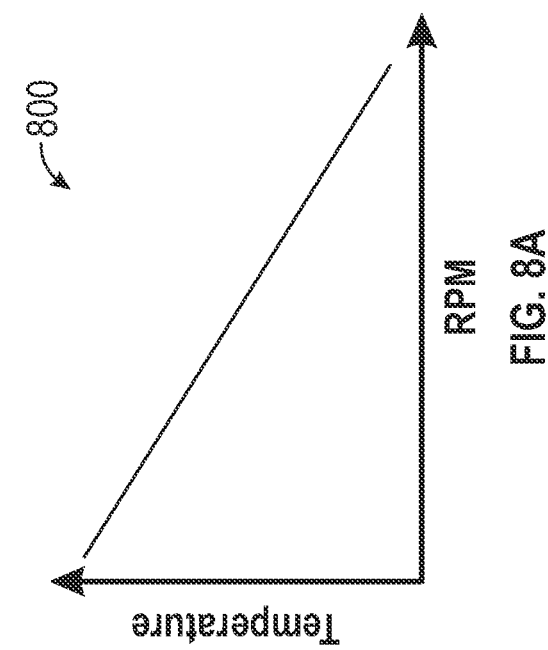
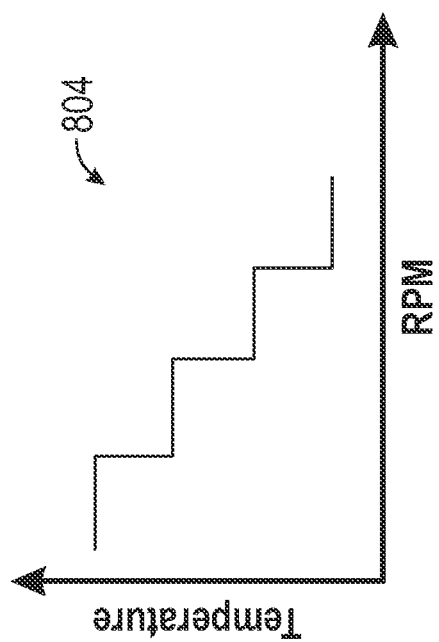
FIG. 8A
FIG. 8B
FIG. 8C

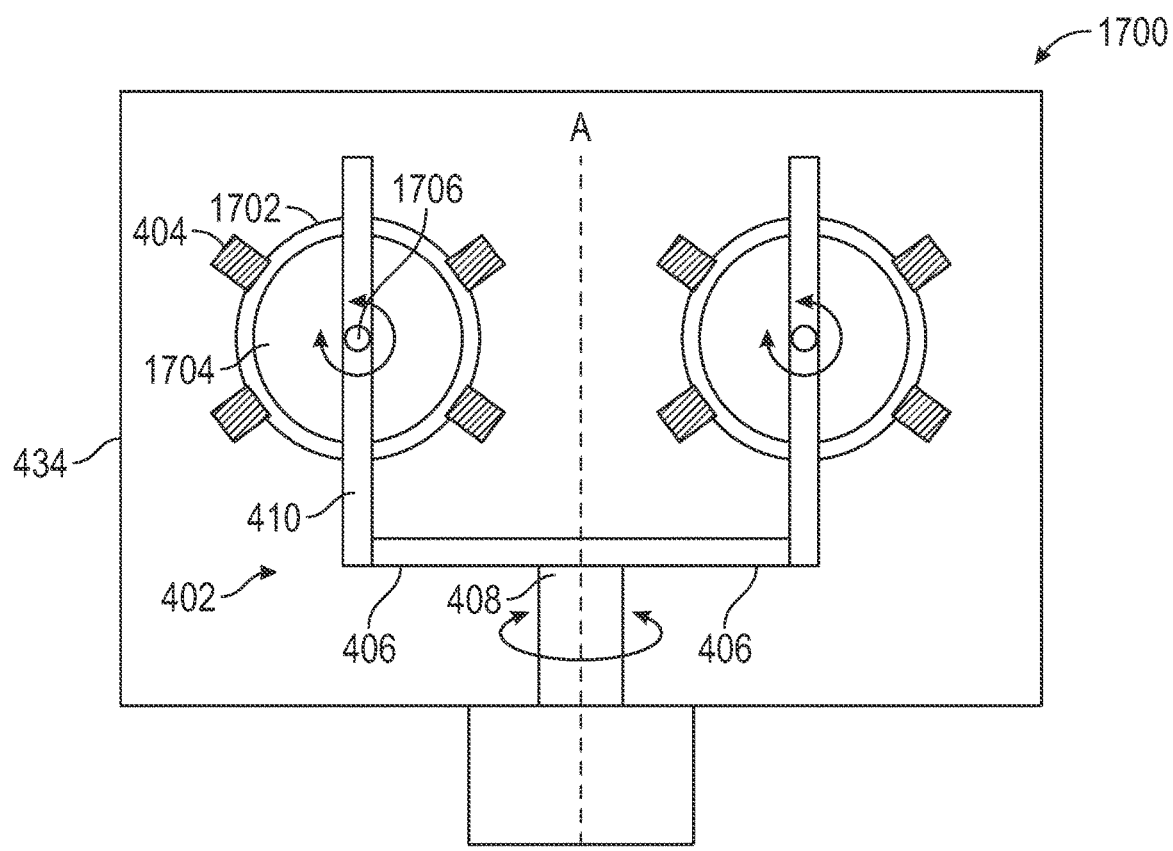
FIG. 17A
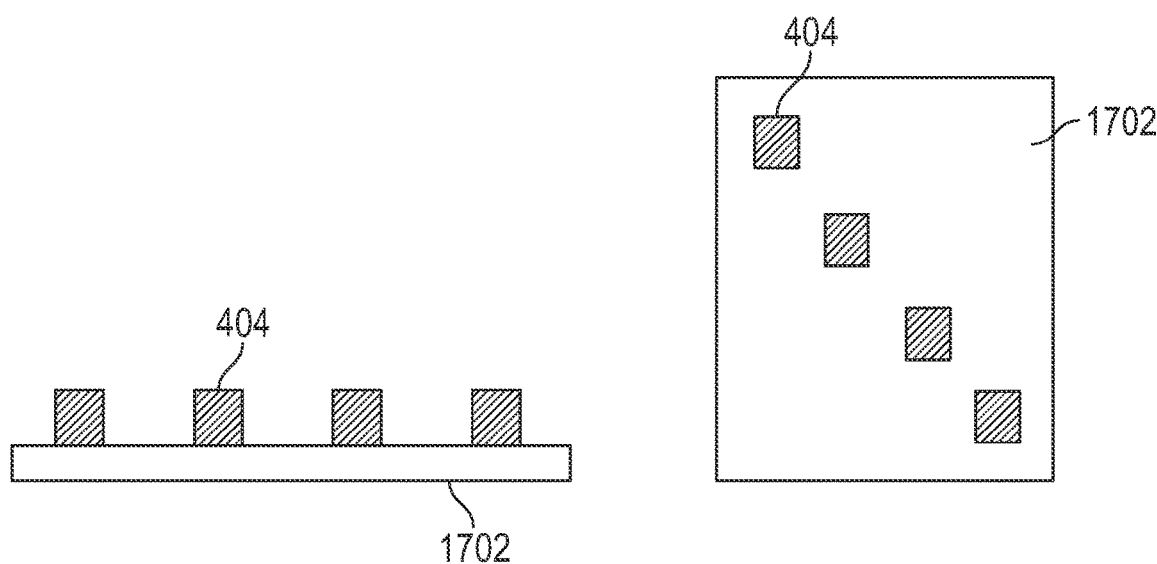
FIG. 17B
FIG. 17C

SYSTEMS FOR POST-PROCESSING ADDITIVELY MANUFACTURED OBJECTS

CROSS-REFERENCE TO RELATED APPLICATIONS

The present application is a continuation of U.S. patent application Ser. No. 18/050,802, filed Oct. 28, 2022, now U.S. Pat. No. 11,945,166, issued Apr. 2, 2024, which claims the benefit of priority to U.S. Provisional Application No. 63/263,212, filed Oct. 28, 2021, each of which is incorporated by reference herein in its entirety.

TECHNICAL FIELD

The present technology generally relates to manufacturing processes, and in particular, to systems and methods for post-processing additively manufactured objects.

BACKGROUND

Additive manufacturing encompasses a variety of technologies that involve building up 3D objects from multiple layers of material. The materials used in additive manufacturing may adhere to the surface of the additively manufactured object, e.g., due to the properties of the materials and/or the geometry of the object. Thus, any excess or unwanted material may need to be removed from the additively manufactured object before the object is ready for further processing and use. However, conventional techniques for removing such material from additively manufactured objects may not be sufficient for highly viscous resins used in certain types of additive manufacturing processes. Conventional techniques may also be poorly suited for cleaning objects with complex geometries or delicate parts. Moreover, conventional techniques may not be scalable for handling large amounts of additively manufactured objects and/or may lack integration with other post-processing steps.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

FIGS. 8A-8C illustrate representative examples of dynamic temperature profiles that can be implemented by a temperature management mechanism, in accordance with embodiments of the present technology

FIG. 17A is a partially schematic front view of another system for applying variable forces to additively manufactured objects during post-processing, in accordance with embodiments of the present technology.

FIG. 17B is a partially schematic side view of a flexible substrate of the system of FIG. 17A.

FIG. 17C is a partially schematic top view of the flexible substrate of FIG. 17B.

DETAILED DESCRIPTION

Figure 1:
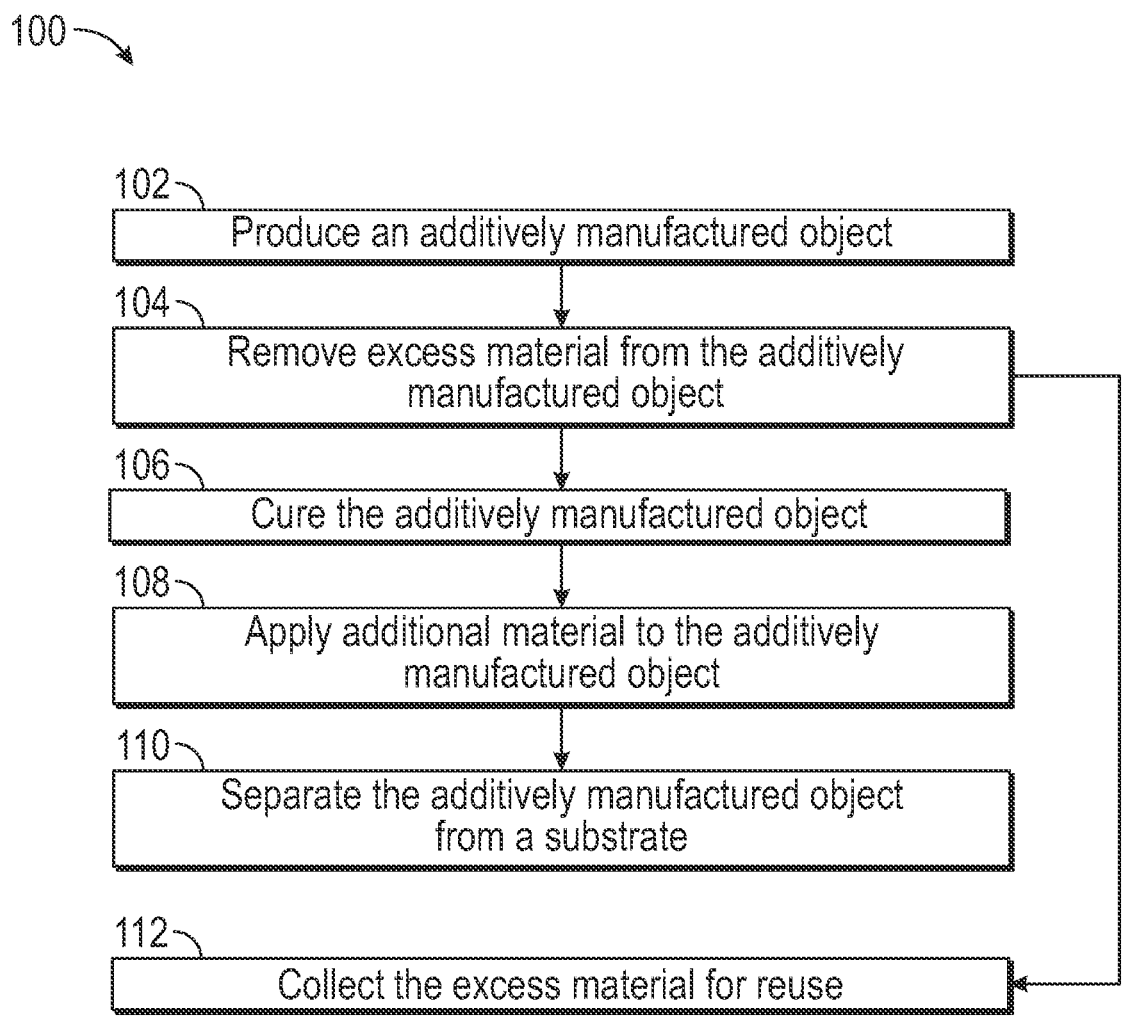
FIG. 1 is a flow diagram providing a general overview of a method for fabricating and post-processing an additively manufactured object, in accordance with embodiments of the present technology.

The present technology relates to systems, methods, and devices for post-processing additively manufactured objects. In some embodiments, for example, a system for post-processing additively manufactured objects includes a rotor configured to support a plurality of additively manufactured objects having excess material thereon, and an actuator configured to spin the rotor so as to remove the excess material from the plurality of additively manufactured objects. The system can further include additional functional components to facilitate removal of the excess material from the additively manufactured objects. For example, the system can include a temperature management mechanism configured to produce a dynamic temperature profile that decreases a viscosity of the excess material and/or increases a stiffness of the plurality of additively manufactured objects. As another example, the system can include an energy source configured to apply energy to the plurality of additively manufactured objects to selectively alter a material property of at least a portion of each additively manufactured object. In a further example, the system can include one or more sensors configured to generate sensor data indicative of a cleaning status of the plurality of additively manufactured objects, and a controller configured to adjust an operational parameter of the system based on the sensor data.

The embodiments described herein can provide improved cleaning of additively manufactured objects, particularly objects having complex geometries and/or that are fabricated using highly viscous materials that may otherwise be difficult to clean using conventional techniques. Additionally, the present technology allows multiple post-processing operations (e.g., cleaning, curing, applying additional materials, separation) to be integrated into a single system, which can improve the efficiency and scalability of additive manufacturing and post-processing.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

As used herein, the terms "vertical," "lateral," "upper," and "lower" can refer to relative directions or positions of features of the embodiments disclosed herein in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, and left/right can be interchanged depending on the orientation.

The headings provided herein are for convenience only and do not interpret the scope or meaning of the claimed present technology. Embodiments under any one heading may be used in conjunction with embodiments under any other heading.

I. Overview of Additive Manufacturing and Post-Processing Technology

FIG. 1 is a flow diagram providing a general overview of a method 100 for fabricating and post-processing an additively manufactured object, in accordance with embodiments of the present technology. The method 100 can be used to produce many different types of additively manufactured objects, such as orthodontic appliances (e.g., aligners, palatal expanders, attachments, attachment templates, retainers), restorative objects (e.g., crowns, veneers, implants), and/or other dental appliances (e.g., oral sleep apnea appliances, mouth guards). Additional examples of orthodontic appliances and associated methods that are applicable to the present technology are described in Section III below.

The method 100 begins at block 102 with producing an additively manufactured object. The additively manufactured object can be produced using any suitable additive manufacturing technique known to those of skill in the art. Additive manufacturing (also referred to herein as "3D printing") includes a variety of technologies which fabricate 3D objects directly from digital models through an additive process. In some embodiments, additive manufacturing includes depositing a precursor material (e.g., a photopolymerizable resin) onto a build platform. The precursor material can be cured, polymerized, melted, sintered, fused, and/or otherwise solidified to form a portion of the object and/or combine the portion with previously formed portions of the object. In some embodiments, the additive manufacturing techniques provided herein build up the object geometry in a layer-by-layer fashion, with successive layers being formed in discrete build steps. Alternatively or in combination, the additive manufacturing techniques described herein can allow for continuous build-up of an object geometry.

Examples of additive manufacturing techniques suitable for use with the methods described herein include, but are not limited to, the following: (1) vat photopolymerization, in which an object is constructed from a vat of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer-by-layer, and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding.

For example, the additively manufactured object can be fabricated using a vat photopolymerization process in which light is used to selectively cure a vat or reservoir of a curable material (e.g., a polymeric resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the vat, light source, and build platform.

As another example, the additively manufactured object can be fabricated using high temperature lithography (also known as "hot lithography"). High temperature lithography can include any photopolymerization process that involves heating a photopolymerizable material (e.g., a polymeric resin). For example, high temperature lithography can involve heating the material to a temperature of at least 30° C., 40° C., 50° C., 60° C., 70° C., 80° C., 90° C., 100° C., 110° C., or 120° C. In some embodiments, the material is heated to a temperature within a range from 50° ° C. to 120° C., from 90° C. to 120° C., from 100° C. to 120° C., from 105° C. to 115° C., or from 108° C. or 110° ° C. The heating can lower the viscosity of the photopolymerizable material before and/or during curing. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In a further example, the additively manufactured object can be fabricated using a selective laser sintering process involving using a laser beam to selectively melt and fuse a layer of powdered material according to a desired cross-sectional shape in order to build up the object geometry. As another example, the additively manufactured object can be fabricated using a fused deposition modeling process involving melting and selectively depositing a thin filament of thermoplastic polymer in a layer-by-layer manner in order to form an object. In yet another example, the additively manufactured object can be fabricated using a material jetting process involving jetting or extruding one or more materials onto a build surface in order to form successive layers of the object geometry.

In some embodiments, the additively manufactured object is fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Representative examples of continuous liquid interphase production processes that may be incorporated in the methods herein are described in U.S. Patent Publication Nos. 2015/0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety. In yet another example, a continuous additive manufacturing method can utilize a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

In a further example, the additively manufactured object can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting overlapping light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Publication No. 2021/0146619, U.S. Patent Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

The additively manufactured object can be made of any suitable material or combination of materials. As discussed above, in some embodiments, the additively manufactured object is made partially or entirely out of a polymeric material, such as a curable polymeric resin. The resin can be composed of one or more monomer components that are initially in a liquid state. The resin can be in the liquid at room temperature (e.g., 20° C. or at an elevated temperature (e.g., a temperature within a range from 50° C. to 120° C.). When exposed to energy (e.g., light), the monomer components can undergo a polymerization reaction such that the resin solidifies into the desired object geometry. Representative examples of curable polymeric resins and other materials suitable for use with the additive manufacturing techniques herein are described in International Publication Nos. WO 2019/006409, WO 2020/070639, and WO 2021/087061, the disclosures of each of which are incorporated herein by reference in their entirety.

Optionally, the additively manufactured object can be fabricated from a plurality of different materials (e.g., at least two, three, four, five, or more different materials). The materials can differ from each other with respect to composition, curing conditions (e.g., curing energy wavelength), material properties before curing (e.g., viscosity), material properties after cured (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources in order to fabricate an object from a plurality of different materials. Examples of such methods are described in U.S. Pat. Nos. 6,749,414 and 11,318,667, the disclosures of which are incorporated herein by reference in their entirety. Alternatively or in combination, the additively manufactured object can be formed from multiple materials in a plurality of sequential manufacturing steps. For instance, a first portion of the object can be formed from a first material in accordance with any of the methods herein, then a second portion of the object can be formed from a second material in accordance with methods herein, and so on, until the entirety of the object has been formed.

After the additively manufactured object is fabricated, the object can undergo one or more additional process steps, also referred to herein as "post-processing." As described in detail below with respect to blocks 104-112, post-processing can include removing excess material from the object, applying additional material(s) to the object, performing additional curing, separating the object from any supports or other structures that are not intended to be present in the final product, and/or collecting the removed excess material for reuse.

For example, at block 104, the method 100 continues with removing excess material from the additively manufactured object. The excess material can include uncured material (e.g., unpolymerized liquid resin) and/or other unwanted material (e.g., debris) that remains on the additively manufactured object after fabrication. For example, certain materials used in additive manufacturing (e.g., highly viscous polymeric resins used in high temperature lithography) may adhere to the surface of the additively manufactured object. Additionally, excess material may accumulate on or within certain object features, such as cavities, crevices, indentations, apertures, etc. Accordingly, the additively manufactured object may need to be cleaned before further processing and use.

The excess material can be removed in many different ways. In some embodiments, for example, the excess material is removed by rotating the additively manufactured object to centrifugally separate the excess material from the surfaces of the object. The rotation can be performed using a suitable device or system (e.g., a centrifuge) including components for supporting and applying rotational force to the additively manufactured object. Examples of systems, devices, and methods suitable for removing excess material from an additively manufactured object by rotation are described in detail below with respect to FIGS. 4A-26. Alternatively or in combination, the excess material can be removed by spraying or otherwise applying fluids (e.g., water, solvents) to the object, partially or fully immersing the object in a fluid, blowing a gas (e.g., air) on the object, applying a vacuum to the object, applying other types of mechanical forces to the object (e.g., vibration, agitation, tumbling, brushing), and/or other cleaning techniques known to those of skill in the art.

At block 106, the method 100 can optionally including curing the additively manufactured object. This additional curing step (also known as "post-curing") can be used in situations where the additively manufactured object is still in a partially cured "green" state after fabrication. For example, the curing energy used to fabricate the additively manufactured object in block 102 may only partially polymerize the resin forming the object. Accordingly, the post-curing step may be needed to fully cure (e.g., fully polymerize) the additively manufactured object to its final, usable state. Post-curing can provide various benefits, such as improving the mechanical properties (e.g., stiffness, strength) and/or temperature stability of the additively manufactured object. Post-curing can be performed by heating the object, applying radiation (e.g., ultraviolet (UV), visible, microwave) to the object, or suitable combinations thereof. Post-curing can be performed by a specialized device (e.g., an oven or curing station) or can be performed by the same device used to rotate the additively manufactured object in block 104. In other embodiments, however, the post-curing process of block 106 is optional and can be omitted.

At block 108, the method 100 can optionally include applying an additional material to the additively manufactured object. For example, the additional material can be a coating, such as a polymeric coating. The coating can be applied to one or more surfaces of the object for various purposes, including, but not limited to: providing a smooth surface finish, which can be beneficial for aesthetics and/or to improve user comfort if the object is intended to be in contact with the user's body (e.g., an orthodontic appliance worn on the teeth); coloring and/or applying other aesthetic features to the object; improving scratch resistance and/or other mechanical properties; providing antimicrobial properties; and incorporating therapeutic agents into the object for controlled release.

At block 110, the method 100 can include separating the additively manufactured object from a substrate. In some embodiments, the substrate is a build platform which mechanically supports the object during fabrication and the post-processing steps described herein. The additively manufactured object can be connected to the substrate via a sacrificial region of cured material. Accordingly, the additively manufactured object can be detached from the substrate by applying pressure to fracture the sacrificial region. Once separated, the additively manufactured object can then be prepared for packaging, shipment, and use.

At block 112, the method 100 can optionally include collecting the excess material removed from the additively manufactured object in block 104. The excess material can include uncured material that is still suitable for reuse in subsequent additive manufacturing processes (e.g., the fabrication process of block 102). Accordingly, block 112 can include collecting the excess material (e.g., via containers, absorbent elements, piping, etc.) and, optionally, separating reusable excess material from other unwanted components that may be present (e.g., water, solvents, debris) via filtration, distillation, centrifugation, and/or other suitable techniques.

The method 100 can be modified in many different ways. For example, although the above steps of the method 100 are described with respect to a single additively manufactured object, the method 100 can be used to concurrently fabricate and post-process any suitable number of additively manufactured objects, such as tens, hundreds, or thousands of additively manufactured objects. As another example, the ordering of the steps shown in FIG. 1 can be varied, e.g., the material application process of block 108 can be performed before the curing process of block 106. Some of the steps of the method 100 can be omitted, such as any of blocks 106, 108, and/or 112. The method 100 can also include additional steps not shown in FIG. 1.

Figure 2:
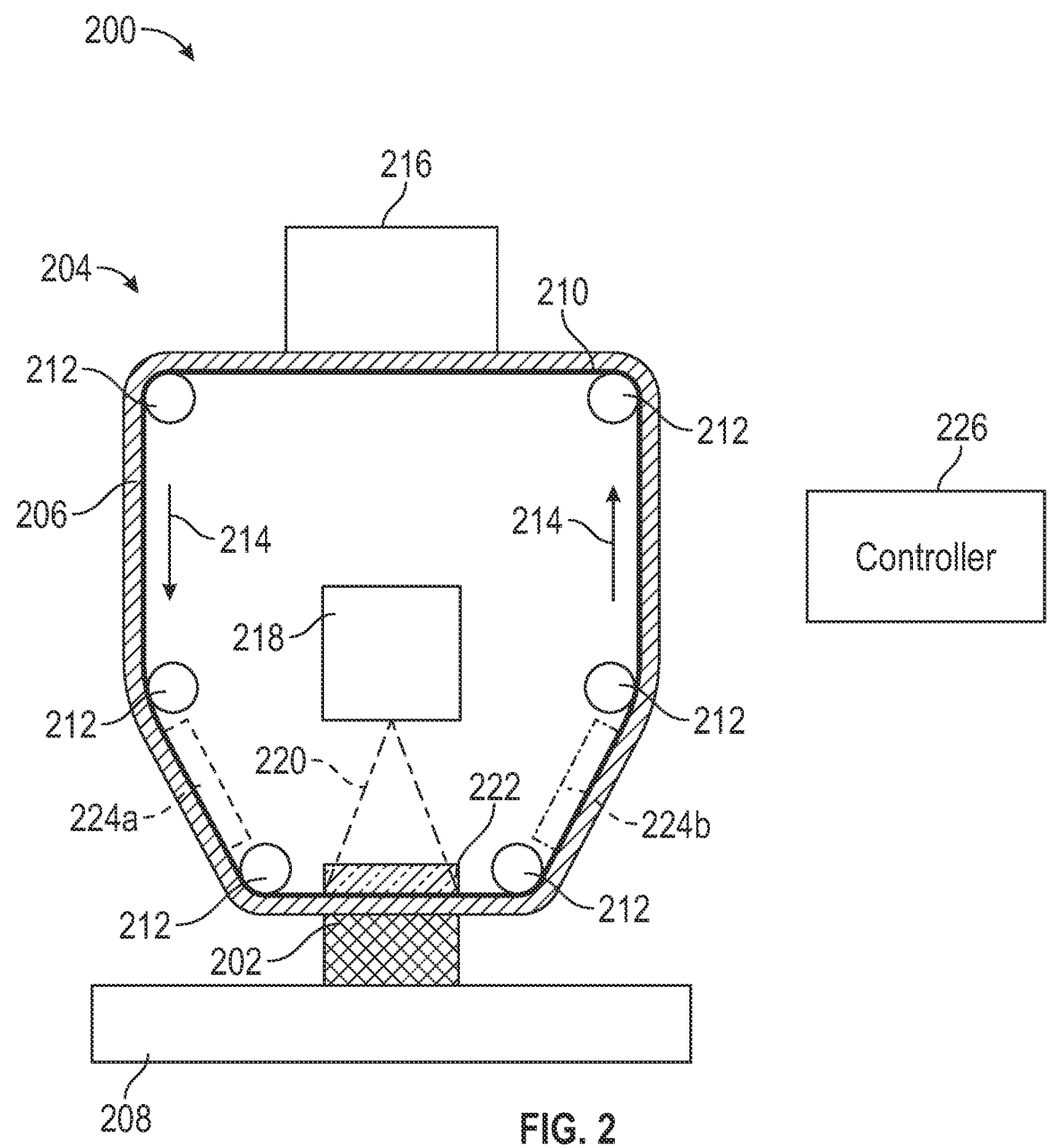
FIG. 2 is a partially schematic illustration of an additive manufacturing device configured in accordance with embodiments of the present technology.

FIG. 2 illustrates a representative example of an additive manufacturing device 200 ("device 200") configured in accordance with embodiments of the present technology. The device 200 can be used to fabricate any embodiment of the additively manufactured objects described herein. For example, the device 200 can be used to produce an additively manufactured object in accordance with block 102 of the method 100 of FIG. 1.

As shown in FIG. 2, the device 200 is used to fabricate an additively manufactured object 202 ("object 202"). The device 200 includes a printer assembly 204 configured to deposit resin 206 on a build platform 208 (e.g., a tray, plate, film, sheet, or other planar substrate) to form the object 202. The printer assembly 204 includes a carrier film 210 configured to deliver the resin 206 to the build platform 208. The carrier film 210 can be a flexible loop of material having an outer surface and an inner surface. The outer surface of the carrier film 210 can adhere to and carry a thin layer of the resin 206. The inner surface of the carrier film 210 can contact one or more rollers 212 that rotate so as to move the carrier film 210 in a continuous loop trajectory, e.g., as indicated by arrows 214.

The printer assembly 204 can also include a resin source 216 (shown schematically) configured to apply the resin 206 to the carrier film 210. In the illustrated embodiment, the resin source 216 is located at the upper portion of the printer assembly 204 near an upper horizontal segment of the carrier film 210. In other embodiments, however, the resin source 216 can be positioned at a different location in the printer assembly 204. The resin source 216 can include nozzles, ports, reservoirs, etc., that deposit the resin 206 onto the outer surface of the carrier film 210. The resin source 216 can also include one or more blades (e.g., doctor blades, recoater blades) that smooth the deposited resin 206 into a relatively thin, uniform layer. In some embodiments, the resin 206 is formed into a layer having a thickness within a range from 200 microns to 300 microns.

The resin 206 can be carried by the carrier film 210 toward the build platform 208. In the illustrated embodiment, the build platform 208 is located below the printer assembly 204 near a lower horizontal segment of the carrier film 210. In other embodiments, however, the build platform 208 can be positioned at a different location relative to the printer assembly 204. The printer assembly 204 includes a light source 218 (e.g., a projector or light engine) that outputs light 220 (e.g., UV light) having a wavelength configured to partially or fully cure the resin 206. The carrier film 210 can be optically transparent so that the light 220 from the light source 218 passes through the carrier film 210 and onto the portion of the resin 206 above the build platform 208, thus forming a layer of cured resin 206 onto the build platform 208 and/or a previously formed portion of the object 202. The light 220 can be patterned or scanned in a suitable pattern corresponding to the desired cross-section geometry for the object 202. Optionally, a transparent plate 222 can be disposed between the light source 218 and the carrier film 210 to guide the carrier film 210 into a specific position (e.g., height) relative to the build platform 208.

Once the object cross-section has been formed, the build platform 208 can be lowered by a predetermined amount to separate the cured resin from the carrier film 210. The remaining, uncured resin 206 can be carried by the carrier film 210 away from the build platform 208 and back toward the resin source 216. The resin source 216 can deposit additional resin 206 onto the carrier film 210 and/or smooth the resin 206 to re-form a uniform layer of resin 206 on the carrier film 210. The resin 206 can then be recirculated back to the build platform 208 to fabricate an additional layer of the object 202. This process can be repeated to iteratively build up individual object layers on the build platform 208 until the object 202 is complete. The object 202 and build platform 208 can then be removed from the device 200 for post-processing.

In some embodiments, the device 200 is used in a high temperature lithography process utilizing a highly viscous resin. Accordingly, the printer assembly 204 can include one or more heat sources (heating plates, infrared lamps, etc.) for heating the resin 206 to lower the viscosity to a range suitable for additive manufacturing. For example, the printer assembly 204 can include a first heat source 224a positioned against the segment of the carrier film 210 before the build platform 208, and a second heat source 224b positioned against the segment of the carrier film 210 after the build platform 208. Alternatively or in combination, the printer assembly 204 can include heat sources at other locations.

The device 200 also includes a controller 226 (shown schematically) that is operably coupled to the printer assembly 204 and build platform 208 to control the operation thereof. The controller 226 can be or include a computing device including one or more processors and memory storing instructions for performing the additive manufacturing operations described herein. For example, the controller 226 can receive a digital 3D model of the object 202 to be fabricated, determine a plurality of object cross-sections to build up the object 202 from the resin 206, and can transmit instructions to the light source 218 to output light 220 to form the object cross-sections. As another example, the controller 226 can also determine and control other operational parameters, such as the positioning of the build platform 208 (e.g., height) relative to the carrier film 210, the movement speed and direction of the carrier film 210, the amount of resin 206 deposited by the resin 206, the thickness of the resin layer on the carrier film 210, and/or the amount of heating applied to the resin 206.

Although FIG. 2 illustrates a representative example of an additive manufacturing device, this is not intended to be limiting, and the embodiments described herein can be used in combination with other types of additive manufacturing devices (e.g., vat-based systems) and/or other types of additive manufacturing processes (e.g., material jetting, binder jetting, FDM, powder bed fusion, sheet lamination, directed energy deposition).

Figure 3A:
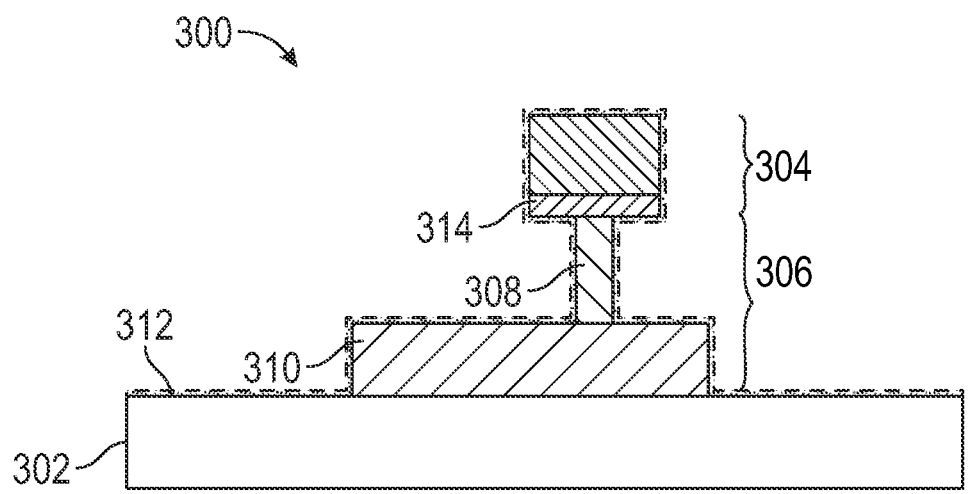
FIG. 3A is a partially schematic illustration of an additively manufactured object on a build platform, in accordance with embodiments of the present technology.

II. Systems, Methods, and Devices for Removing Material from Additively Manufactured Objects FIG. 3A is a partially schematic illustration of an additively manufactured object 300 ("object 300") on a build platform 302, in accordance with embodiments of the present technology. The object 300 can be fabricated using any of the additive manufacturing methods described herein. For example, the object 300 can be produced using the additive manufacturing techniques described above with respect to the method 100 of FIG. 1 and/or by the device 200 of FIG. 2. Although FIG. 3A depicts a single object 300 on the build platform 302, in other embodiments, the build platform 302 can include multiple objects 300, such as two, three, four, five, six, seven, eight, nine, ten, 15, 20, 30, 40, 50, or more objects 300.

The object 300 includes a functional section 304 connected to a sacrificial section 306. The functional section 304 can be the portion of the object 300 that is intended to be in the final product, while the sacrificial section 306 can be a portion of the object 300 that is not intended to be in the final product. The sacrificial section 306 can temporarily connect the functional section 304 to the build platform 302 during additive manufacturing and/or post-processing.

In some embodiments, the sacrificial section 306 includes one or more support structures 308 connected to a raft 310. The raft 310 can be a flattened layer, film, mesh, grid, etc., that is formed directly on the build platform 302 to provide a substrate for building up the rest of the object 300. The raft 310 can improve adhesion of the object 300 to the build platform 302, reduce the likelihood of warping, and/or provide a stable base to support the rest of the object 300 (e.g., if the object 300 would otherwise have very few contact points with the build platform 302). In other embodiments, however, the raft 310 is optional and can be omitted.

The support structures 308 can be struts, pillars, cones, lattices, etc., that are formed on the raft 310 (or directly on the build platform 302, if the raft 310 is omitted). The support structures 308 can extend vertically above the surface of the raft 310 and/or build platform 302 to connect to and provide support for the functional section 304 of the object 300. Support structures 308 may be beneficial or necessary if the object 300 includes overhangs or bridges, and/or to otherwise improve printability. The support structures 308 can also be designed to fracture to make it easier to cleanly separate the object 300 from the raft 310 during post-processing. The locations and geometry (e.g., size, shape, density) of the support structures 308 can be selected based on the geometry of the object 300.

The build platform 302 can be a substrate (e.g., tray, plate, film, sheet, etc.) that provides a flattened surface for fabricating the object 300. The build platform 302 can be made out of any material that can adhere to the cured resin forming the object 300, such as metal (e.g., aluminum, stainless steel, copper, titanium), glass, ceramic, polymer (e.g., polypropylene), or a combination thereof. Optionally, the build platform 302 can include a surface coating to improve adhesion to the resin. In some embodiments, the build platform 302 is also used as a mechanical support for handling the object 300 during post-processing, as described further herein. Alternatively, the sacrificial section 306 (e.g., the raft 310) can be used to handle the object during post-processing instead of the build platform 302.

In some embodiments, the build platform 302 can have additional properties that are useful for the post-processing operations described herein. For example, the build platform 302 can be made partially or entirely out of a thermally conductive material, which can be beneficial for transferring heat to at least a portion of the object 300. As another example, the build platform 302 can be made partially or entirely out of a reflective material, which can be beneficial for directing heat and/or radiation away from at least a portion of the object 300. In some embodiments, the build platform 302 is made partially or entirely of a shape memory material, such as a shape memory alloy (e.g., nitinol) or polymer. Thus, the build platform 302 can transition from a deformed configuration to a shape memory configuration upon application of energy (e.g., heat), which can be advantageous for various applications. For example, the shape memory configuration can be a flattened configuration suitable for use as a substrate in additive manufacturing. Thus, if the build platform 302 is subsequently deformed (e.g., due to forces from centrifugal rotation in connection with the material removal processes described herein), the shape memory effect can be used to transform the build platform 302 back into the flattened configuration for reuse.

After fabrication, there may be excess material 312 (e.g., uncured resin) remaining on the surfaces of the object 300 and/or build platform 302. For example, as shown in FIG. 3A, the excess material 312 can adhere to the surfaces of the functional section 304 and/or sacrificial section 306, as well as the surfaces of the build platform 302. The excess material 312 may need to be removed from the object 300 and/or build platform 302 before further post-processing can be performed (e.g., post-curing, applying additional material, and/or separating the object 300 from the build platform 302). The processes for cleaning the object 300 may depend on the shape of the object 300, as well as the material properties (e.g., viscosity) of the excess material 312.

Figure 3B:
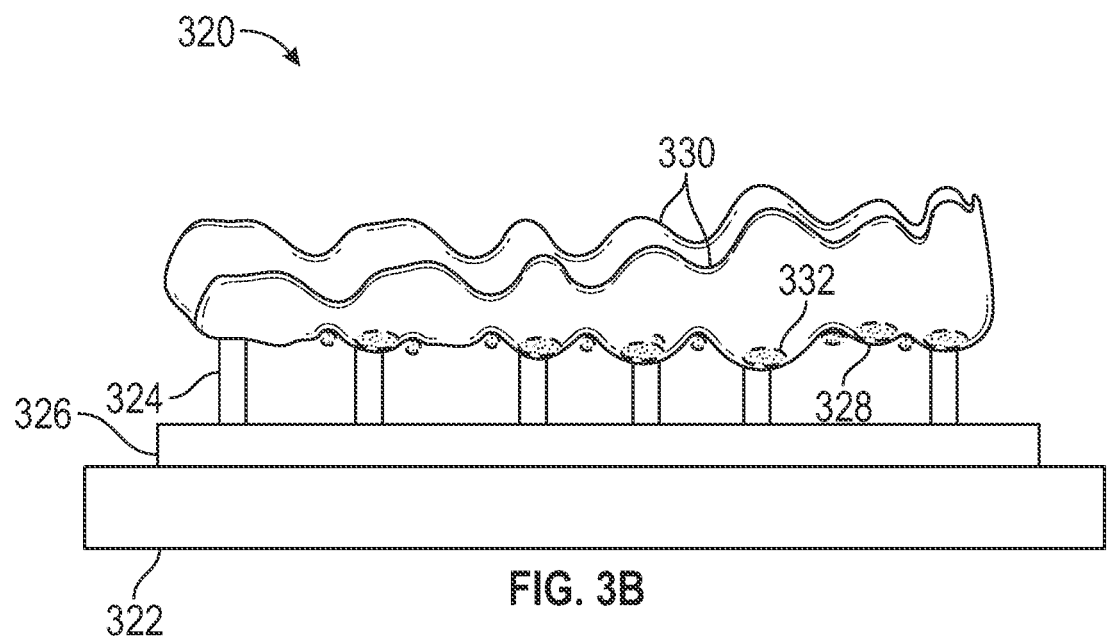
FIG. 3B is a partially schematic illustration of a dental appliance produced by additive manufacturing, in accordance with embodiments of the present technology.

FIG. 3B is a partially schematic illustration of a dental appliance 320 ("appliance 320") produced by additive manufacturing, in accordance with embodiments of the present technology. The appliance 320 can be fabricated using any of the additive manufacturing methods described herein, such as techniques discussed above with respect to the method 100 of FIG. 1 and/or using the device 200 of FIG. 2. The appliance 320 is connected to a build platform 322 via one or more support structures 324 and a raft 326. The features of the build platform 322, support structures 324, and raft 326 may be identical or generally similar to the features of the corresponding components described above with respect to FIG. 3A.

As shown in FIG. 3B, the appliance 320 is a shell aligner having a plurality of cavities configured to receive and reposition a patient's teeth. In the illustrated embodiment, the appliance 320 is oriented in an "concave up" direction such that the occlusal surface 328 of the appliance 320 is closer to the upper surface of the build platform 322 than the gingival edges 330 of the appliance 320. The support structures 324 can be coupled to the occlusal surface 328 of the appliance 320 such that the occlusal surface 328 is spaced apart from the raft 326 and/or build platform 322. Although the appliance 320 is depicted in FIG. 3B as being substantially parallel to the build platform 322 (e.g., the mesial-distal axis of the appliance 320 is substantially parallel to the surface of the build platform 322), in other embodiments, the appliance 320 can be angled or otherwise offset from the build platform 322, e.g., to improve printability of the appliance 320. For example, the appliance 320 can be oriented vertically such that the mesial-distal axis of the appliance 320 is substantially perpendicular to the surface of the build platform 322.

Additionally, although FIG. 3B depicts a single appliance 320 on the build platform 322, in other embodiments, the build platform 322 can include multiple appliances 320, such as two, three, four, five, six, seven, eight, nine, ten, 15, 20, 30, 40, 50, or more appliances 320. In such embodiments, each appliance 320 can represent a different treatment stage for repositioning a patient's teeth. Optionally, a single build platform 322 can include multiple appliances 320 intended for use by different patients. Additional examples and features of orthodontic appliances suitable for use with the present technology are described below in Section III.

After the appliance 320 is fabricated, excess material 332 from the additive manufacturing process (e.g., uncured resin) may adhere to the interior and/or exterior surfaces of the appliance 320. For example, as shown in FIG. 3B, the material 332 can accumulate within concavities, pockets, crevices, etc., on both the upper and lower sides of the occlusal surface 328. The material 332 can also accumulate at other portions of the appliance 320, such as the gingival edges 330, buccal surface, and/or lingual surface. The relatively complex geometry of the appliance 320 may make it difficult to remove all of the excess material 332 using conventional cleaning techniques. Material removal may be further complicated if the material 332 is highly viscous and/or sticky, such as in the case of many resins used in high temperature lithography processes.

Figure 4A:
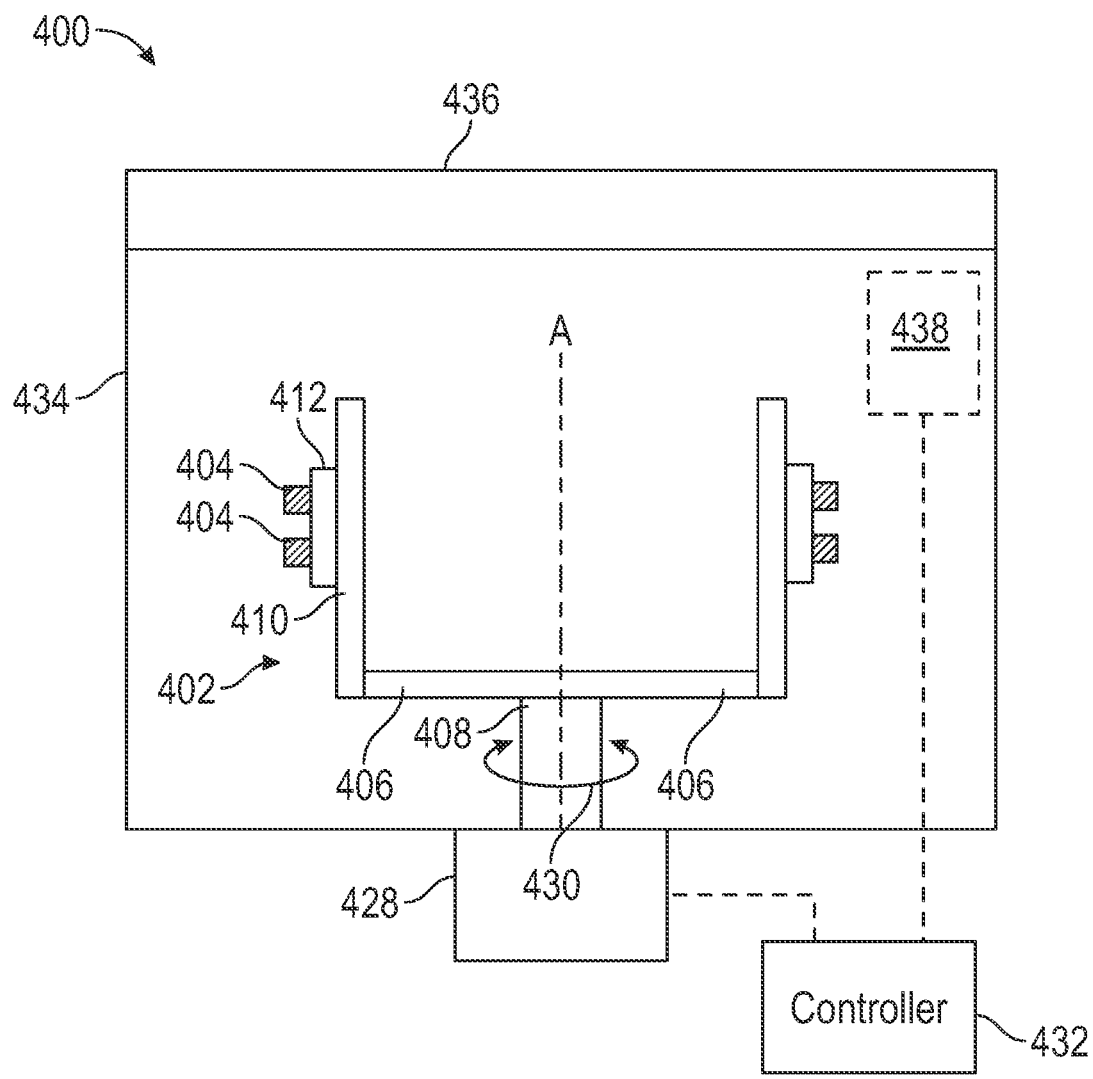
FIG. 4A is a partially schematic illustration of a system for post-processing additively manufactured objects, in accordance with embodiments of the present technology.
Figure 4B:
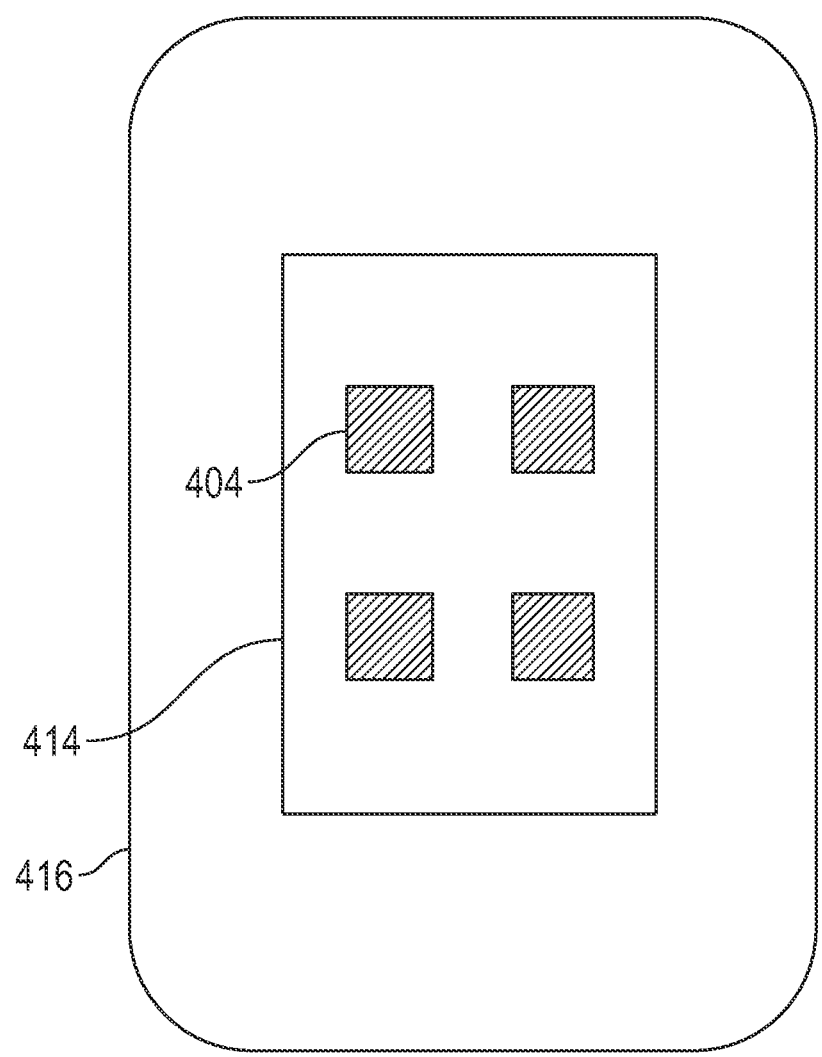
FIG. 4B is a partially schematic top view of a build platform and base plate for supporting additively manufactured objects, in accordance with embodiments of the present technology.

FIGS. 4A-4E illustrate a system 400 for post-processing additively manufactured objects, in accordance with embodiments of the present technology. Specifically, FIG. 4A is a partially schematic illustration of the system 400 and FIGS. 4B-4E illustrate particular components of the system 400. The system 400 can be used to perform various post-processing operations, such as any of the post-processing operations described above with respect to the method 100 of FIG. 1. For example, the system 400 can be used to remove excess material from one or more additively manufactured objects, including objects with relatively complex geometries such as the appliance 320 of FIG. 3B. The system 400 can also perform additional post-processing operations, such as post-curing, applying additional materials, and/or separating the object from the build platform.

Referring first to FIG. 4A, the system 400 includes a rotor 402 configured to support and rotate a set of additively manufactured objects 404 ("objects 404"). The objects 404 can be produced by any suitable additive manufacturing process, and can be identical or generally similar to the object 300 of FIG. 3A and/or the appliance 320 of FIG. 3B (components such as the support structures and raft are omitted in FIG. 4A for purposes of simplicity). The rotor 402 can accommodate any suitable number of objects 404, such as two, three, four, five, six, seven, eight, nine, ten, 20, 30, 40, 50, 100, or more objects 404.

The rotor 402 includes a plurality of arms 406 connected to and extending from a central shaft 408. Although FIG. 4A depicts a rotor 402 with two arms 406, in other embodiments the rotor 402 can include a different number of arms 406 (e.g., three, four, five, or more arms 406). Each arm 406 can be an elongate structure including a first end connected to the shaft 408, and a second end coupled to a mounting structure 410 configured to carry a subset of the objects 404. The length of each arm 406 can be varied as desired to produce the desired amount of rotational force on the objects 404. For example, each arm 406 can have a length within a range from 10 cm to 100 cm, such as a length of 20 cm, 30 cm, 40 cm, 50 cm, 60 cm, or 75 cm.

The mounting structure 410 can be any component suitable for supporting the objects 404, such as a frame, plate, bracket, clamp, etc. Although FIG. 4A depicts the mounting structures 410 as being orthogonal to the arms 406, in other embodiments, the mounting structures 410 can be angled relative to the arms 406. Additionally, although the mounting structures 410 are illustrated as extending vertically upward from the arms 406, in other embodiments, the mounting structures 410 can extend vertically downward from the arms 406, can extend parallel to the arms 406, or any other suitable orientation. Optionally, the mounting structures 410 can be adjustable to many different positions and/or orientations relative to the arms 406, as described in greater detail below.

In the illustrated embodiment, the objects 404 are coupled to the mounting structure 410 via a substrate 412. The substrate 412 can be or include the build platform used when fabricating the objects 404, can be or include another component (e.g., a separate plate, tray, etc.), or a combination thereof. For example, referring to FIG. 4B, the objects 404 can be attached to a build platform 414, which can be coupled to a base plate 416, which can be coupled to the mounting structure 410 (not shown). In some embodiments, the base plate 416 is a perforated plate including one or more openings for receiving fasteners (e.g., screws, pegs, etc.) for attaching the build platform 414. Alternatively or in combination, the build platform 414 can be connected to the mounting structure 410 using other attachment mechanisms, such as spring-loaded clips, snap fit, interference fit, magnets, adhesives, vacuum, etc.

Referring again to FIG. 4A, the objects 404 can be coupled to any suitable portion of the mounting structure 410. For example, although FIG. 4A shows the objects 404 as being mounted on the outside of the mounting structure 410 (e.g., the side facing away from the center of rotation), in other embodiments, the objects 404 can alternatively or additionally be mounted on the inside of the mounting structure 410 (e.g., the side facing toward the center of rotation), on a lateral side of the mounting structure 410, or a combination thereof.

Figure 4C:
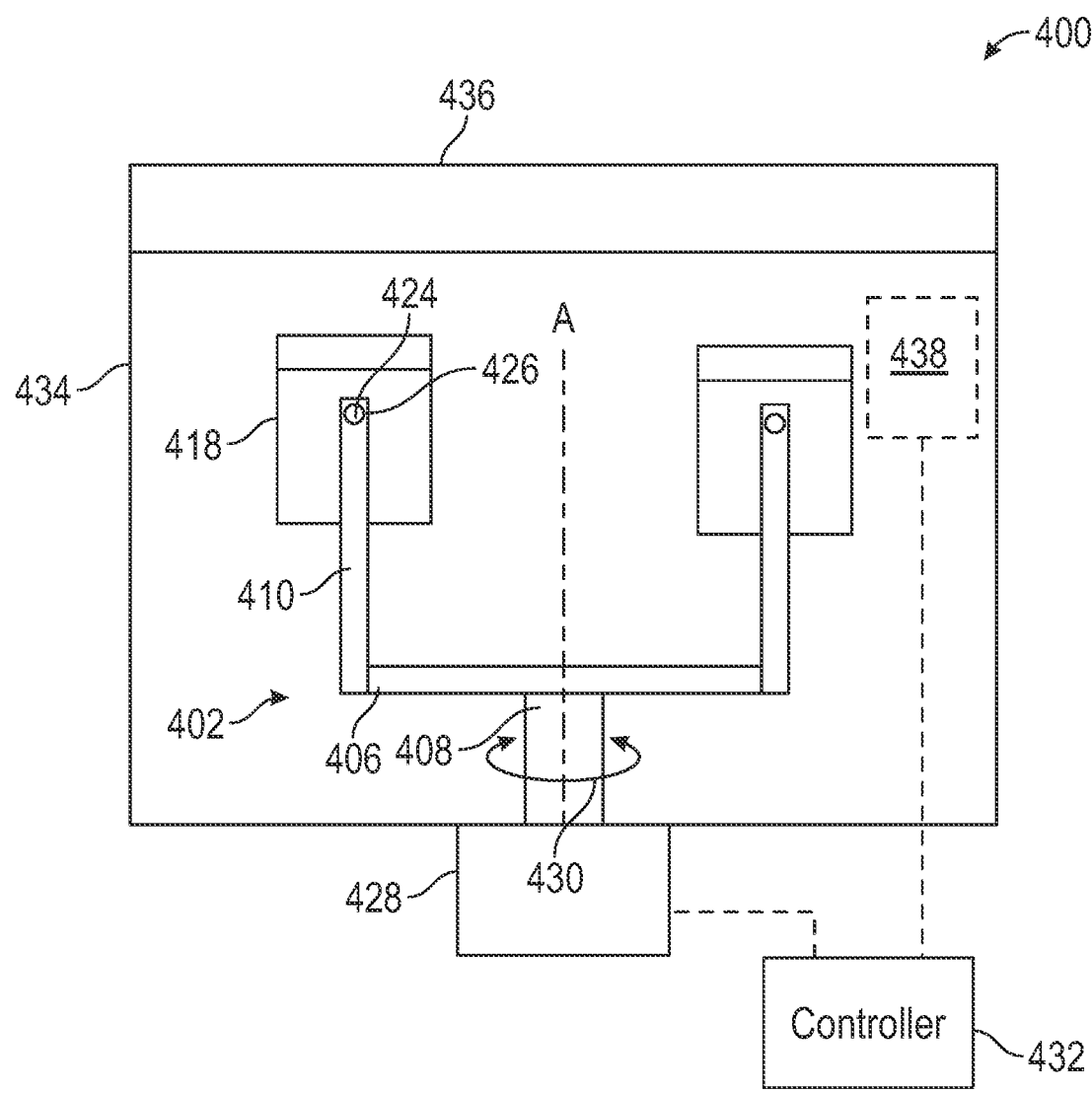
FIG. 4C is a partially schematic illustration of the system of FIG. 4A in which the additively manufactured objects are loaded into containers, in accordance with embodiments of the present technology.
Figure 4D:
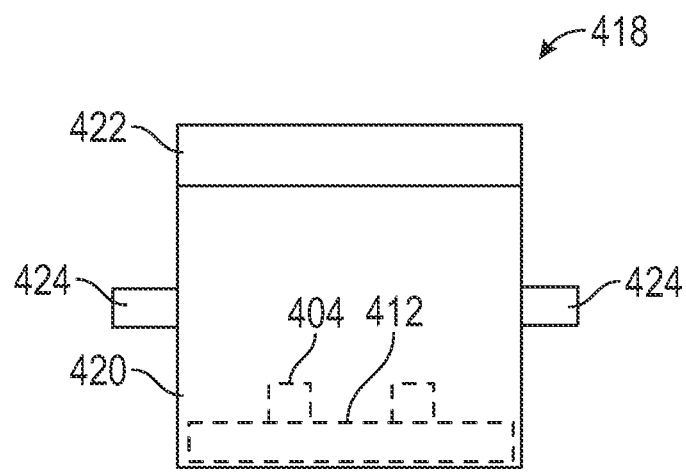
FIG. 4D is a partially schematic side view of an individual container of FIG. 4C.

Referring next to FIG. 4C, in some embodiments, the objects 404 are loaded into one or more containers 418 (e.g., boxes, buckets, vessels, etc.), and the containers 418 can be attached to the mounting structures 410. As shown in FIG. 4D, the container 418 can include a body 420 having an interior cavity for receiving the objects 404 and the substrate 412. The objects 404 and substrate 412 can be placed on the bottom surface within the body 420, or can be suspended above the bottom surface (e.g., by shelves, brackets, or other supports). The container 418 can optionally include a lid 422 so the objects 404 are completely enclosed, which can be advantageous for ensuring that any excess material removed from the objects 404 remains within the container 418. In the illustrated embodiment, the container 418 includes a pair of protrusions 424 connected to opposite, lateral sides of the body 420. As shown in FIG. 4C, the protrusions 424 can fit within corresponding apertures 426 in the mounting structure 410 to couple the container 418 to the mounting structure 410. Optionally, the protrusions 424 can rotate within the apertures 426 so that the container 418 can pivot relative to the mounting structure 410 when the rotor 402 rotates, e.g., similar to a swing arm or swinging bucket centrifuge configuration. Alternatively, the container 418 can be at a fixed angle relative to the mounting structure 410 and/or can be connected to the mounting structure 410 using other types of attachment mechanisms.

Referring again to FIG. 4A, the shaft 408 of the rotor 402 is coupled to an actuator 428 (e.g., a motor) that spins the rotor 402 around a rotational axis A. The actuator 428 can spin the rotor 402 in a clockwise direction, a counterclockwise direction, or both, as indicated by arrows 430. The rotation of the rotor 402 can produce forces that remove excess material by driving the material away from the center of rotation and off the surfaces of the objects 404. For example, the rotation can produce forces of at least 50 g, 100 g, 150 g, 200 g, 250 g, 300 g, 350 g, 400 g, 450 g, or 500 g. The actuator 428 can be configured to rotate at any rotation speed suitable for producing the desired force, such as at least 50 RPM, 100 RPM, 200 RPM, 300 RPM, 400 RPM, 500 RPM, or more. The actuator 428 can be operably coupled to a controller 432 for controlling the operation of the actuator 428 and/or other components of the system 400, as described in greater detail below.

In the illustrated embodiment, the rotor 402 is enclosed in a housing 434. The housing 434 can provide an enclosed chamber so that the excess material removed from the objects 404 is contained and can be collected for reuse or disposal. The housing 434 can also allow the environment surrounding the rotor 402 and objects 404 to be controlled, e.g., with respect to temperature, humidity, vacuum, air flow, radiation, etc. Although the actuator 428 is depicted as being located outside the housing 434, in other embodiments, the actuator 428 can instead be located within the housing 434. The housing 434 can include a lid 436 to allow the objects 404 to be loaded into and removed from the system 400. The lid 436 can be located at the upper portion of the housing 434, or can instead be located at one of the lateral sides of the housing 434.

Figure 4E:
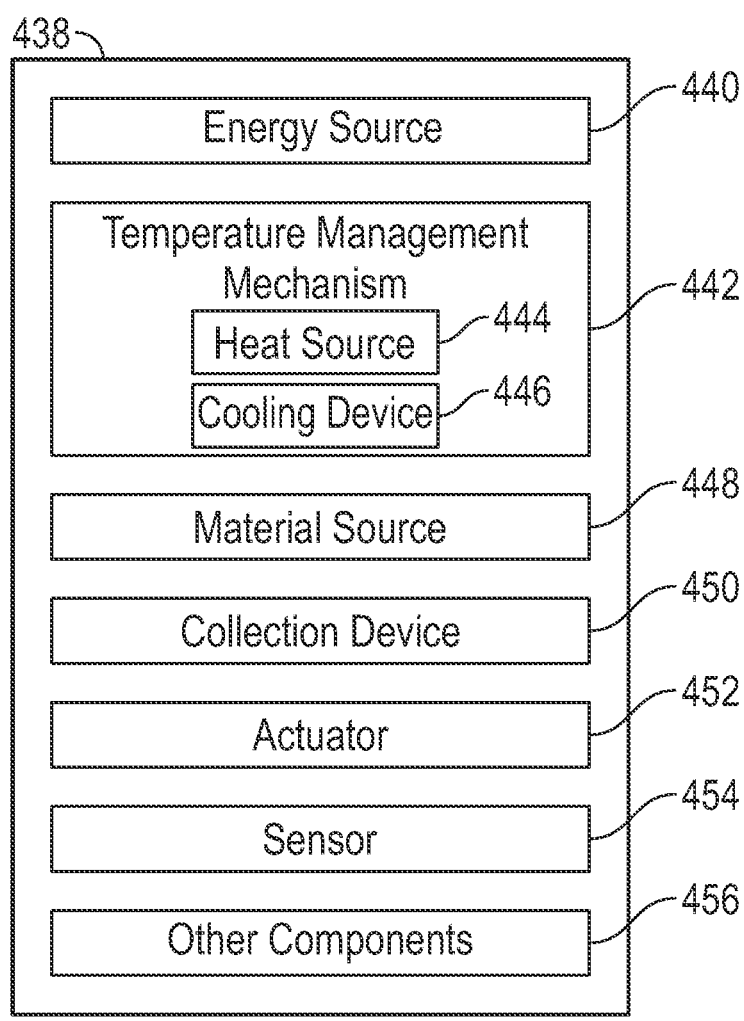
FIG. 4E is a schematic illustration of additional functional components of the system of FIG. 4A.

Referring next to FIGS. 4A and 4E together, in some embodiments, the system 400 includes one or more additional functional components 438 (shown schematically) for facilitating material removal and/or performing other post-processing operations. As shown in FIG. 4E, the functional components 438 can include any of the following: at least one energy source 440 for outputting energy to cure (e.g., post-cure) at least a portion of the objects 404; at least one temperature management mechanism 442 for adjusting an environmental temperature within the housing 434 (e.g., via one or more heat sources 444 and/or cooling devices 446); at least one material source 448 for supplying a material to be applied to the objects 404 (e.g., water, solvent, coating material); at least one collection device 450 for collecting excess material removed from the objects 404 for reuse or disposal; at least one actuator 452 for adjusting one or more portions of the rotor 402 (e.g., the arms 406 and/or mounting structures 410) to alter the force applied to the objects 404; at least one sensor 454 for generating sensor data indicative of parameters relevant to post-processing, and/or other components 456 suitable for use in the operations described herein. The operation of some or all of the functional components 438 can be managed by the controller 432. Additional features and examples of the functional components 438 are described in greater detail below.

FIGS. 5A-26 illustrate representative examples of functional components that can be incorporated in a system for post-processing additively manufactured objects and associated methods, in accordance with embodiments of the present technology. Any of the embodiments of FIGS. 5A-26 can be incorporated into the system 400 of FIGS. 4A-4E, or any other suitable system or device for removing excess material from additively manufactured objects and/or other post-processing operations. Additionally, any of the features of the embodiments of FIGS. 5A-26 can be combined with each other.

As previously discussed, the systems described herein can include one or more energy sources for applying energy to the additively manufactured objects. The energy can include radiation, such as microwave radiation, infrared radiation, visible radiation, UV radiation, or combinations thereof. In some embodiments, the energy is applied to heat the objects and/or the excess material on the objects to facilitate removal of the excess material. For example, heating can reduce the viscosity of the excess material, thus increasing flowability and reducing the amount of force needed to separate the excess material from the objects. This can be particularly advantageous for objects fabricated using high temperature lithography processes, since the resins used in such processes may otherwise be too viscous to be easily removed. As another example, the energy can be used to cure the additively manufactured objects in whole or in part, e.g., for post-curing. In some embodiments, the energy is applied to selectively alter the material properties (e.g., stiffness, strength) of certain portions of each object. For instance, the energy can be targeted to the sacrificial sections of each object (e.g., to the support structures) to make these sections more brittle and thus easier to fracture when separating the object from the build platform.

Figure 5A:
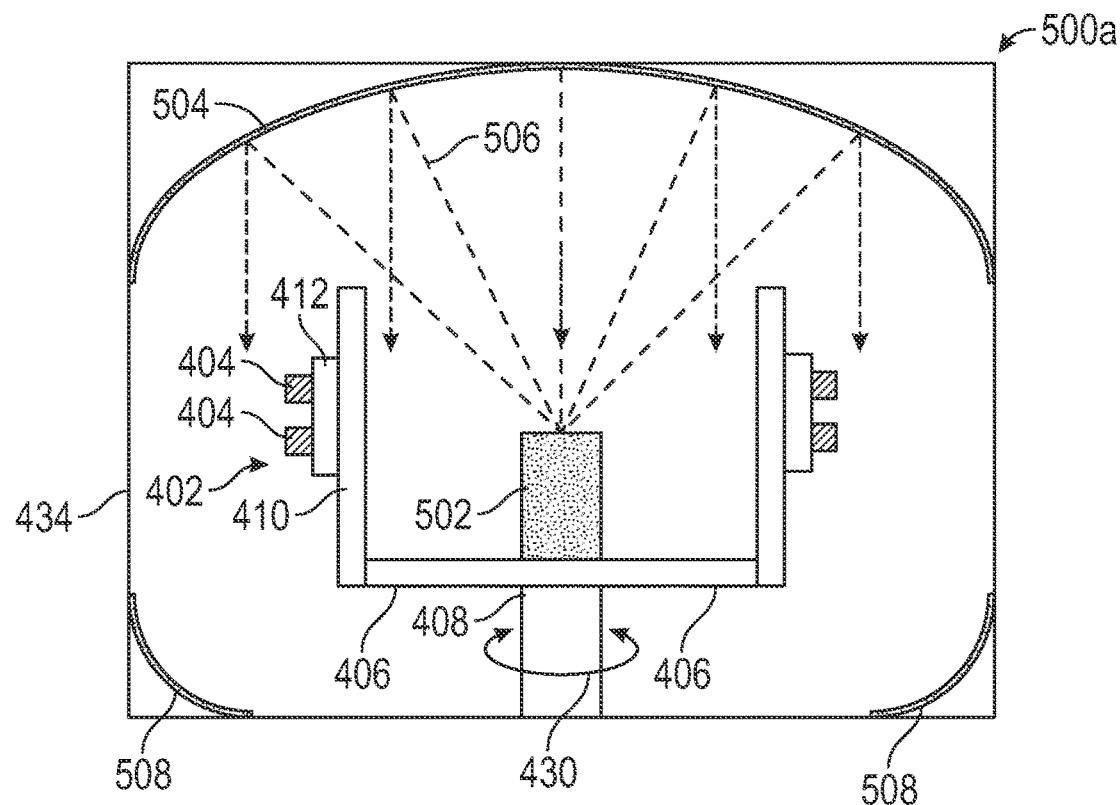
FIG. 5A is a partially schematic illustration of a system for post-processing additively manufactured objects including an energy source, in accordance with embodiments of the present technology.

FIG. 5A is a partially schematic illustration of a system 500a for post-processing additively manufactured objects including an energy source 502, in accordance with embodiments of the present technology. The energy source 502 (e.g., a radiation or heat source) is mounted to the central portion of the rotor 402 at or near the center of rotation. Accordingly, the energy source 502 can remain generally stationary even while the rotor 402 is spinning, which can be advantageous for avoiding electrical interference produced by moving components and/or for simplifying the electrical connections to the energy source 502.

The system 500a can include a reflector 504 (e.g., a mirror) configured to redirect energy 506 (e.g., radiation) output by the energy source 502 toward the rotor 402 and/or objects 404. For example, in the embodiment of FIG. 5A, the reflector 504 is positioned at or near the upper portion of the housing 434 (e.g., coupled to the lid 436—not shown), such that energy 506 emitted by the energy source 502 in an upward direction is reflected back downward and toward the rotor 402 and/or objects 404. The shape and positioning of the reflector 504 relative to the energy 506 can be configured to produce a desired pattern of energy distribution within the chamber of the housing 434. For example, in the illustrated embodiment, the reflector 504 has a parabolic shape, and the energy source 502 is positioned at or near the focus of the reflector 504 such that the reflected energy 506 is redirected into parallel rays, thus producing a substantially uniform energy distribution throughout the chamber. In other embodiments, however, the reflector 504 can have a different shape (e.g., flat, convex, concave, spherical, etc.) and/or can be configured to produce a different energy distribution (e.g., converging or diverging), and/or the energy source 502 can be positioned differently relative to the reflector 504 (e.g., away from the focus).

Optionally, the system 500a can include one or more secondary reflectors 508 (e.g., mirrors) at other locations within the housing 434 to redirect energy away from the sides and/or bottom of the housing 434, and back toward the rotor 402 and objects 404. In the illustrated embodiment, the secondary reflectors 508 are located at the bottom corners of the chamber, such that energy 506 traveling toward the bottom of the chamber can be reflected back upward. Alternatively or in combination, the secondary reflectors 508 can be disposed at other locations, such as at or near the bottom portion and/or lateral portions of the chamber, as described further below.

In some embodiments, the rotor 402 is rotating while the energy source 502 is outputting energy 506, which may be beneficial for ensuring that most or all of the objects 404 are exposed to the same or similar amounts of energy 506, regardless of their stationary location relative to the energy source 502. Additionally, this can allow the system 500a to produce substantially uniform irradiation while using a multimode energy source 502 (e.g., a multimode microwave emitter), which may be easier to implement than a single mode energy source 502 in certain situations. The rotor 402 can be rotating at any suitable rotation speed during energy application. In some embodiments, the rotor 402 is rotating at speeds sufficient to remove excess material from the objects 404 (e.g., at least 100 RPM), which allows the system 500a to perform cleaning and energy application at the same time. This approach can be advantageous, for example, in embodiments where the energy 506 is being applied to heat the excess material to reduce its viscosity and enhance removal. In other embodiments, the rotor 402 can be rotated at slower speeds while the energy 506 is being applied (e.g., less than 100 RPM). This approach can be used in embodiments where the energy 506 is used to cure the objects 404 after excess material has been removed (e.g., for post-curing and/or to selectively alter the material properties of certain portions of the objects 404). Alternatively, the energy 506 can be applied while the rotor 402 is stationary.

Optionally, the substrate 412 carrying the objects 404 can be configured to facilitate energy application by the energy source 502. For example, in embodiments where the energy 506 is intended for heating, the substrate 412 can be made partially or completely out of a material that absorbs the wavelength of the energy 506. In such embodiments, the substrate 412 can act as a heat sink that transfers heat to the objects 404 or selected portions thereof. Alternatively, the substrate 412 can be made partially or completely out of a material that reflects the wavelength of the energy 506 to direct it away from the objects 404.

Figure 5B:
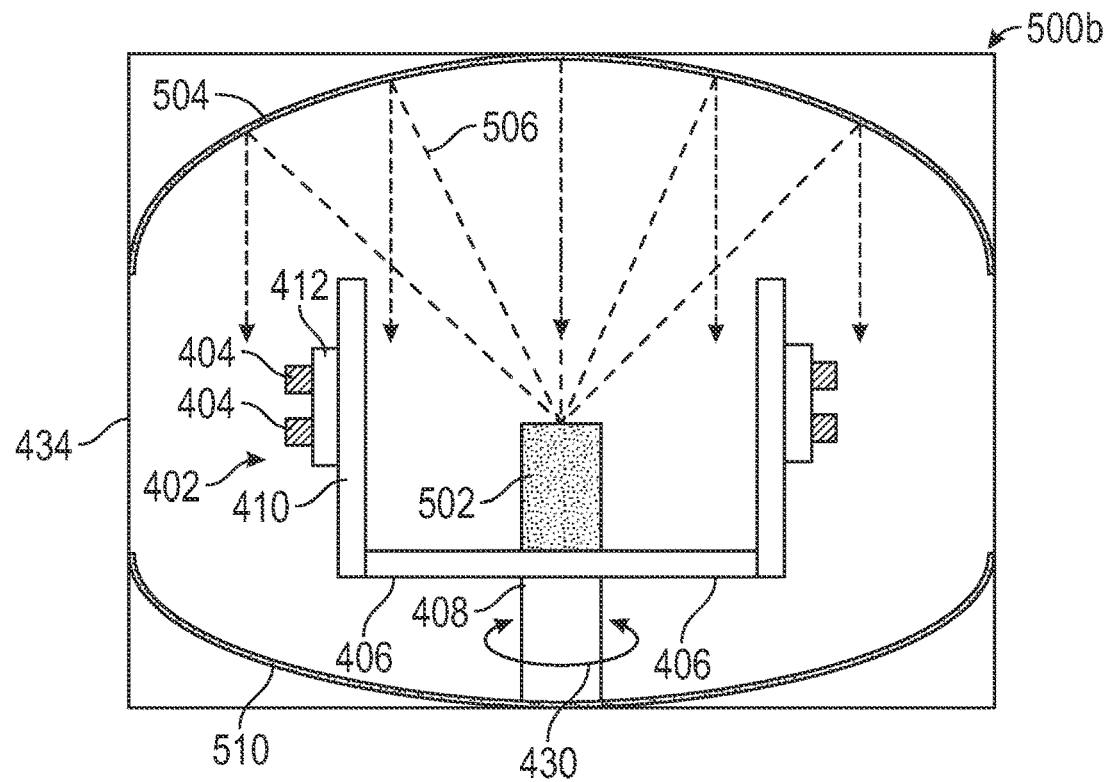
FIG. 5B is a partially schematic illustration of another system for post-processing additively manufactured objects including an energy source, in accordance with embodiments of the present technology.

FIG. 5B is a partially schematic illustration of another system 500b for post-processing additively manufactured objects including an energy source 502, in accordance with embodiments of the present technology. The system 500b can be generally similar to the system 500a of FIG. 5A, except that the system 500b includes a single secondary reflector 510 at the bottom portion of the housing 434 to redirect energy 506 back upward toward the rotor 402 and/or objects 404. The secondary reflector 510 can include a central aperture to accommodate the shaft 408 of the rotor 402. Although the secondary reflector 510 is depicted as being concave, in other embodiments the secondary reflector 510 can have a convex, flat, or other shape.

Figure 5C:
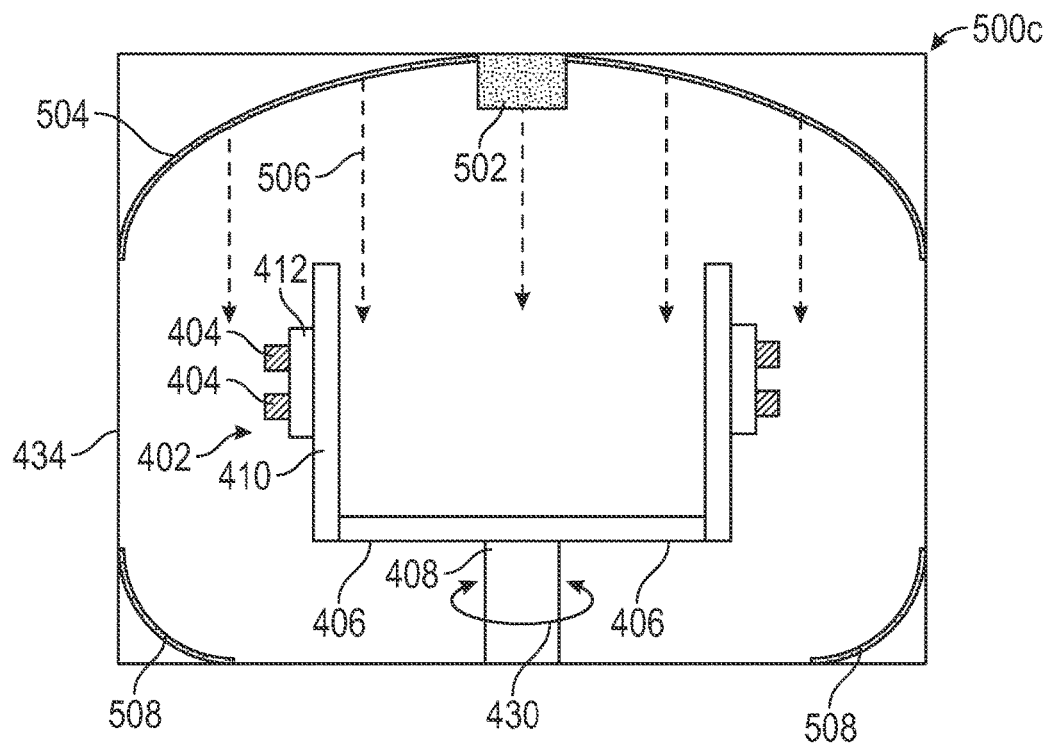
FIG. 5C is a partially schematic illustration of yet another system for post-processing additively manufactured objects including an energy source, in accordance with embodiments of the present technology.

FIG. 5C is a partially schematic illustration of yet another system 500c for post-processing additively manufactured objects including an energy source 502, in accordance with embodiments of the present technology. The system 500c can be generally similar to the system 500a of FIG. 5A, except that the energy source 502 is mounted to the upper portion of the housing 434 (e.g., to the lid 436—not shown) together with the reflector 504, rather than to the rotor 402. This arrangement can ensure that the energy source 502 remains stationary while the rotor 402 is spinning.

In the illustrated embodiment, the energy source 502 is positioned at or near the focus of the reflector 504 to produce a substantially uniform energy distribution, as previously discussed with respect to FIG. 5A. Although the energy source 502 is depicted as being coupled to the surface of the reflector 504, the energy source 502 can also be spaced apart from the reflector 504 via struts, scaffolding, cables, and/or other attachment structures. In other embodiments, the energy source 502 can be positioned at a different location relative to the reflector 504 (e.g., away from the focus), and/or the reflector 504 can be configured to produce a different type of energy distribution, as described above.

Figure 5D:
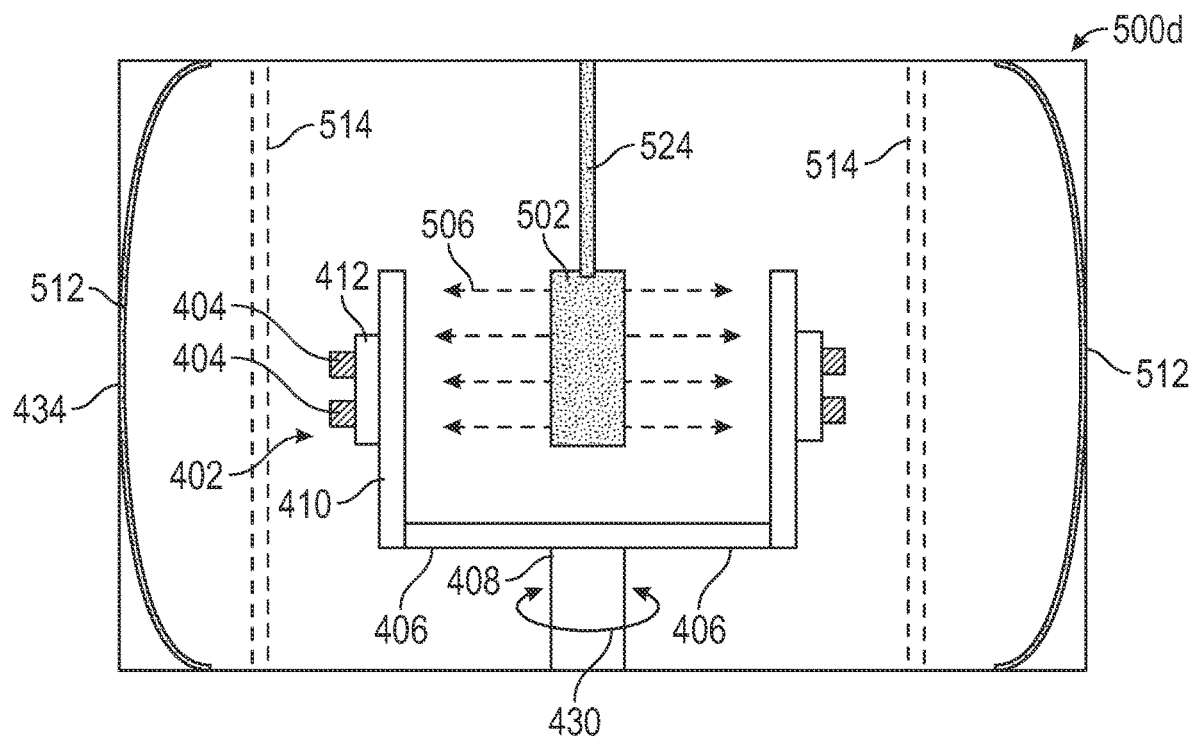
FIG. 5D is a partially schematic illustration of another system for post-processing additively manufactured objects including an energy source, in accordance with embodiments of the present technology.

FIG. 5D is a partially schematic illustration of another system 500d for post-processing additively manufactured objects including an energy source 502, in accordance with embodiments of the present technology. The system 500d can be similar to the system 500c of FIG. 5C in that the energy source 502 is a stationary element that is mounted to the upper portion of the housing 434. The energy source 502 can be suspended on a shaft 524 so that it is disposed between the mounting structures 410 of the rotor 402. In the embodiment of FIG. 5D, the energy source 502 emits energy 506 radially outward toward the lateral sides of the housing 434. This arrangement can be advantageous for UV irradiation and/or other radiation types where radial emission is desirable, e.g., to avoid casting shadows on certain portions of the rotor 402 and/or objects 404.

The system 500d can include at least one reflector 512 positioned at the lateral sides of the housing 434 to redirect energy 506 radially inward toward the rotor 402 and/or object 404. The reflector 512 can be a single component extending partially or completely around the rotor 402 (e.g., a single cylindrical mirror along the circumference of the housing 434), or can be multiple discrete components (e.g., a first reflector at a first lateral side of the housing 434, a second reflector at a second lateral side of the housing 434, etc.). The reflector 512 can be curved (e.g., concave, convex, parabolic), flat, or any other suitable shape.

In some embodiments, rotation of the rotor 402 causes excess material to be flung off the objects 404 in a lateral direction toward the reflector 512. To avoid fouling the reflector 512, the system 500d can include a barrier 514 (e.g., a shield, film, liner, etc.) disposed between the reflector 512 and the rotor 402. The barrier 514 can be partially or fully transparent to the wavelength of the energy 506 produced by the energy source 502 so that the energy 506 reflected by the reflector 512 can still reach the rotor 402 and objects 404. The barrier 514 can optionally include a non-adhesive coating on the surfaces facing the rotor 402 so that any excess material that lands on the barrier 514 flows downward off the barrier 514 to reduce interference with energy transmission. Although the barrier 514 is depicted in FIG. 5D as having a flattened shape, in other embodiments the barrier 514 can have a curved (e.g., convex or concave) or other shape. Additionally, the barrier 514 can be spaced apart from the reflector 512, or can be coupled to the surface of the reflector 512 (e.g., as a conformal film or coating on the reflector 512).

Figure 5E:
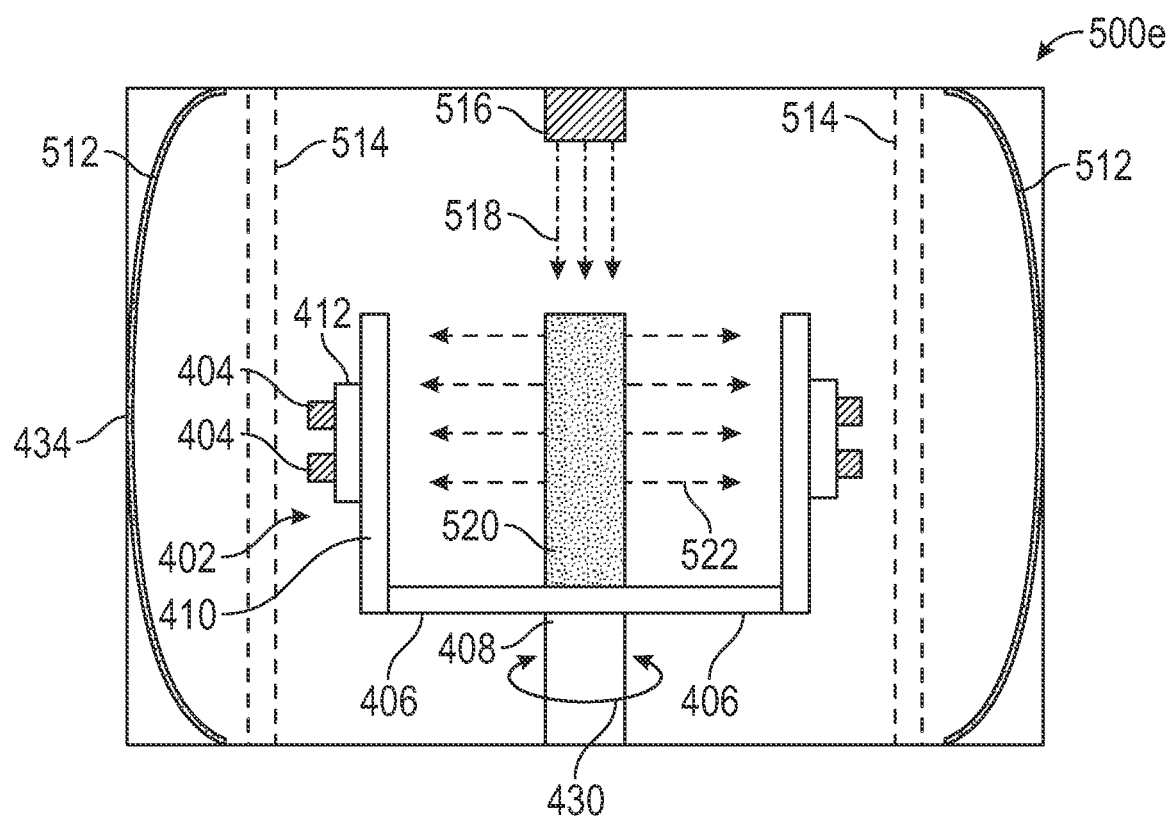
FIG. 5E is a partially schematic illustration of a system for post-processing additively manufactured objects including two energy sources, in accordance with embodiments of the present technology.

FIG. 5E is a partially schematic illustration of a system 500e for post-processing additively manufactured objects including a first energy source 516 and a second energy source 520, in accordance with embodiments of the present technology. The first energy source 516 (e.g., a first radiation source) is configured to output first energy 518 (e.g., radiation having a first wavelength). The first energy 518 can activate the second energy source 520 (e.g., a second radiation source) to cause the second energy source 520 to output second energy 522 (e.g., radiation having a second wavelength). The second energy 522 can irradiate the objects 404 to produce a desired effect (e.g., heating and/or curing). For example, the first energy 518 can be microwave radiation, and the second energy 522 can be UV radiation. In some embodiments, the configuration of the system 500e produces a higher second energy output than would otherwise be possible using the second energy source 520 alone, e.g., microwave-powered UV emitters may produce a higher UV output than solid state UV emitters.

The first energy source 516 can be positioned at a different location than the second energy source 520. In the illustrated embodiment, the first energy source 516 is positioned at the upper portion of the housing 434 (e.g., coupled to the lid 436—not shown), while the second energy source 520 is coupled to the rotor 402 (e.g., at or near the center of rotation). Alternatively, the first energy source 516 and/or second energy source 520 can be positioned at other locations within the system 500e. In some embodiments, the second energy source 520 is a passive element (e.g., an emitter within a vacuum tube) that does not require any electrical wiring to operate. This provides greater flexibility in the placement of the second energy source 520. For instance, the second energy source 520 can be positioned on a moving component of the rotor 402, such as on the arm 406 or mounting structure 410.

The configurations of the systems 500a-500e of FIGS. 5A-5E can be modified in many different ways. For example, any of the systems 500a-500e can include any suitable number of energy sources, such as one, two, three, four, five, or more energy sources. In embodiments where multiple energy sources are used, some or all of the energy sources can produce the same type (e.g., wavelength) of energy, or some or all of the energy sources can produce different types of energy. The energy source(s) can be disposed at any suitable location, such the upper portion of the housing 434, lower portion of the housing 434, lateral side of the housing 434, and/or on the rotor 402 (e.g., near the center of rotation, on the arm 406, or on the mounting structure 410). Optionally, some or all of the energy source(s) can be movable to allow for dynamic adjustments to positioning.

As another example, the systems 500a-500e can include additional components not shown in FIGS. 5A-5E, such as any of the components of the system 400 of FIGS. 4A-4D. For example, any of the systems 500a-500e can include a controller (e.g., the controller 432 of FIG. 4A) that is operably coupled to the energy source(s). The controller can control various parameters of the energy source(s), such as the timing, duration, wavelength, waveform, and/or intensity of energy output. Optionally, the controller can coordinate the energy output with the rotation of the rotor 402 so that energy is produced before, during, and/or after the objects 404 are spun.

In some embodiments, the systems described herein include a temperature management mechanism for controlling the temperature of the objects 404, the excess material on the objects 404, and/or the environmental temperature surrounding the objects 404. The temperature management mechanism can include at least one heat source for increasing the temperature. The heat source can be or include any of the energy sources described elsewhere herein (e.g., the energy sources of FIGS. 5A-5E), or a different component (e.g., a heat sink, heating plate, heated gas, heated fluid, etc.). Alternatively or in combination, the temperature mechanism can include at least one cooling device for decreasing the temperature (e.g., a thermoelectric cooler (TEC), cold plate, cold gas, cold fluid, etc.).

Figure 6:
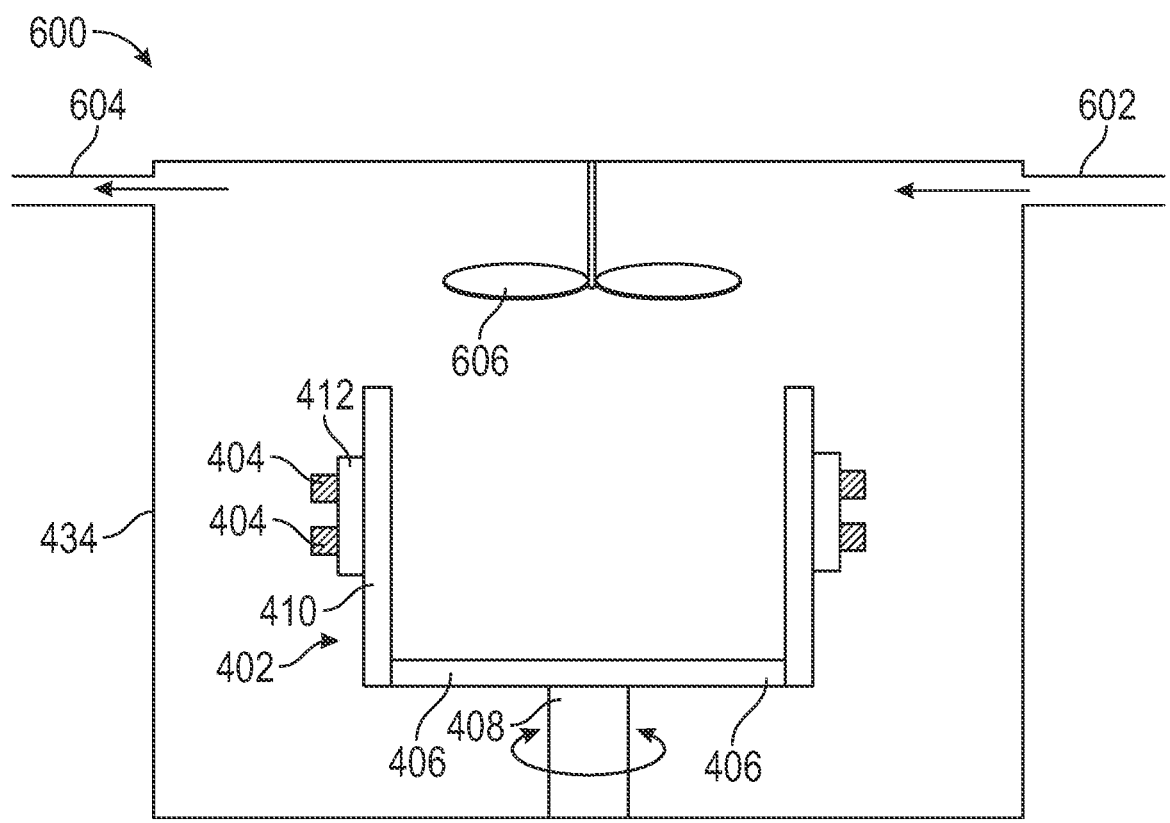
FIG. 6 is a partially schematic illustration of a system for post-processing additively manufactured objects that manages temperature via introduction of a hot or cold gas, in accordance with embodiments of the present technology.

FIG. 6 is a partially schematic illustration of a system 600 for post-processing additively manufactured objects that manages temperature via introduction of a hot or cold gas, in accordance with embodiments of the present technology. The system 600 includes at least one inlet 602 for introducing a gas into the chamber of the housing 434. The system 600 also includes at least one outlet 604 for allowing gas to leave the chamber. The gas can be any suitable substance for heating or cooling the objects 404, such as air or steam. The inlet 602 and outlet 604 can each independently be located at any suitable portion of the system 600, such as the upper portion, lower portion, or a lateral side of the housing 434. For example, in embodiments where the inlet 602 is used to introduce a heated gas, the inlet 602 can be located at or near the lower portion of the housing 434 so the heated gas naturally rises toward the top of the chamber to promote uniform heating. Conversely, in embodiments where the inlet 602 is used to introduce a cooled gas, the inlet 602 can be located at or near the upper portion of the housing 434 so the cooled gas naturally sinks toward the bottom of the chamber to promote uniform cooling.

In some embodiments, the system 600 uses multiple gases to control the environmental temperature, such as at least one heated gas and at least one cooled gas. The temperature within the housing 434 can be precisely controlled by adjusting the ratios of the heated and cooled gases. The heated gas and the cooled gas can be the same gas, or can be different gases. In some embodiments, the system 600 includes at least two inlets 602: a first inlet 602 for introducing a heated gas, and a second inlet 602 for introducing a cooled gas. Alternatively, the heated and cooled gas can be introduced through the same inlet 602.

Optionally, the system 600 can include one or more fans 606 or other airflow control devices to circulate the gas so the entire chamber is maintained at a substantially uniform environmental temperature. The rotor 402 can also rotate while the gas is introduced so the objects 404 are uniformly heated or cooled, regardless of their stationary locations relative to the inlet 602. In some embodiments, the rotor 402 rotates at relatively high speeds so that heating or cooling of the objects 404 occurs while the objects 404 are being cleaned. In other embodiments, the rotor 402 can rotate at slower speeds, or can be stationary.

Figure 7A:
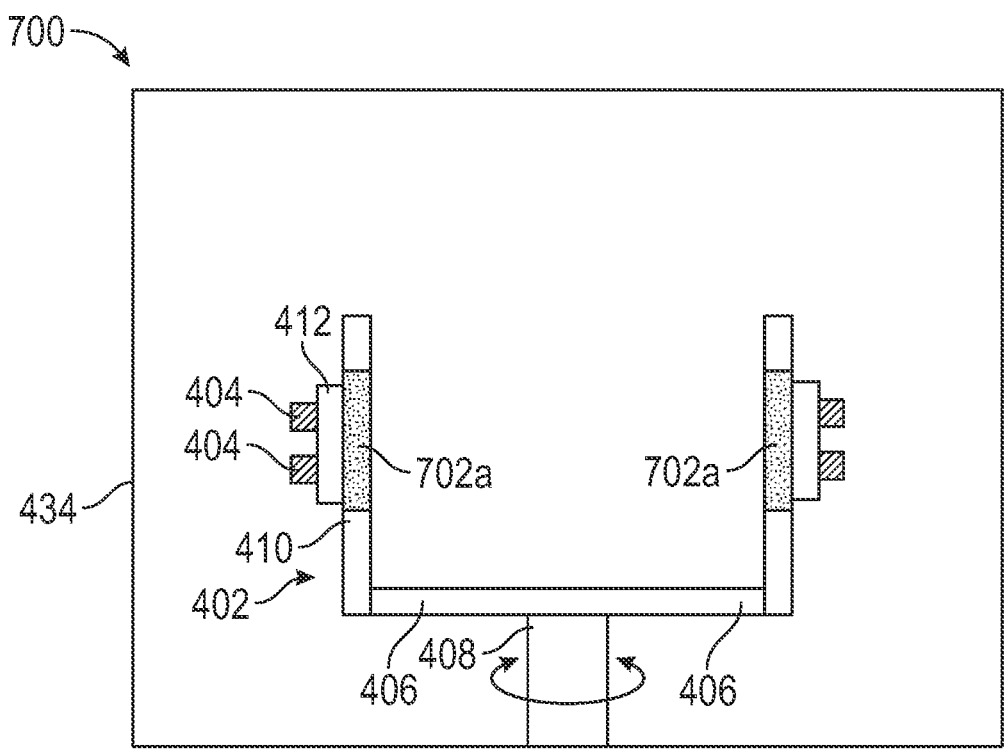
FIG. 7A is a partially schematic illustration of a system for post-processing additively manufactured objects including at least one temperature-controlled device, in accordance with embodiments of the present technology.

FIG. 7A is a partially schematic illustration of a system 700 for post-processing additively manufactured objects including at least one temperature-controlled device 702a ("device 702a"), in accordance with embodiments of the present technology. The devices 702a can each include one or more portions (e.g., surfaces) that can be maintained at a predetermined temperature. For example, the devices 702a can be heat sources, such as heat sinks or heating plates. The devices 702a can alternatively be cooling devices, such as TECs or cooling plates. Optionally, the devices 702a can include a first section including a heat source, and a second section including a cooling device (e.g., a TEC can have a "hot side" that acts a heat source and a "cold side" that acts as a cooling device). This approach allows a single device 702a to provide both heating and cooling.

In the illustrated embodiment, the devices 702a are integrated into or coupled to the mounting structures 410. Each device 702a can be coupled to the substrate 412 carrying the objects 404 such that at least one surface of the device 702a is adjacent or a near a corresponding surface of the substrate 412. Accordingly, the device 702a can transfer heat to the objects 404 via the substrate 412 (in embodiments where the device 702a is used for heating) and/or withdraw heat from the objects 404 via the substrate 412 (in embodiments where the device 702a is used for cooling). In such embodiments, the substrate 412 can be made of a material having high thermal conductivity to promote heat transfer between the device 702a and the objects 404. Accordingly, the devices 702a can provide localized heating and/or cooling to the objects 404, which may be more energy efficient compared to devices configured to heat or cool the entire environment.

Figure 7B:
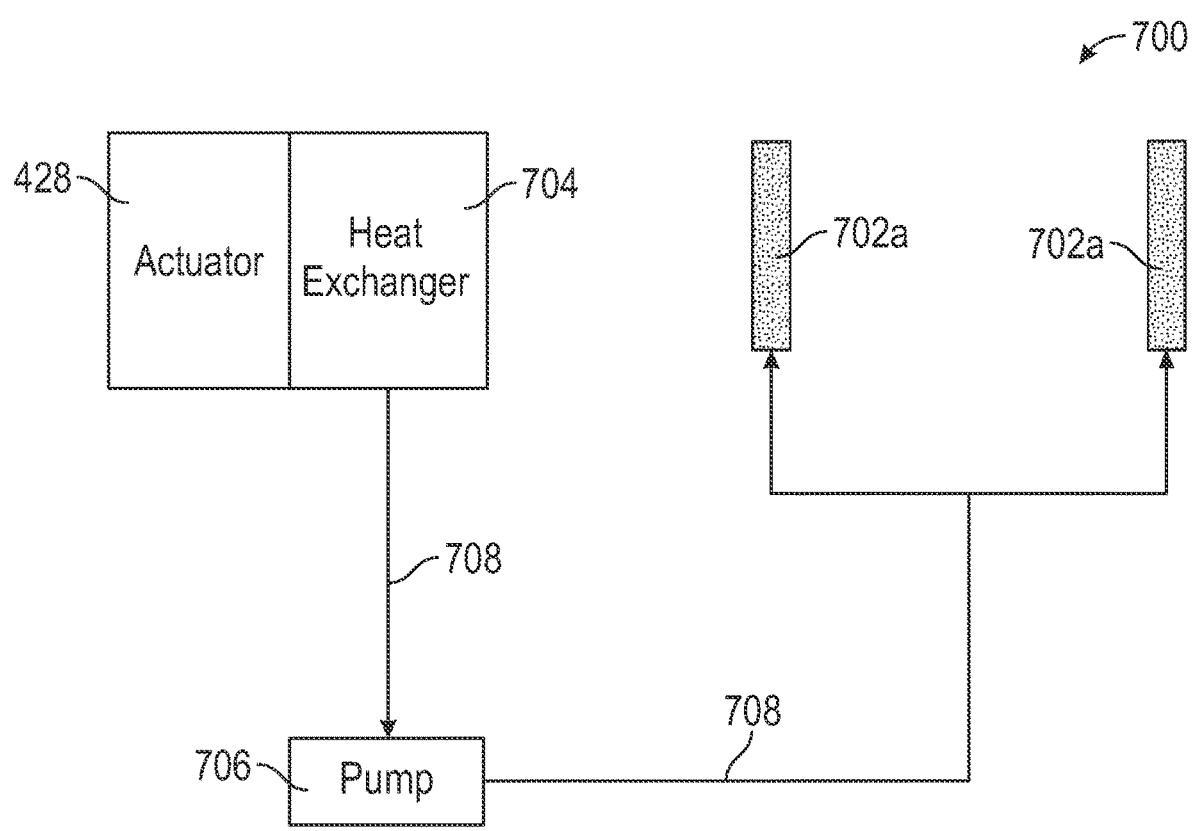
FIG. 7B is a schematic block diagram of the system of FIG. 7A.

FIG. 7B is a schematic block diagram of the system 700, in accordance with embodiments of the present technology. In some embodiments, the system 700 uses regenerative braking of the actuator 428 to produce heat for operating the devices 702a. As shown in FIG. 7B, the actuator 428 can be thermally coupled to a heat exchanger 704 that captures heat produced from braking the actuator 428. For example, the actuator 428 can be braked using an eddy current braking mechanism that dissipates kinetic energy as heat, in accordance with techniques known to those of skill in the art. The heat exchanger 704 can transfer the captured heat to a fluid (e.g., a gas or liquid). The system 700 can also include a pump 706 that circulates the heated fluid from the heat exchanger 704 to the devices 702a via pipes 708. In embodiments where the devices 702a are heat sinks or heated plates, the heated fluid can be used to heat the devices 702a. In embodiments where the devices 702a are TECs, the heated fluid can be used to heat the hot side of the TEC, in accordance with techniques known to those of skill in the art.

Figure 7C:
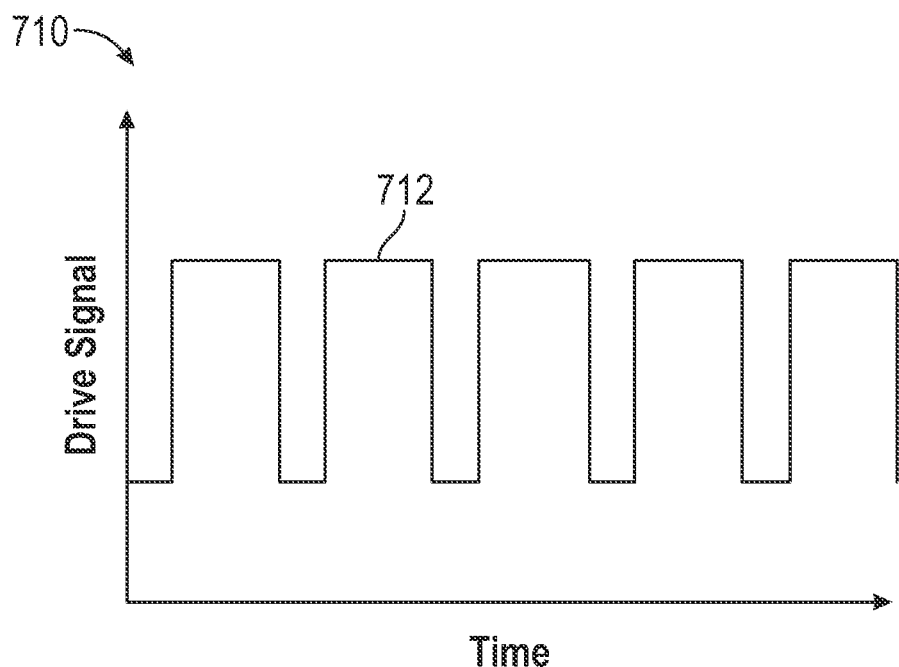
FIG. 7C is a graph illustrating an actuator drive signal suitable for use with the regenerative braking scheme of FIG. 7B.

FIG. 7C is a graph 710 illustrating an actuator drive signal suitable for use with the regenerative braking scheme of FIG. 7B. As shown in FIG. 7C, the drive signal can include a plurality of pulses 712, such the actuator 428 is only operating intermittently. The resting periods between pulses 712 can be sufficiently short such that the apparent rotational speed of the actuator 428 remains substantially constant due to inertia of the actuator 428 and rotor 402. However, during the resting periods, the actuator 428 can still generate sufficient heat for operating the devices 702a. Accordingly, the actuator 428 can provide heat via regenerative braking even while the rotor 402 is spinning.

Figure 7D:
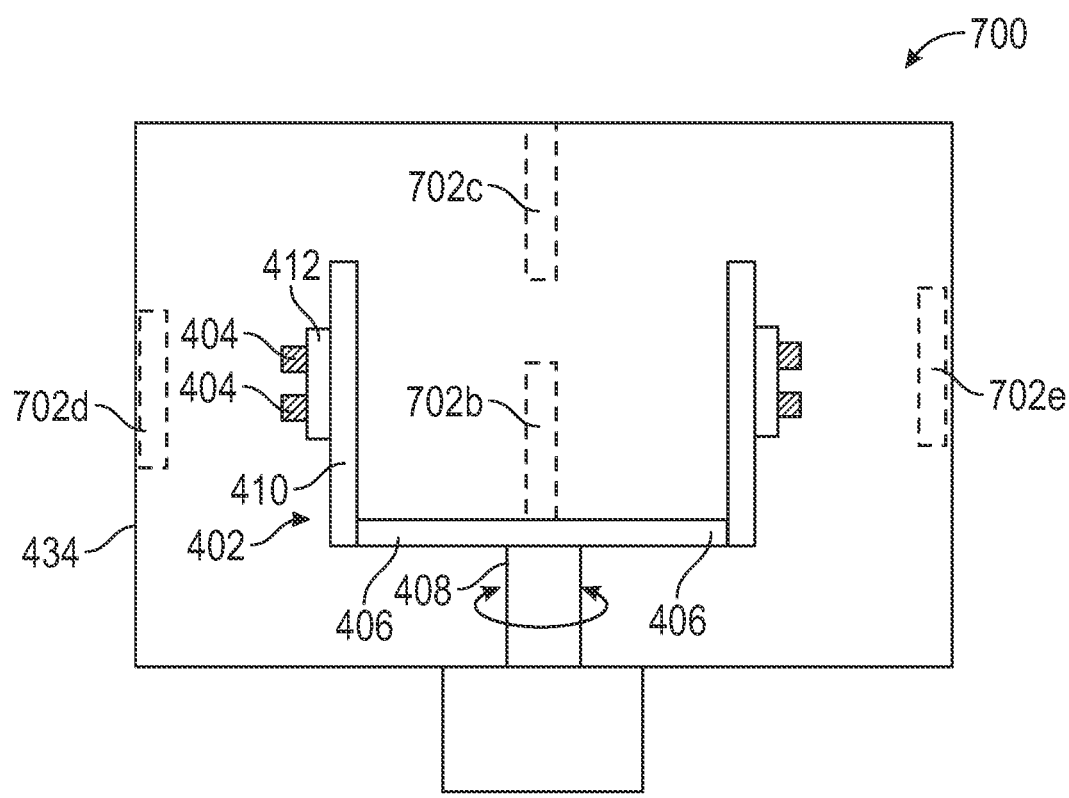
FIG. 7D is a partially schematic illustration of the system of FIG. 7A showing alternative locations for temperature-controlled devices, in accordance with embodiments of the present technology.

FIG. 7D is a partially schematic illustration of the system 700 showing alternative locations for temperature-controlled devices, in accordance with embodiments of the present technology. For example, the system 700 can include one or more devices 702b coupled to the rotor 402 (e.g., at the center of rotation, away from the center of rotation), one or more devices 702c coupled to the upper portion of the housing 434 (e.g., to the lid 436—not shown), one or more devices 702d, 702e coupled to the lateral sides of the housing 434, and/or any other suitable location. The features and operation of the devices 702b-702e can be generally similar to the devices 702a of FIGS. 7A and 7B, except that the devices 702b-702e are used to control the overall environmental temperature within the housing 434 rather than to provide localized heating and/or cooling. Optionally, any of the devices 702b-702e can be used in combination with the devices 702a of FIGS. 7A and 7B.

The temperature management mechanisms described herein can be configured to produce a temperature profile that is beneficial for material removal and/or the other post-processing steps described herein. For example, as discussed above, heating can reduce the viscosity of the excess material on the objects, thus making it easier to remove the excess material from the objects. Heating can also facilitate evaporation of wash fluids (e.g., water, solvents) from the objects. Cooling can increase the stiffness of the additively manufactured objects, which can improve resistance to deformation due to high forces exerted during rotation. This approach can be beneficial for protecting objects having fragile structures and/or made from relatively compliant materials (e.g., elastomers). Moreover, heating and/or cooling can be used to selectively alter the material properties (e.g., stiffness, strength) of certain portions of each object, such as to increase the brittleness of sacrificial sections as described above.

In some embodiments, the temperature profile produced by the temperature management mechanism is a dynamic temperature profile in which the temperature (e.g., an environmental temperature of the system, and/or a local temperature of the objects and/or excess material) varies with respect to one or more additional operational parameters. For example, the temperature can vary (e.g., increase or decrease) over time. Alternatively or in combination, the temperature can vary with respect to the rotational speed of the objects. In some embodiments, the temperature is higher when spinning the objects at lower rotational speeds (e.g., to reduce viscosity of the excess material), and is lower when spinning the objects at higher rotational speeds (e.g., to increase the stiffness of the object to resist deformation due to higher g forces). The appropriate dynamic temperature profile can be selected based on the type of material used to form the object, the properties of the material (e.g., viscosity and/or other temperature-dependent properties, glass transition temperature), differences in the properties of the material when cured versus when uncured, the geometry of the object (e.g., thickness, feature size), and/or any other relevant considerations.

FIGS. 8A-8C illustrate representative examples of dynamic temperature profiles 800-804 that can be implemented by a temperature management mechanism, in accordance with embodiments of the present technology. For example, FIG. 8A shows a linear temperature profile 800 in which the target temperature decreases with increasing rotation speed according to a linear function. FIG. 8B shows a non-linear temperature profile 802 in which the temperature decreases with increasing rotation speed according to a non-linear function, such as an exponential function or polynomial function. FIG. 8C shows another non-linear temperature profile 804 in which the temperature decreases with increasing rotation speed according to a step function. Optionally, the temperature profiles 800-804 can be combined with each other in any suitable manner to produce a hybrid temperature profile.

Figure 9:
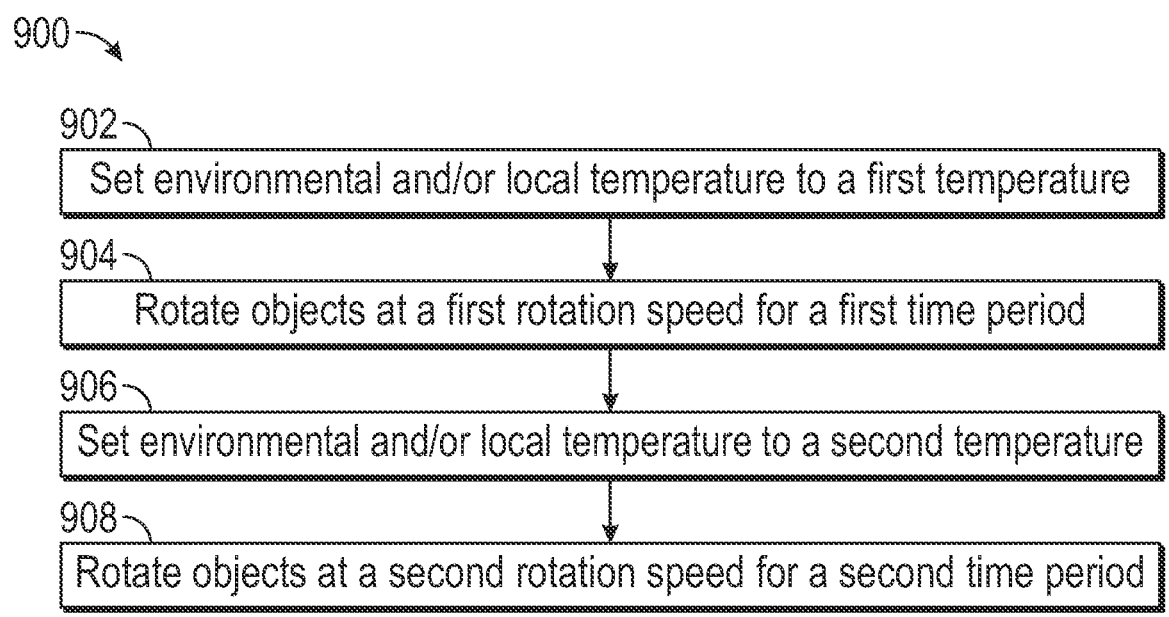
FIG. 9 is a flow diagram illustrating a method for managing temperature during post-processing of additively manufactured objects, in accordance with embodiments of the present technology.

FIG. 9 is a flow diagram illustrating a method 900 for managing temperature during post-processing of additively manufactured objects, in accordance with embodiments of the present technology. The method 900 can be performed by any embodiment of the systems and devices described herein, such as the system 400 of FIGS. 4A-4E. In some embodiments, the method 900 is performed by a system including a temperature management mechanism incorporating the energy sources of FIGS. 5A-5E, the heated and/or cooled gases of FIG. 6, and/or the temperature-controlled devices of FIGS. 7A-7D. Optionally, some or all of the steps of the method 900 can be implemented as computer-readable instructions (e.g., program code) that are configured to be executed by one or more processors of a controller (e.g., the controller 432 of FIG. 4A).

The method 900 begins at block 902 with setting an environmental and/or local temperature to a first temperature. The first temperature can be an elevated temperature, such as a temperature greater than or equal to 30° C., 40° C., 50° C., 60° C., 70° C., 80° C., 90° C., 100° C., 110° C., or 120° C. Accordingly, block 902 can include causing a heat source to increase its heat output and/or causing a cooling device to decrease its cooling output so as to produce the elevated temperature. In some embodiments, the first temperature is sufficiently high to reduce the viscosity of the excess material on the objects, but is sufficiently low to avoid curing (e.g., post-curing) the objects, in embodiments where the objects are susceptible to thermal curing.

At block 904, the method 900 continues with rotating the objects at a first rotation speed for a first time period. In some embodiments, the first rotation speed is sufficiently high to separate the heated excess material from the objects, but sufficiently low to prevent or reduce deformation (e.g., elastic and/or plastic deformation) of the objects. For example, the first rotation speed can be no more than 400 RPM, 300 RPM, 200 RPM, 100 RPM, or 50 RPM. In some embodiments, the first rotation speed is selected to generate a force of no more than 450 g, 400 g, 350 g, 300 g, 250 g, 200 g, 150 g, 100 g, or 50 g. The first time period can be at least 30 seconds, 1 minute, 2 minutes, 3 minutes, 4 minutes, 5 minutes, 10 minutes, 20 minutes, or 30 minutes.

At block 906, the method 900 can subsequently include setting the environmental and/or local temperature to a second temperature. The second temperature can be lower than the first temperature, e.g., by at least 10° C., 20° C., 30° C., 40° C., 50° C., 60° C., 70° C., 80° C., 90° C., or 100° C. For example, the second temperature can be no greater than 110° C., 100° C., 90° C., 80° C., 70° C., 60° C., 50° C., 40° C., 30° C., 20° C., 10° C., or 0° C. Accordingly, block 904 can include causing a heat source to decrease its heat output and/or causing a cooling device to increase its cooling output so as to produce the lowered temperature. In some embodiments, the second temperature is sufficiently low to increase the stiffness of the objects to resist deformation, but sufficiently high such that excess material on the objects is still removable via centrifugation.

At block 908, the method 900 continues with rotating the objects at a second rotation speed for a second time period. In some embodiments, the second rotation speed is higher than the first rotation speed, e.g., by at least 10 RPM, 25 PM, 50 RPM, 75 RPM, 100 RPM, 200 RPM, or 500 RPM. For example, the second rotation speed can be greater than or equal to 100 RPM, 200 RPM, 300 RPM, 400 RPM, or 500 RPM. In some embodiments, the second rotation speed is selected to generate a force of at least 100 g, 150 g, 200 g, 250 g, 300 g, 350 g, 400 g, 450 g, or 500 g. The second time period can be at least 30 seconds, 1 minute, 2 minutes, 3 minutes, 4 minutes, 5 minutes, 10 minutes, 20 minutes, or 30 minutes.

The method 900 of FIG. 9 can be modified in many different ways. For example, in other embodiments, the first temperature of block 902 can be lower than or equal to the second temperature of block 906. Alternatively or in combination, the first rotation speed of block 904 can be higher than or equal to the second rotation speed of block 908. Optionally, the method 900 can include additional steps, such as setting the environmental and/or local temperature to a third temperature, and rotating the objects at a third rotation speed for a third time period, and so on.

As previously discussed, the energy sources and/or temperature management mechanisms can be configured to selectively heat, cool, and/or cure a targeted portion of an additive manufactured object to selectively alter one or more material properties of that portion. For example, the selective heating, cooling, and/or curing can be applied to achieve any of the following alterations: increasing or decreasing a stiffness of the targeted portion, increasing or decreasing brittleness of the targeted portion, increasing or decreasing a strength of the targeted portion (e.g., fracture strength, yield strength, etc.), increasing or decreasing a viscosity of the targeted portion, altering a phase of the targeted portion (e.g., from a first crystalline form to a second crystalline form, from an amorphous phase to a crystalline phase, from a crystalline phase to an amorphous phase), or combinations thereof.

In some embodiments, the selective heating, cooling, and/or curing is applied to increase the brittleness of a targeted portion of the object to make the targeted portion easier to fracture. For example, referring again to FIG. 3A, the targeted portion can include part of the sacrificial section 306, such as the support structures 308 and/or the raft 310. As previously described, the support structures 308 can be designed to fracture to make it easier to cleanly separate the object 300 from the raft 310 during post-processing. Accordingly, the support structures 308 can be made of a material that becomes more brittle or is otherwise weakened when heated, cooled, and/or cured.

In some embodiments, the remaining, non-targeted portion of the object is substantially unaltered by the heating, cooling, and/or curing, or is altered but to a lesser extent than the targeted portion. For example, referring again to FIG. 3A, it may be beneficial or necessary to maintain the functional section 304 of the object 300 in its original state while making the support structures 308 more brittle. In some embodiments, the targeted portion of the object is made of a first material that is altered by the heating, cooling, and/or curing, while the remaining portion of the object is made of a second material that is substantially unaffected by the heating, cooling, and/or curing. For example, the targeted portion can be made of a material that is heated and/or cured when exposed to radiation having a particular wavelength, while the remaining portion can be made of a different material that exhibits little or no heating and/or curing by radiation of that wavelength. As another example, the targeted portion can be made of a material having a higher thermal conductivity and thus is relatively easy to heat or cool, while the remaining portion can be made of a material having a lower thermal conductivity and thus is more resistant to environmental and/or localized heating or cooling.

In some embodiments, the targeted and remaining portions of the objects are made of the same material, but are shaped and/or positioned in such a way that the targeted portion is preferentially heated, cooled, and/or cured before the remaining portion. For example, the targeted portion can be located closer to the component that performs the heating, cooling, and/or curing than the remaining portion. Referring again to FIG. 3A, selective heating or curing of the sacrificial section 306 can be achieved by applying heating or and cooling via a temperature-controlled device (e.g., the devices 702a of FIG. 7A) positioned adjacent or near the build platform 302, such that the sacrificial section 306 is heated or cooled before the functional section 304. Additionally, thinner and/or smaller components (e.g., the raft 310 and/or support structures 308) can heat or cool faster than thicker and/or larger components (the functional section 304). Optionally, a boundary region 314 made of a material with relatively low thermal conductivity can be interposed between the functional section 304 and the sacrificial section 306 to insulate the functional section 304 from heating or cooling.

Once the targeted portions have been weakened as discussed above, the targeted portions can be partially or completely fractured to separate the object from the build platform (or other substrate). In some embodiments, the fracturing is performed manually by a human operator. Alternatively, the systems described herein can be configured to apply forces to the objects to automatically fracture the targeted portions. For example, the objects can be rotated at rotation speeds that produce forces sufficient to break the targeted portions without damaging the remaining portions of the object, such as speeds of at least 50 RPM, 100 RPM, 150 RPM, 200 RPM, 250 RPM, 300 RPM, 350 RPM, 400 RPM, 450 RPM, or 500 RPM. In embodiments where the targeted portions are support structures, the rotation can break all of the support structures so that the objects are completely separated from the build platform and are ready for extraction. Alternatively, the rotation can break only some of the support structures (e.g., at least 25%, 50%, 75%, 80%, 90%, 95%, or 99% of the support structures) so that the objects remain attached to the build platform but can be easily detached in subsequent process steps.

Figure 10A:
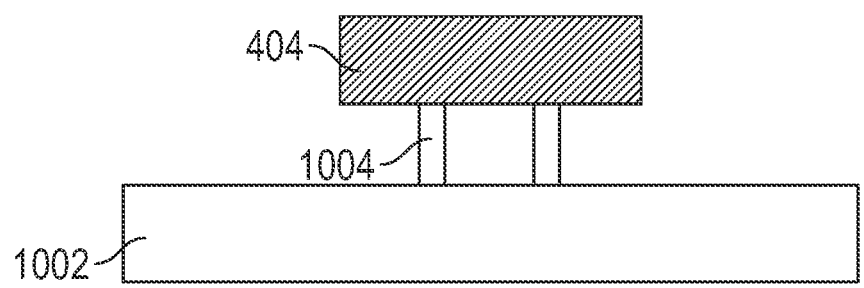
FIGS. 10A and 10B are partially schematic illustrations of a build platform configured to automatically fracture support structures of an additively manufactured object, in accordance with embodiments of the present technology.
Figure 10B:
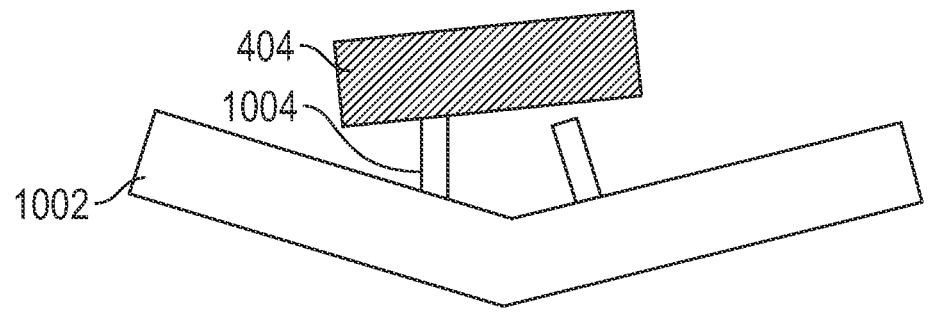

FIGS. 10A and 10B are partially schematic illustrations of a build platform 1002 configured to automatically fracture support structures 1004 of an additively manufactured object 404, in accordance with embodiments of the present technology. The build platform 1002 is made partially or entirely out of a shape memory material (e.g., a shape memory alloy or polymer). Thus, the build platform 1002 can transition from a deformed configuration to a shape memory configuration upon application of energy (e.g., heat). For example, the shape memory configuration can be the curved and/or angled shape shown in FIG. 10B, while the deformed configuration can be the flattened shape shown in FIG. 10A. The build platform 1002 can be placed in the deformed (flattened) configuration so it can be used as a substrate for building the object 404 and support structures 1004. Subsequently, when it is time to separate the object 404 from the build platform 1002, the build platform 1002 can be heated (e.g., using any of the techniques described above with respect to FIGS. 5A-7D) to transform the build platform 1002 back into the shape memory (curved and/or angled) configuration. The transformation can place stresses on the support structures 1004 that cause some or all of the support structures 1004 to break. This approach can be used in embodiments where the support structures 1004 have already been weakened by the selectively heating, curing, or cooling discussed above, or in embodiments where the support structures 1004 still have their original material properties.

Figure 10C:
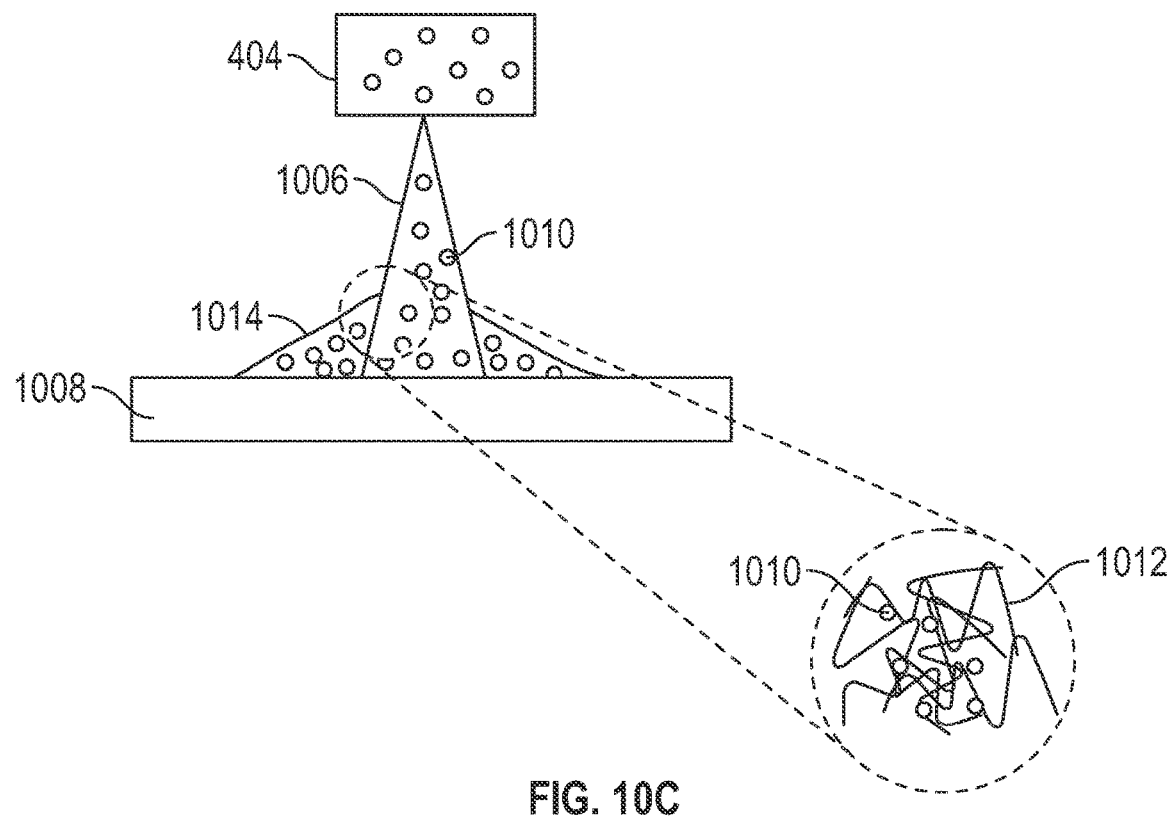
FIGS. 10C and 10D are partially schematic illustrations of an additively manufactured object including support structures that are rendered more brittle through diffusion processes, in accordance with embodiments of the present technology.
Figure 10D:
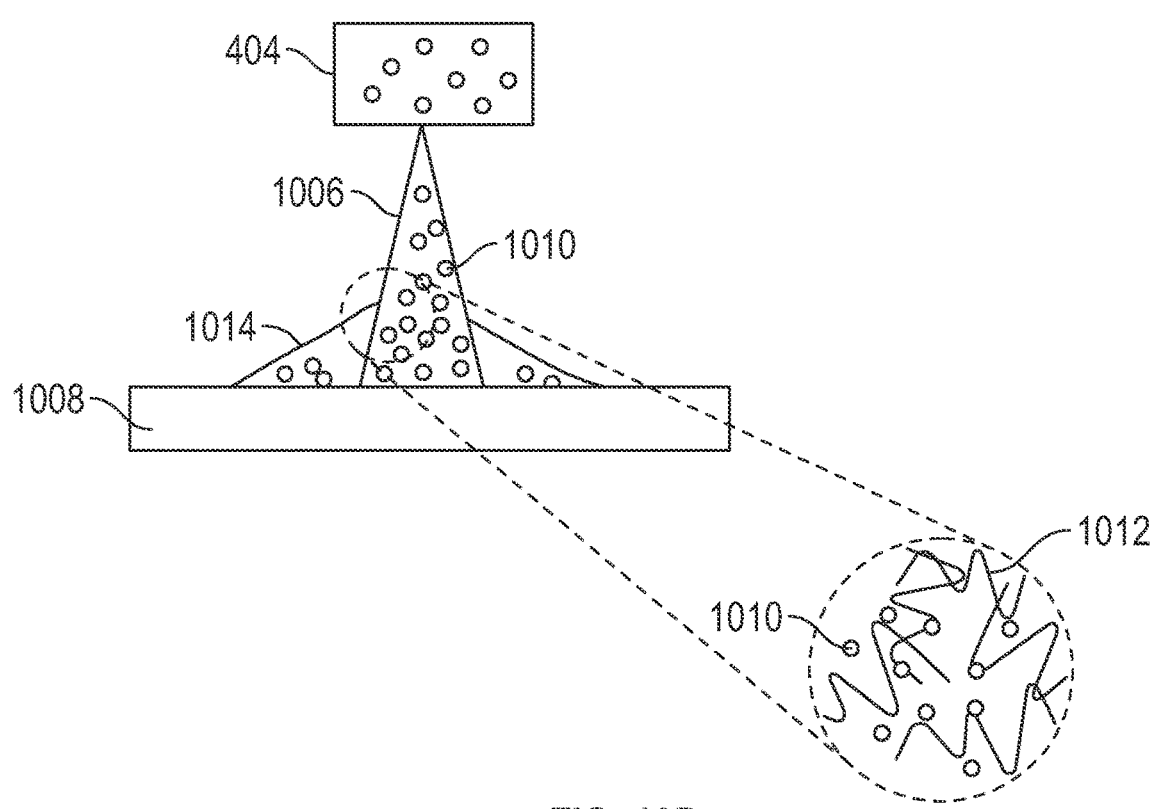

FIGS. 10C and 10D are partially schematic illustrations of an additively manufactured object 404 including support structures 1006 that are rendered more brittle through diffusion processes, in accordance with embodiments of the present technology. Referring first to FIG. 10C, the object 404 is connected to a build platform 1008 via one or more support structures 1006. The additively manufactured object 404 and support structures 1006 can be made partially or entirely out of a resin including a plurality of low molecular weight components 1010 (e.g., monomers and/or oligomers). As shown in the FIG. 10C inset, the low molecular weight components 1010 can be polymerized into a tight network 1012 to form the object 404 and support structures 1006.

After the additive manufacturing process, excess resin 1014 including unpolymerized low molecular weight components 1010 can remain on the surfaces of the build platform 1008 and the support structures 1006. Referring next to FIG. 10D, if the excess resin 1014 remains in contact with the support structures 1006, the low molecular weight components 1010 can migrate from the excess resin 1014 into the support structures 1006. In some embodiments, up to 5%, 10%, 20%, 30%, 40%, 50%, 60%, 70%, 80%, 90%, 95%, or 99% of the low molecular weight components 1010 initially present in the excess resin 1014 migrate into the support structures 1006.

As shown in the FIG. 10D inset, the increased local concentration of the low molecular weight components 1010 can loosen and/or plasticize the polymer network 1012 within the support structures 1006. When the object 404 and support structures 1006 are post-cured, the higher concentration of low molecular weight components 1010 in the support structures 1006 can cause the support structures 1006 to be more brittle than the rest of the object 404. Subsequently, the support structures 1006 can be selectively fractured to release the object 404 from the build platform, in accordance with any of the techniques described herein.

In some embodiments, the diffusion of the low molecular weight components 1010 from the excess resin 1014 into the support structures 1006 occurs if the excess resin 1014 is left on the support structures 1006 for a sufficiently long time period, such as a time period of at least 1 minute, 2 minutes, 5 minutes, 10 minutes, 15 minutes, 20 minutes, 30 minutes, or 1 hour. Alternatively or in combination, the object 404, support structures 1006, and/or excess resin 1014 can be heated to accelerate the migration of the lower molecular weight components 1010, such as to a temperature of at least 30° C., 40° C., 50° C., 60° C., 70° C., 80° C., 90° C., 100° C., 110° C., or 120° C. In some embodiments, the time period is shortened or even eliminated if the object 404, support structures 1006, and/or excess resin 1014 are heated. The heating can be performed using any of the embodiments described herein.

In some embodiments, the systems described herein include a material source for applying one or more materials to additively manufactured objects. For example, the material can include a wash fluid (e.g., water, solvent) that solubilizes, rinses, or otherwise facilitates removal of the excess material from the additively manufactured objects. In some embodiments, the wash fluid also serves as a thermal transfer agent for controlling the temperature of the additively manufactured objects, e.g., a heated wash fluid can be used to heat the objects, while a cold wash fluid can be used to cool the objects. As another example, the material can include a coating material that is applied to some or all of the surfaces of the object, e.g., for smoothing, aesthetics, improving mechanical properties, conferring antimicrobial resistance, and/or incorporating therapeutic agents into the object. Optionally, the system can be configured to simultaneously or sequentially apply a plurality of different materials to the object.

In some embodiments, additively manufactured objects that are exposed to water during post-processing exhibit improved mechanical properties compared to objects that are not exposed to water, such as improvements in the modulus (e.g., elastic modulus, flexural modulus), glass transition temperature, elongation to break, elongation to yield, strength, hardness, and/or stress relaxation. For example, the stress relaxation (e.g., after 24 hours) of an object that has been exposed to water during post-processing (and, optionally, post-cured) can be at least 5 MPa, 10 MPa, 15 MPa, 20 MPa, 30 MPa, 40 MPa, or 50 MPa greater than the stress relaxation of an object that has not been exposed to water. In some embodiments, an object that has been exposed to water during post-processing (and, optionally, post-cured) can exhibit a stress relaxation after 24 hours within a range from 50 MPa to 60 MPa, and/or at least 30 MPa, 40 MPa, 50 MPa, 60 MPa, or 70 MPa. Stress relaxation of an object can be measured using any suitable technique known to those of skill in the art. In some embodiments, stress relaxation is measured using a 3-point bending test in a controlled environment (e.g., the temperature can be maintained constant during testing, the object can optionally be submerged in water). A constant strain can be applied to the object based on the thickness of the object, and the reduction in the force, stress, and/or modulus can be measured over time.

In some embodiments, exposure to water improves the mechanical properties of the object by plasticizing the object and/or facilitating phase separation of components (e.g., monomers or oligomers) within the object. Accordingly, the systems described herein can be used to partially or completely immerse additively manufactured objects in water to produce the desired mechanical properties. The objects can be immersed in water for a time period of at least 1 minute, 2 minutes, 5 minutes, 10 minutes, 15 minutes, 20 minutes, 30 minutes, or 1 hour. Optionally, the water can be heated, such as to a temperature of at least 30° C., 40° C., 50° C., 60° C., 70° C., 80° C., 90° C., 100° C., 110° C., or 120° C.

Figure 11A:
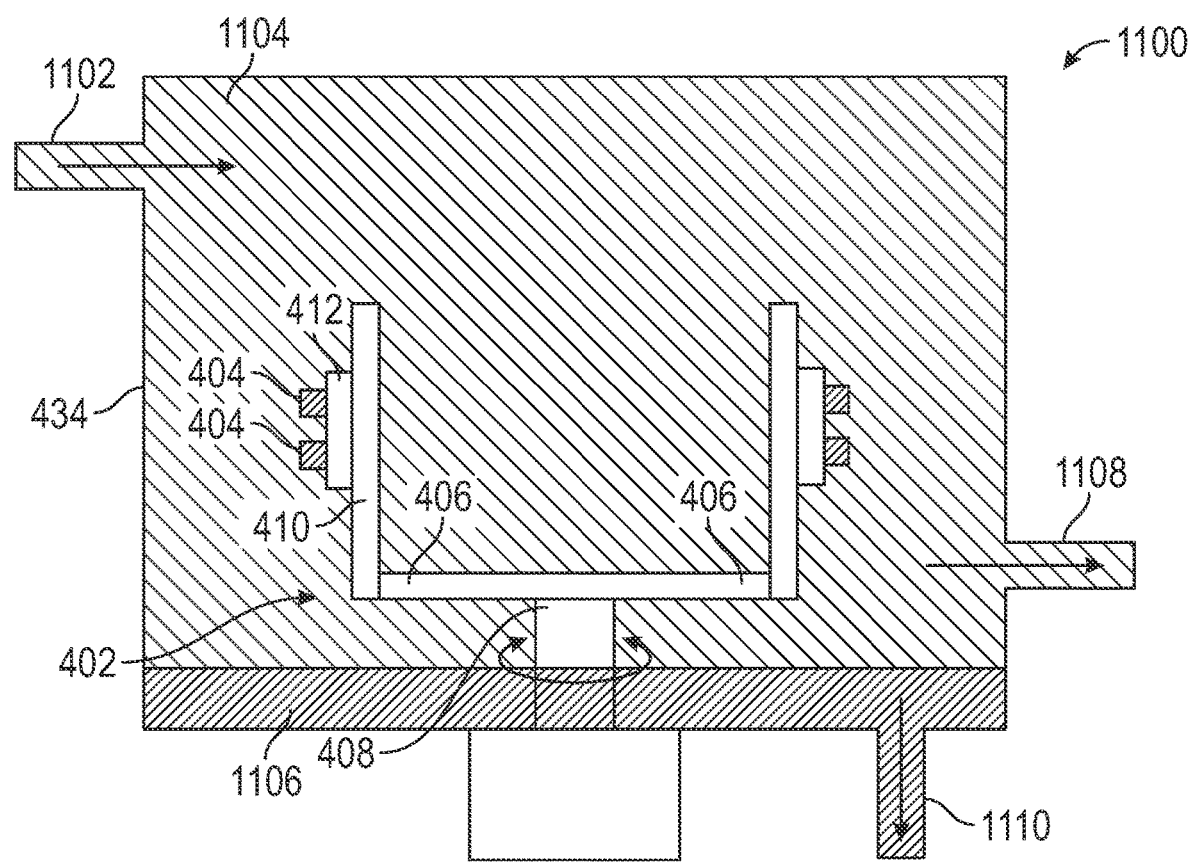
FIG. 11A is a partially schematic diagram of a system for immersing additively manufactured objects in fluid during post-processing, in accordance with embodiments of the present technology.

FIG. 11A is a partially schematic diagram of a system 1100 for immersing additively manufactured objects in fluid during post-processing, in accordance with embodiments of the present technology. The system 1100 includes an inlet 1102 for introducing a wash fluid 1104 (e.g., water, solvent) into the housing 434. The wash fluid 1104 can partially or completely fill the interior of the housing 434 such that rotor 402 and additively manufactured objects 404 are immersed in the wash fluid 1104. In some embodiments, the rotor 402 can rotate while the housing 434 is filled with the wash fluid 1104 so that excess material is removed from the objects 404 via the drag forces exerted on the objects 404 by the wash fluid 1104. Optionally, the rotor 402 can rotate at a slower rotation speed to avoid damaging the objects 404 by the increased drag forces. Alternatively, the rotor 402 can remain stationary while the wash fluid 1104 is present.

In some embodiments, the excess material 1106 removed from the objects 404 is not miscible with the wash fluid 1104. If the excess material 1106 is denser than the wash fluid 1104, it can sink to the bottom of the housing 434 once the rotor 402 stops spinning. Accordingly, the excess material 1106 can be separated from the wash fluid 1104 by draining the wash fluid 1104 and excess material 1106 out of the housing 434 via separate outlets. For example, the system 1100 can include a first outlet 1108 for draining the wash fluid 1104 and a second outlet 1110 for draining the excess material 1106. The first outlet 1108 can be located higher than the second outlet 1110 so the less dense wash fluid 1104 exits through the first outlet 1108, while the denser excess material 1106 exits through the second outlet 1110. Optionally, the second outlet 1110 can be connected to a collection device (not shown) for storing the excess material 1106 for reuse or disposal.

Optionally, the system 1100 can be used for other post-processing operations besides removing excess material from the objects 404. For example, the increased drag forces imparted by the wash fluid 1104 can be used to partially or completely separate the objects 404 from the substrate 412. As discussed above, the objects 404 can include support structures (not shown) that are designed to break when subjected to a certain amount of force. The support structures can also be made more susceptible to breakage by heating, cooling, curing, and/or diffusion processes, as previously discussed. Accordingly, the rotor 402 can spin the objects 404 while immersed in the wash fluid to fracture the support structures so that the objects 404 are completely separated from the substrate 412 and are ready for extraction. Alternatively, only some of the support structures can be fractured so that the objects 404 remain attached to the substrate 412 but can be easily detached in subsequent process steps. The amount of drag force applied to the objects 404 can be adjusted by controlling the rotation speed of the rotor 402 and/or selecting the viscosity of the wash fluid 1104. This approach advantageously allows object cleaning and separation to be performed by the same system.

Figure 11B:
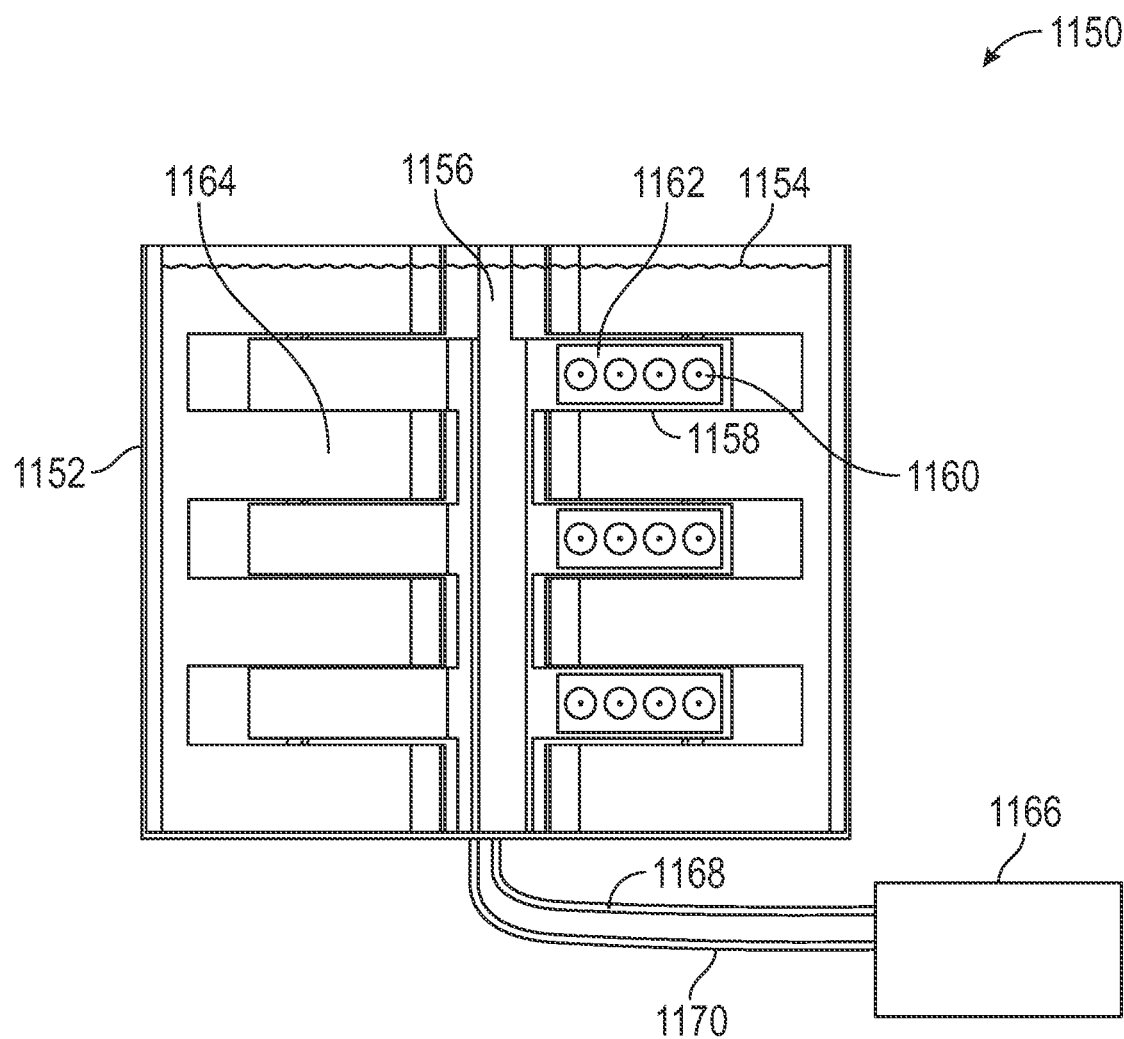
FIG. 11B is a partially schematic diagram of a system for immersing additively manufactured objects in fluid during post-processing, in accordance with embodiments of the present technology.

FIG. 11B is a partially schematic diagram of a system 1150 for immersing additively manufactured objects in fluid during post-processing, in accordance with embodiments of the present technology. The system 1150 includes a rotatable drum 1152 (e.g., a chamber, housing, barrel) having an interior space configured to be filled partially or entirely with a wash fluid 1154 (e.g., water, solvent). The system 1150 also includes a rotor 1156 positioned within the drum 1152. The rotor 1156 can include a plurality of arms 1158, with each arm 1158 supporting one or more additively manufactured objects 1160 (which can be identical or similar to the objects 404 described elsewhere herein). The objects 1160 can be coupled to substrates 1162 (e.g., build platforms, trays, plates) that are mounted to the arms 1158.

In the illustrated embodiment, the interior of the drum 1152 includes a plurality of paddles 1164. The paddles 1164 can be coupled to or integrally formed with the inner walls of the drum 1152, and can extend radially inward toward the central axis of the drum 1152. As shown in FIG. 11B, the paddles 1164 can be vertically spaced apart from each other, thus leaving gaps in between to accommodate the arms 1158 of the rotor 1156. The spacing between the paddles 1164 can provide sufficient clearance for the arms 1158 and the rotor 1156 to rotate freely within the drum 1152.

The system 1150 can also include a fluid source 1166 fluidly coupled to the interior of the drum 1152. The fluid source 1166 can include a pump (not shown) that introduces the wash fluid 1154 into the drum 1152 via an inlet 1168. The fluid source 1166 can also include or be operably coupled to at least one heat source (not shown) for heating the wash fluid 1154 to a desired temperature. The fluid source 1166 can drain the wash fluid 1154 from the drum 1152 via an outlet 1170. Optionally, the outlet 1170 can be connected to a collection device (not shown) for storing excess material removed from the objects 1160.

During operation, the drum 1152 can be rotated by an actuator (e.g., a motor—not shown). The paddles 1164 can rotate along with the drum 1152, thus pushing the wash fluid 1154 within the drum 1152 along the direction of rotation of the drum 1152. The wash fluid 1154 can apply forces to the arms 1158 of the rotor 1156 via fluid coupling, thus causing the rotor 1156 to rotate in the same direction of rotation as the drum 1152. In some embodiments, the fluid coupling causes the rotor 1156 to rotate at a rotation speed identical or similar to (e.g., within 10%) of the rotation speed of the drum 1152, such that there is little or no relative velocity between the wash fluid 1154 and the objects 1160 carried by the rotor 1156.

The rotation of the rotor 1156 can cause excess material to be removed from the objects 1160 by centrifugal separation. Optionally, the wash fluid 1154 can also act as a heat transfer agent to increase the temperature of the objects 1160, e.g., to lower the viscosity of the excess material present on the objects 1160 to facilitate removal. Moreover, in embodiments where the wash fluid 1154 is or includes water, the water can enhance or otherwise modify the mechanical properties of objects 1160 by acting as a plasticizer and/or enhancing phase separation, as described above.

Figure 12:
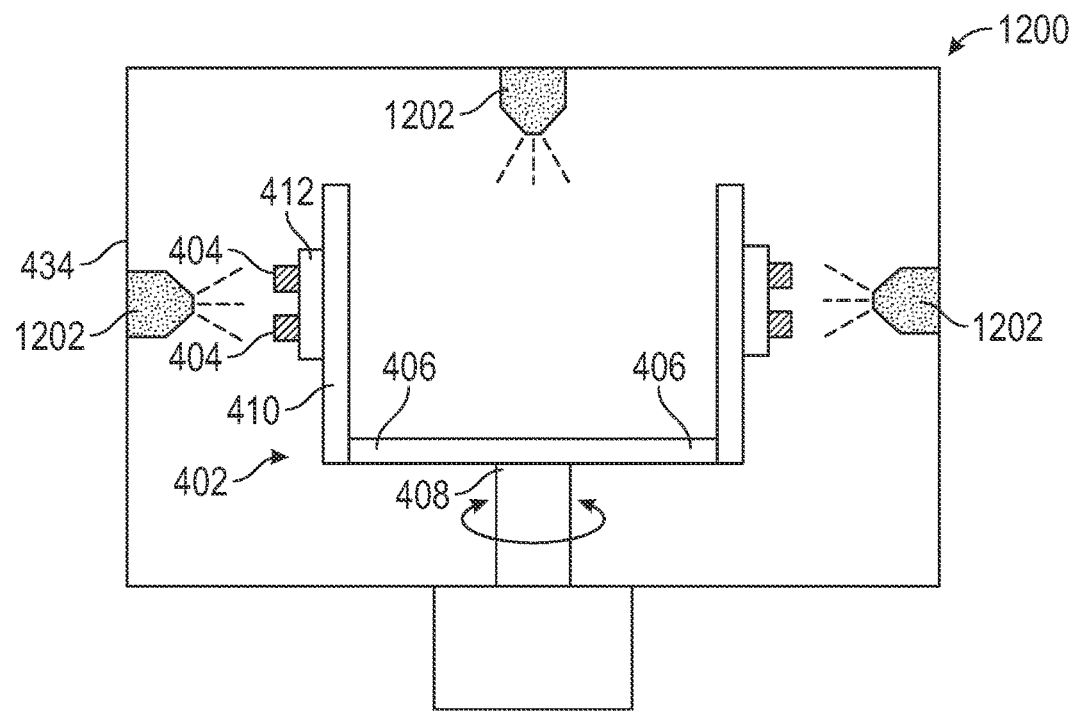
FIG. 12 is a partially schematic diagram of a system for applying material to additively manufactured objects during post-processing, in accordance with embodiments of the present technology.

FIG. 12 is a partially schematic diagram of a system 1200 for applying material to additively manufactured objects during post-processing, in accordance with embodiments of the present technology. The system 1200 includes one or more nozzles 1202 configured to spray a material (e.g., wash fluid or coating material) onto the objects 404. The nozzles 1202 can be positioned at any suitable location, such as the upper portion, the lower portion, and/or the lateral sides of the housing 434. The rotor 402 can spin the objects 404 while the material is sprayed from the nozzles 1202 so that material is applied uniformly to the objects 404, regardless of their initial locations relative to the nozzles 1202. Alternatively, the rotor 402 can remain stationary while the material is applied.

In embodiments where the material is a wash fluid, the nozzles 1202 can spray the wash fluid onto the objects 404 at a pressure that is sufficiently high to rinse excess material from the surface of the objects 404, but also sufficiently low to avoid damaging the objects 404. In embodiments where the material is a coating material, the nozzles 1202 can apply the coating material onto the objects 404 in accordance with spray coating techniques known to those of skill in the art. Optionally, the nozzles 1202 can alternatively or additionally be used to blow compressed air onto the objects 404 to remove excess material and/or evaporate residual wash fluid.

Figure 13:
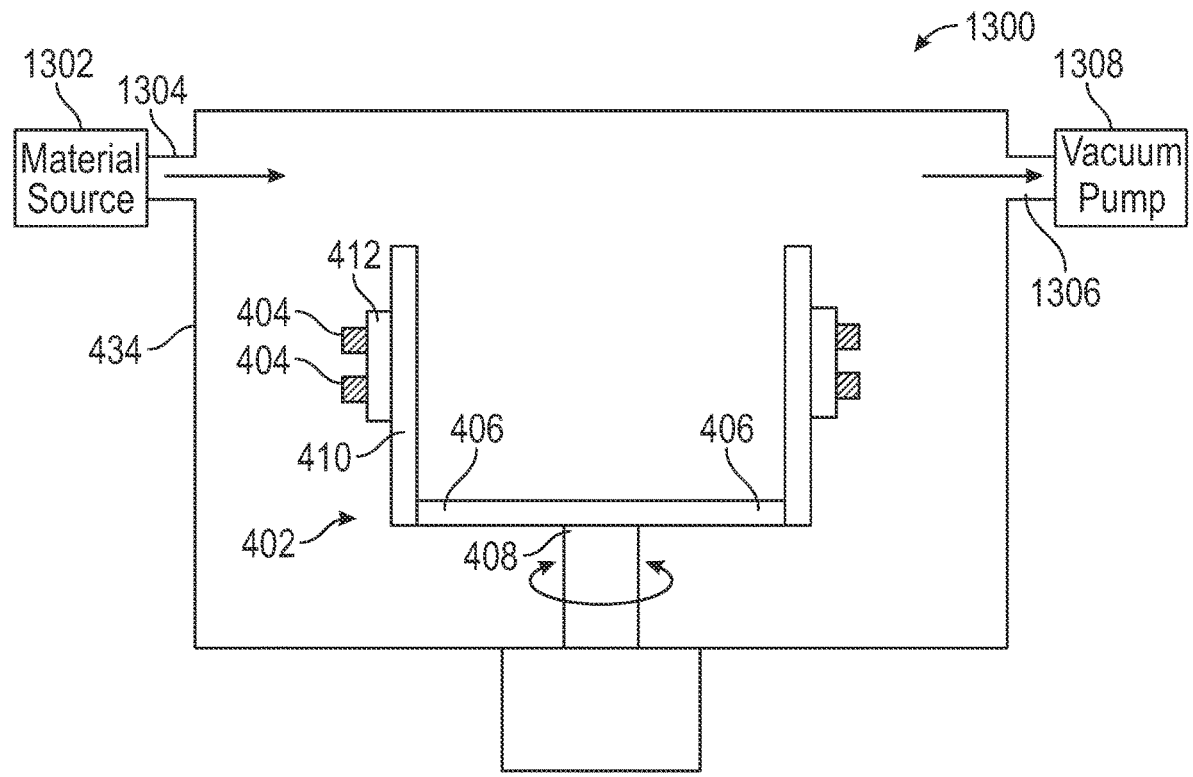
FIG. 13 is a partially schematic diagram of another system for applying material to additively manufactured objects during post-processing, in accordance with embodiments of the present technology.

FIG. 13 is a partially schematic diagram of another system 1300 for applying material to additively manufactured objects during post-processing, in accordance with embodiments of the present technology. The system 1300 can be used to apply a coating material to the objects 404 using vacuum deposition (e.g., chemical vapor deposition, physical vapor deposition, etc.) or other material deposition techniques known to those of skill in the art. The system 1300 includes a material source 1302 that supplies a coating material into the interior of the housing 434 via an inlet 1304. The coating material can be provided in any suitable format, such as a powder, a liquid, a resin, or a vapor. The system 1300 can also include an outlet 1306 and vacuum pump 1308 for withdrawing air from the interior of the housing 434 to create a negative pressure environment. The locations of the inlet 1304 and outlet 1306 can be varied as desired to promote uniform deposition of the coating material onto the objects 404. The rotor 402 can be rotating while the coating material is introduced, or can remain stationary. The system 1300 can optionally include additional components for facilitating material deposition onto the objects 404 that are not shown in FIG. 13. For example, the system 1300 can include a temperature management mechanism including heat sources and/or cooling devices for producing an environmental temperature suitable for the material deposition process. Additionally, the system 1300 can include inlets for introducing an inert gas into the housing 434, if necessary or beneficial for the material deposition process.

In some embodiments, the systems described herein include a collection device for collecting excess material removed from additively manufactured objects. The collected material can be reused to fabricate additional additively manufactured objects, or can be disposed. The collection device can include containers (e.g., catch pans, reservoirs, bottles, buckets, etc.) configured to hold the excess material, as well as pipes, drains, funnels, and/or other structures configured to divert the excess material into the containers. Additionally, the collection device can include filters, traps, or similar components to separate the excess material from debris and/or other unwanted substances. The excess material can be directed into the containers by gravity, vacuum pressure, forces from wash fluids and/or compressed air, and/or any other suitable technique. Optionally, the collection device can be configured to separate the excess material from wash fluid and/or other materials that may be present, using techniques such as gravimetric separation, filtering, distillation, etc.

Figure 14:
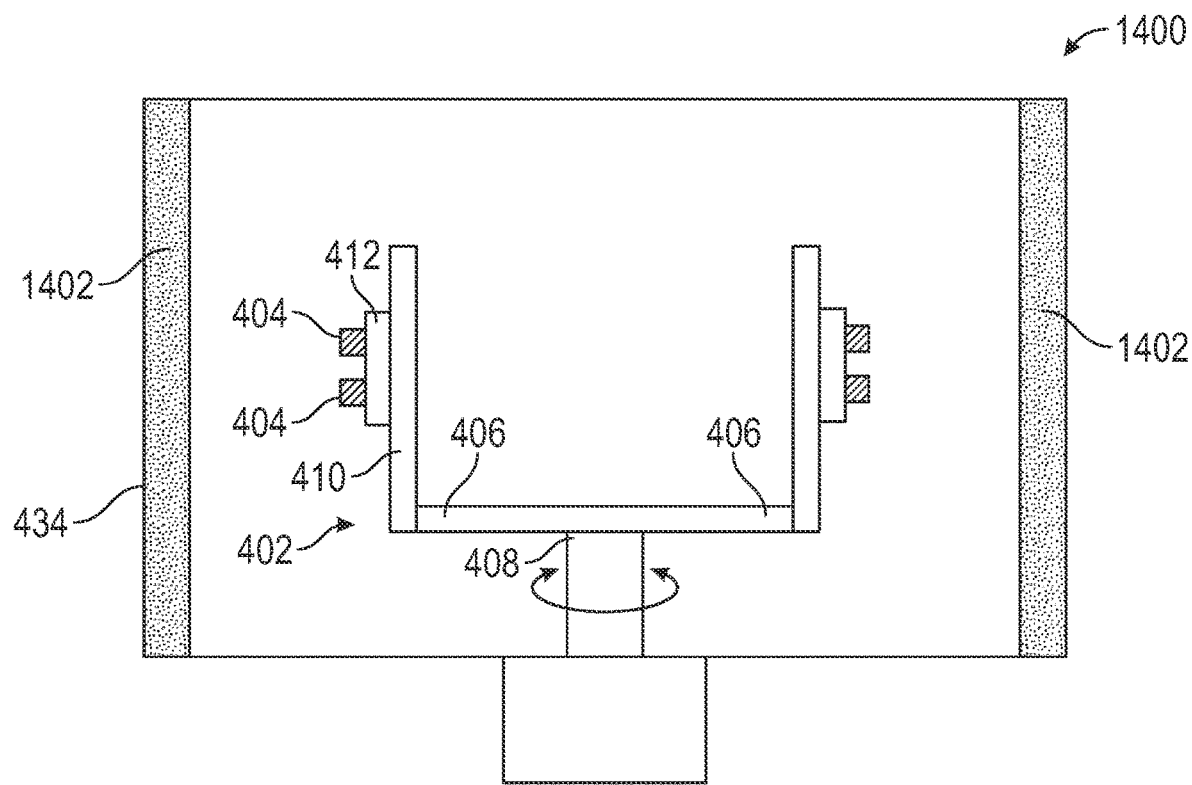
FIG. 14 is a partially schematic illustration of a system including a liner for collecting excess material removed from additively manufactured objects, in accordance with embodiments of the present technology.

FIG. 14 is a partially schematic illustration of a system 1400 including a liner 1402 for collecting excess material removed from additively manufactured objects, in accordance with embodiments of the present technology. In the illustrated embodiment, the liner 1402 is positioned adjacent or near the lateral sides of the housing 434 to capture any excess material that is flung outward from the objects 404 by rotation of the rotor 402. Alternatively or in combination, the liner 1402 can be disposed at other locations within the housing 434, such as the upper portion and/or the lower portion of the housing 434. In some embodiments, the liner 1402 is made of an absorbent material that retains the excess material removed from the objects 404 by rotation, such as fiberglass, cloth, or sponge-like materials. In such embodiments, the excess material can be recovered by squeezing out the liner 1402. Alternatively, the liner 1402 can be made of a non-absorbent material (e.g., a plastic film). In such embodiments, the excess material can collect on the surface of the liner 1402 via adhesion and/or surface tension, and can subsequently be recovered by scraping the material off the liner 1402. Optionally, in embodiments where the system 1400 includes an energy source, the liner 1402 can be partially or fully transparent to the wavelength of the energy to avoid interfering with energy transmission.

In some embodiments, the systems described herein are configured to apply variable forces to the additively manufactured objects to facilitate removal of excess material. As previously discussed with respect to FIGS. 3A and 3B, depending on the geometry of the object, excess material can accumulate at many different locations, such that applying forces to the object in a single direction (e.g., by rotating the object around a single axis of rotation) may not be sufficient to remove all the excess material from the object. Accordingly, the systems described herein can be configured to apply forces to the object in multiple directions by rotating the object around multiple different axes of rotation and/or otherwise allowing the object to have multiple degrees of freedom of movement while the rotor is spinning.

Figure 15A:
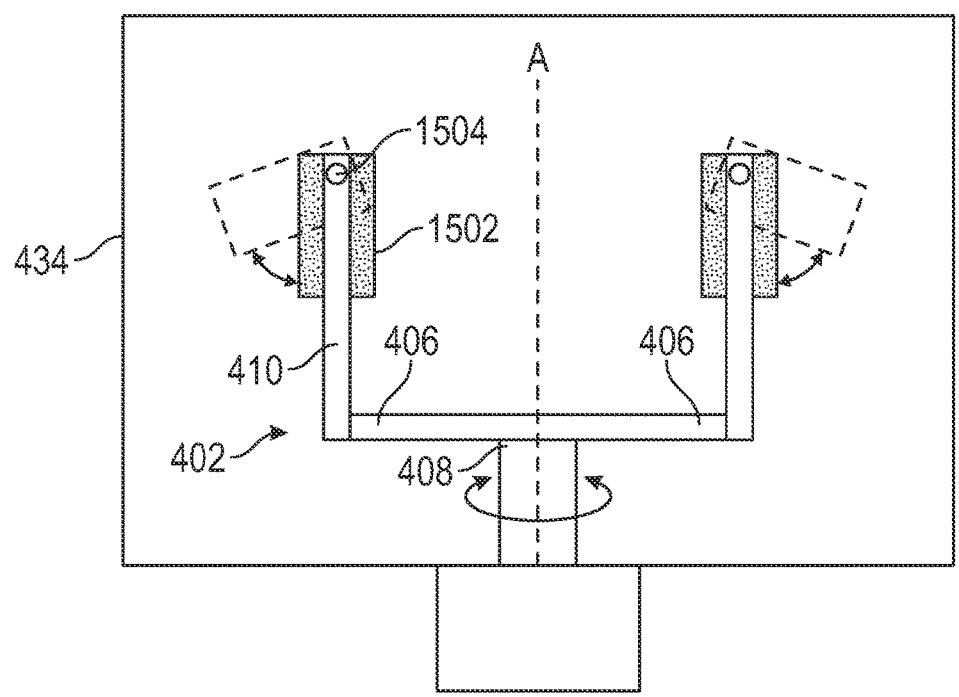
FIG. 15A is a partially schematic illustration of a system for applying variable forces to additively manufactured objects during post-processing, in accordance with embodiments of the present technology.

FIG. 15A is a partially schematic illustration of a system 1500 for applying variable forces to additively manufactured objects during post-processing, in accordance with embodiments of the present technology. In the illustrated embodiment, the objects are disposed within containers 1502 (e.g., boxes, buckets, etc.), which may be identical or generally similar to the container 418 of FIGS. 4C and 4D. The containers 1502 can be coupled to the mounting structures 410 via hinges 1504. The hinges 1504 can allow the container 1502 to rotate relative to the mounting structure 410 around a first axis of rotation (e.g., a Z-axis—FIG. 15B). In some embodiments, the system 1500 includes actuators (e.g., motors—not shown) configured to actively rotate the container 1502 around the first axis of rotation while the rotor 402 is spinning about the central axis A. Accordingly, the direction of the forces applied to objects within the container 1502 can be dynamically adjusted to drive excess material off of different portions of the objects. Alternatively, the container 1502 can passively rotate around the first axis of rotation.

In some embodiments, the system 1500 is configured to rotate the container around at least one additional axis of rotation, such as a second axis of rotation and/or a third axis of rotation. The second and third axes can be the X- and Y-axes shown in FIG. 15B. In such embodiments, the container 1502 can be coupled to the mounting structure 410 via additional hinges (not shown) that allow the container 1502 to rotate around the second and/or third axes. The system 1500 can include additional actuators to actively rotate the container 1502 around the second and/or third axes, or the container 1502 can passively rotate around the second and/or third axes.

Figure 15B:
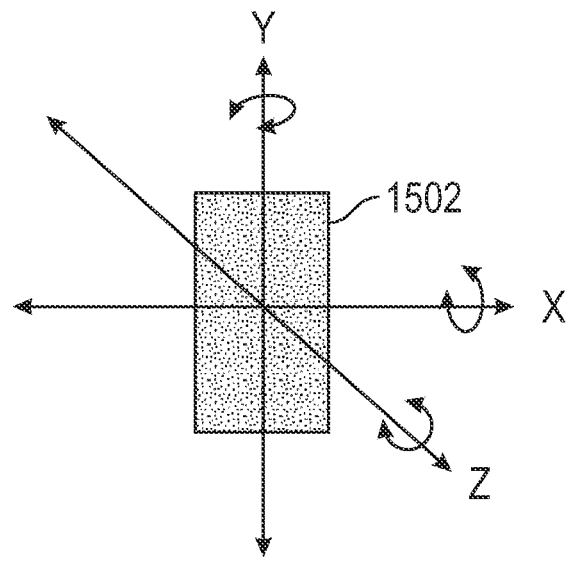
FIG. 15B is a schematic illustration of a container of the system of FIG. 15A.

Although FIGS. 15A and 15B are illustrated and described in terms of objects carried within containers 1502, in other embodiments, the containers 1502 can be omitted and the system 1500 can instead be modified to rotate objects carried on a substrate (e.g., the substrate 412 of FIG. 4A). In such embodiments, the substrate can be directly attached to the mounting structure 410 via hinges permitting active or passive rotation around one, two, or three different axes of rotation, as discussed above.

Figure 16:
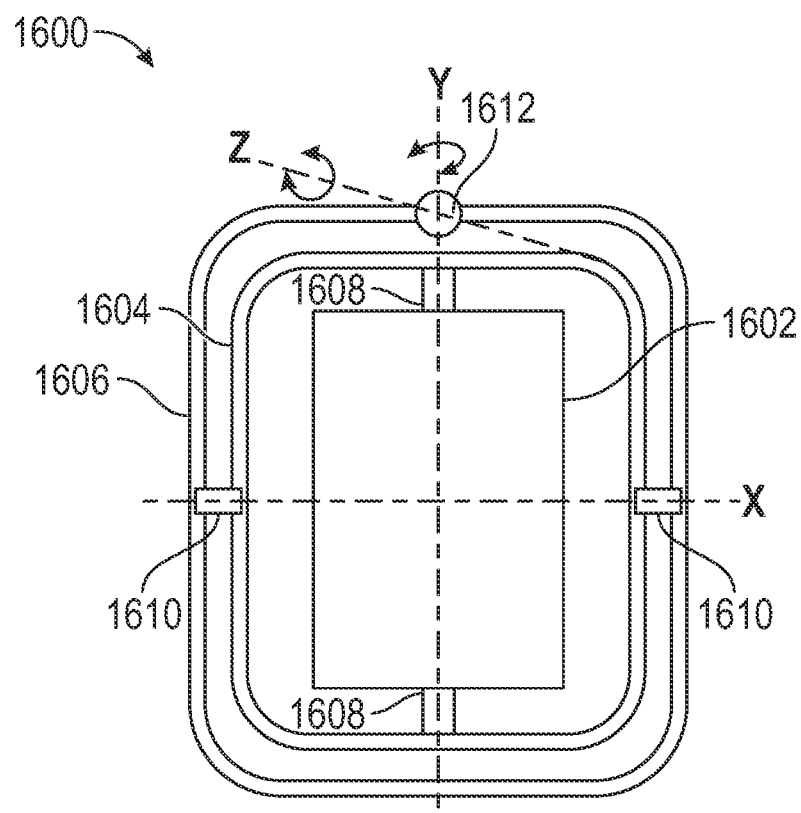
FIG. 16 is a partially schematic illustration of a gimbal assembly for rotating additively manufactured objects around multiple axes, in accordance with embodiments of the present technology.

FIG. 16 is a partially schematic illustration of a gimbal assembly 1600 ("assembly 1600") for rotating additively manufactured objects around multiple axes, in accordance with embodiments of the present technology. The assembly 1600 can be incorporated into any of the systems and devices described herein. In the illustrated embodiment, the objects are disposed within a container 1602, which may be identical or generally similar to the container 418 of FIGS. 4C and 4D and/or the container 1502 of FIGS. 15A and 15B. The container 1602 is rotatably coupled to a first frame 1604 (e.g., an inner gimbal frame), which in turn is rotatably coupled to a second frame 1606 (e.g., an outer gimbal frame). For example, the container 1602 can be connected to the first frame 1604 via one or more first actuators 1608, and the first frame 1604 can be connected to the second frame 1606 via one or more second actuators 1610. In the illustrated embodiment, the first actuators 1608 are configured to actively rotate the container 1602 relative to the first frame 1604 around a first axis of rotation (e.g., a Y-axis), and the second actuators 1610 are configured to actively rotate the first frame 1604 and the container 1602 relative to the second frame 1606 around a second axis of rotation (e.g., an X-axis).

The second frame 1606 can include an attachment site 1612 for coupling to a rotor (e.g., to the mounting structure 410 of the rotor 402 of FIG. 4A). The attachment site 1612 can be a fixed or rotatable connection. In embodiments where the attachment site 1612 is a rotatable connection, the attachment site 1612 can be or include a third actuator for rotating the second frame 1606, first frame 1604, and container 1602 around a third axis of rotation (e.g., a Z-axis). Accordingly, the gimbal assembly 1600 allows the objects within the container 1602 to be dynamically adjusted with up to three degrees of freedom in rotation.

Although FIG. 16 is illustrated and described in terms of objects carried within the container 1602, in other embodiments, the container 1602 can be omitted and the assembly 1600 can instead be modified to rotate objects carried on a substrate (e.g., the substrate 412 of FIG. 4A). In such embodiments, the substrate can be directly attached to the first frame 1604 via the first actuators 1608.

FIG. 17A is a partially schematic front view of another system 1700 for applying variable forces to additively manufactured objects during post-processing, in accordance with embodiments of the present technology. In the illustrated embodiment, the objects 404 are coupled on a flexible substrate 1702 (e.g., a flexible build platform, film, sheet, etc.). The flexible substrate 1702 can be a generally flat component (FIG. 17B) that can bend to conform to the shape of the component to which it is mounted. For example, the flexible substrate 1702 can be made of a polymeric material or a thin metal sheet (e.g., spring steel or nitinol).

As shown in FIG. 17A, the flexible substrate 1702 is coupled to a drum 1704, which in turn is coupled to the mounting structure 410 via rotatable connections 1706. The flexible substrate 1702 can be secured to the drum 1704 via vacuum, adhesives, fasteners, magnets, or any other suitable attachment mechanism. The drum 1704 is an elongate structure configured to support and rotate the flexible substrate 1702. Although the drum 1704 is depicted as having a circular cross-sectional shape, in other embodiments, the drum 1704 can have a different cross-sectional shape, such as an oval, square, rectangular, triangular, or other shape. Additionally, although FIG. 17A shows a single drum 1704 attached to each mounting structure 410, in other embodiments, the system 1700 can include multiple vertically stacked drums 1704 attached to each mounting structure 410.

As the rotor 402 rotates around the central axis A, the drum 1704 can actively rotate around its longitudinal axis B (FIG. 17D), thus dynamically altering the direction of the forces applied to each object 404. In some embodiments, the drum 1704 rotates more slowly than the rotor 402, such that excess material removed from the objects 404 is flung primarily outward towards the lateral sides of the housing 434. For example, the drum 1704 can rotate at a speed less than or equal to 60 RPM, 50 RPM, 40 RPM, 30 RPM, 20 RPM, 10 RPM, or 5 RPM. The slower rotation speed of the drum 1704 can also be beneficial for ensuring that the flexible substrate 1702 does not become detached from the surface of the drum 1704. Additionally, as best seen in FIG. 17C, the objects 404 can be spaced laterally and vertically apart on the flexible substrate 1702 so that excess material removed from one object 404 does not land on any other object 404.

Figure 17D:
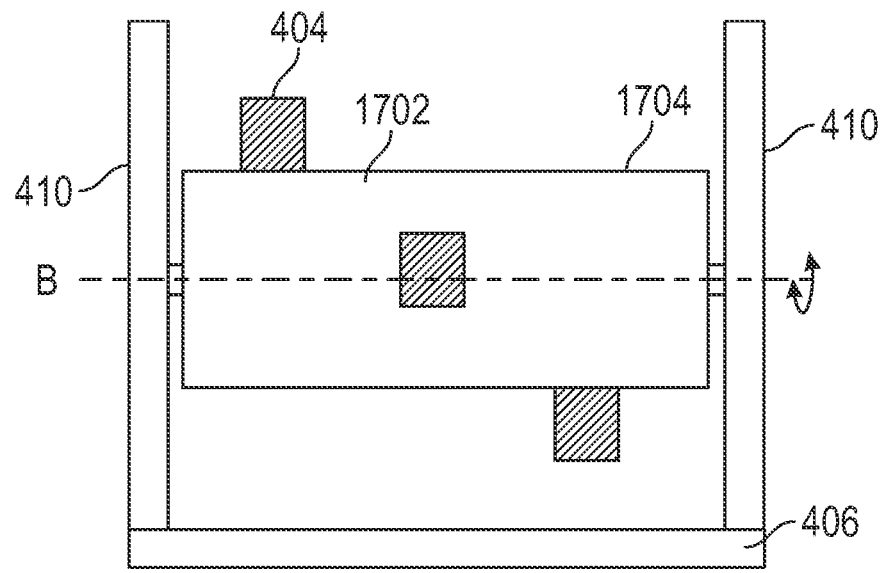
FIGS. 17D and 17E are partially schematic side views of an individual drum of the system of FIG. 17A.
Figure 17E:
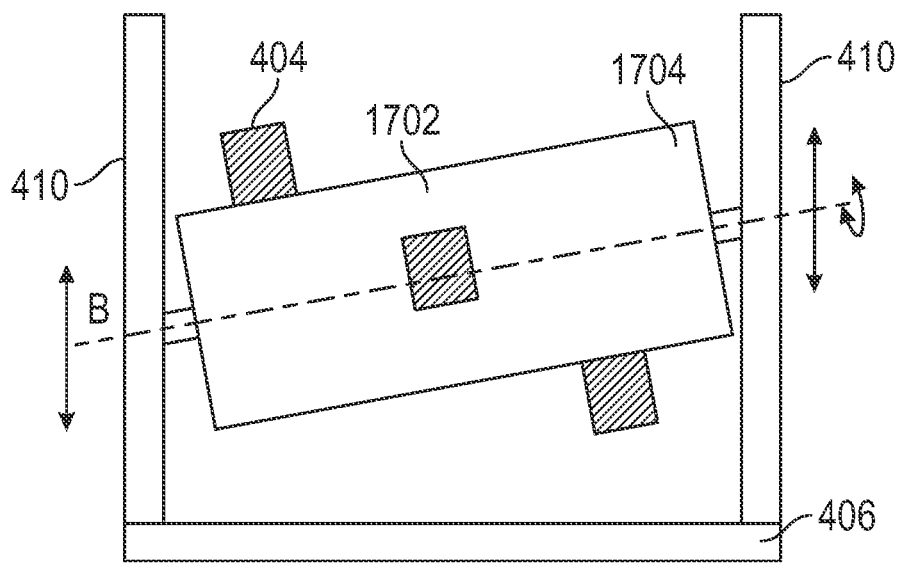

Referring next to FIG. 17D, which is a partially schematic side view of an individual drum 1704, the drum 1704 can be arranged so that its ends are at the same vertical height along the mounting structure 410, such that the longitudinal axis B of the drum 1704 is substantially horizontal. Alternatively, as shown in FIG. 17E, the drum 1704 can be arranged so that its ends are at different vertical heights along the mounting structure 410, such that the longitudinal axis B of the drum 1704 is offset from horizontal. Optionally, one or both ends of the drum 1704 can include actuators (not shown) for moving upward and/or downward along the mounting structure 410 so the angle of the drum 1704 can be actively adjusted. This configuration can provide additional degrees of freedom of movement for altering the forces applied to the objects 404.

Figure 18:
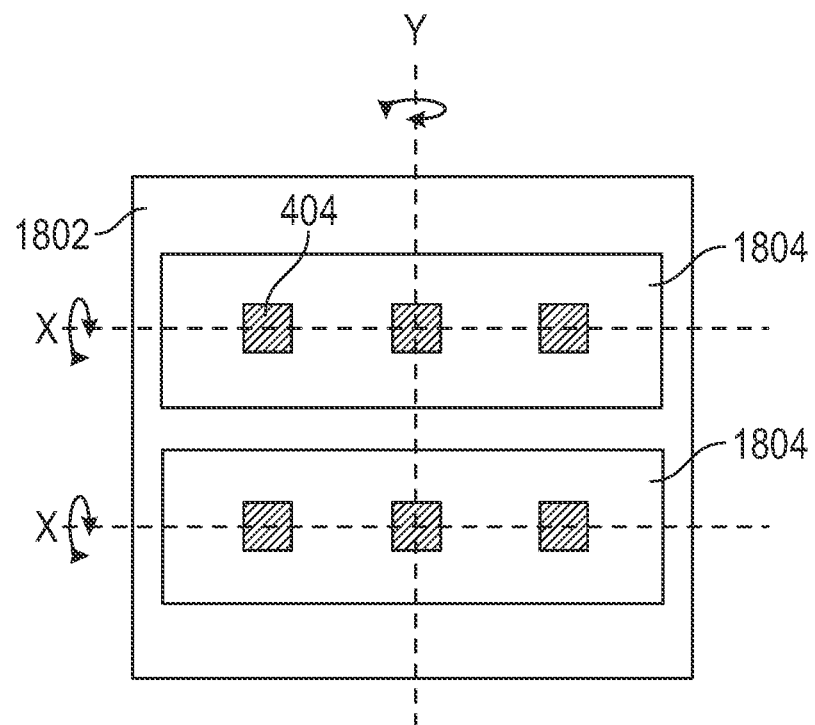
FIG. 18 is a partially schematic top view of a build platform including movable segments for applying variable forces to additively manufactured objects, in accordance with embodiments of the present technology.

FIG. 18 is a partially schematic top view of a build platform 1802 including movable segments 1804 for applying variable forces to additively manufactured objects, in accordance with embodiments of the present technology. The segments 1804 can be rotatable plates, insets, sheets, etc., carrying the objects 404. During the additive manufacturing process, the segments 1804 can be held in a fixed position and orientation to provide a flat, stable substrate for printing, e.g., using electromagnets, fasteners, vacuum, or other suitable mechanisms. Subsequently, during post-processing, the segments 1804 can be released so they can rotate relative to the rest of the build platform 1802. For example, in the illustrated embodiment, the segments 1804 can rotate around a first axis of rotation (e.g., an X-axis) and/or a second axis of rotation (e.g., a Y-axis).

Figure 19:
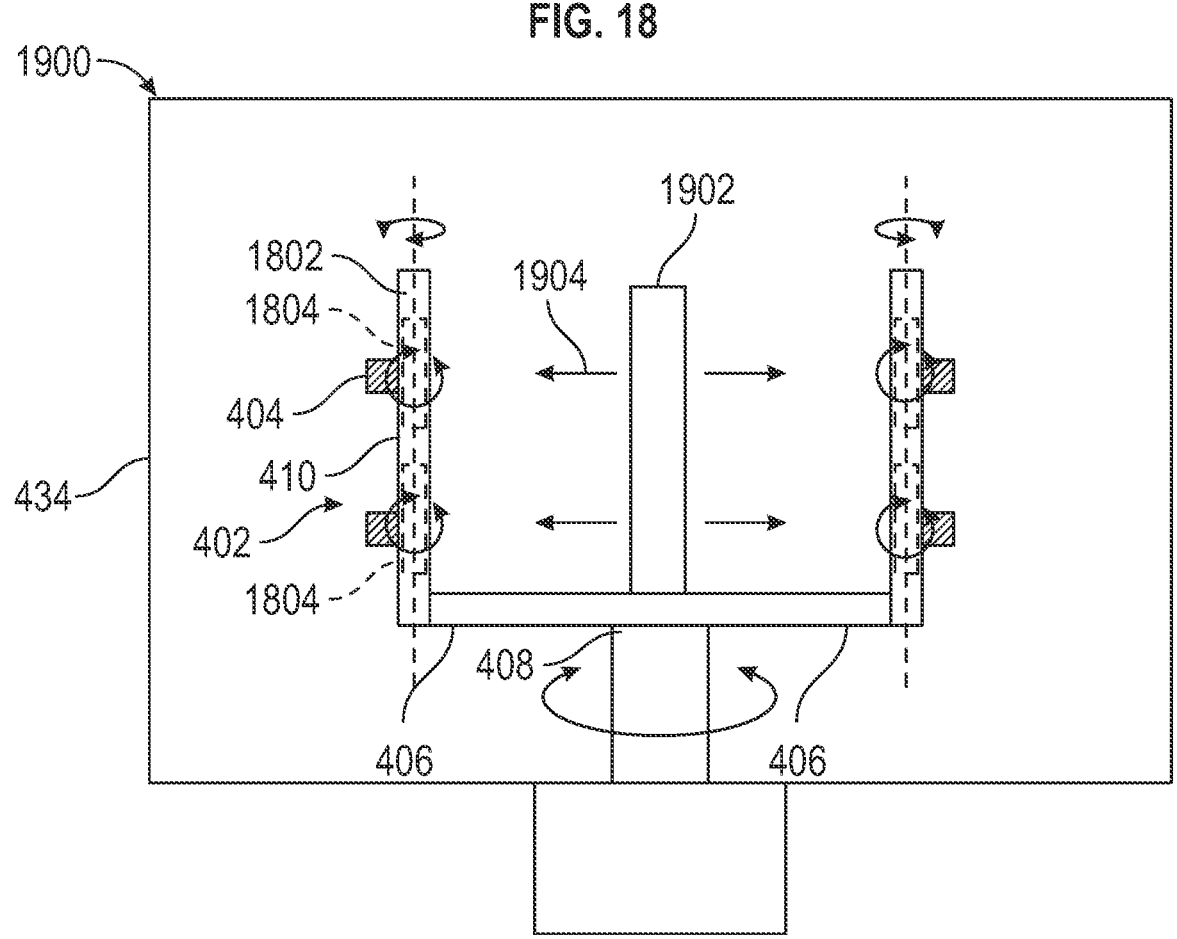
FIG. 19 is a partially schematic illustration of a system including the build platform of FIG. 18, in accordance with embodiments of the present technology.

FIG. 19 is a partially schematic illustration of a system 1900 including the build platforms 1802 of FIG. 18, in accordance with embodiments of the present technology. As shown in FIG. 19, the build platforms 1802 can be attached to the mounting structures 410 of the rotor 402. The system 1900 includes a blower 1902 configured to blow a gas 1904 (e.g., compressed air) against the segments 1804 of the build platform 1802 to rotate the segments 1804 around the first and/or second axes of rotation. Accordingly, as the rotor 402 rotates, the objects 404 can be exposed to forces along different directions to facilitate removal of excess material.

Figure 20:
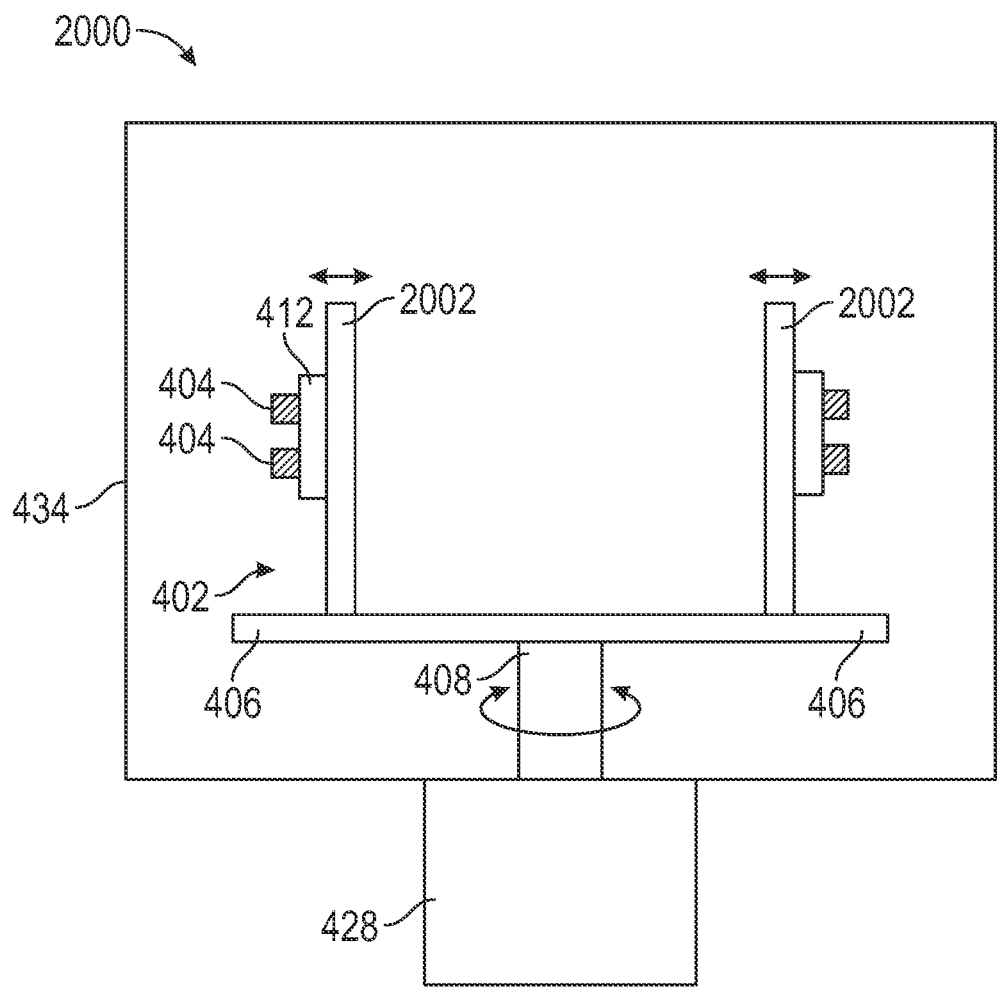
FIG. 20 is a partially schematic illustration of a system for applying variable forces to additively manufactured objects during post-processing, in accordance with embodiments of the present technology.

FIG. 20 is a partially schematic illustration of a system 2000 for applying variable forces to additively manufactured objects during post-processing, in accordance with embodiments of the present technology. The system 2000 includes adjustable mounting structures 2002, which are generally similar to the mounting structures 410 of FIG. 4A except that the adjustable mounting structures 2002 can be moved (e.g., translated) relative to the arms 406. The adjustable mounting structure 2002 can be moved to predetermined, discrete locations along the arms 406, or can be moved through a continuous range of locations along the arms 406. The location of the adjustable mounting structure 2002 can be used to adjust the amount of force applied to the objects 404, e.g., more force is applied when the adjustable mounting structure 2002 is located further from the center of rotation, and less force is applied when the adjustable mounting structure 2002 is located closer to the center of rotation. For example, the adjustable mounting structures 2002 can be set further from the center of rotation when rotating objects at lower speeds and/or lower temperatures, and can be set closer to the center of rotation when rotating objects at higher speeds and/or higher temperatures.

In some embodiments, each adjustable mounting structure 2002 is coupled to an actuator (e.g., a rotating lead screw or other linear actuator—not shown) that allows the adjustable mounting structure 2002 to be automatically moved to a desired location along the arm 406, even while the rotor 402 is spinning. Accordingly, the amount of force applied to the objects 404 can be dynamically varied by the moving the adjustable mounting structures 2002 inward or outward during a rotation cycle. This approach allows for variable force application even when the actuator 428 for the rotor 402 is a single speed actuator (e.g., a fixed gear single speed motor).

Optionally, the system 2000 can include one or sensors (e.g., weight sensors, force sensors, etc.—not shown) that are configured to detect whether the rotor 402 is balanced. If appropriate, one or both of the adjustable mounting structures 2002 can be automatically repositioned to maintain balance. This can be advantageous in embodiments where the adjustable mounting structures 2002 are supporting different amounts and/or types of objects 404, and/or to accommodate for changes in weight as excess material is removed from the objects 404.

Figure 21:
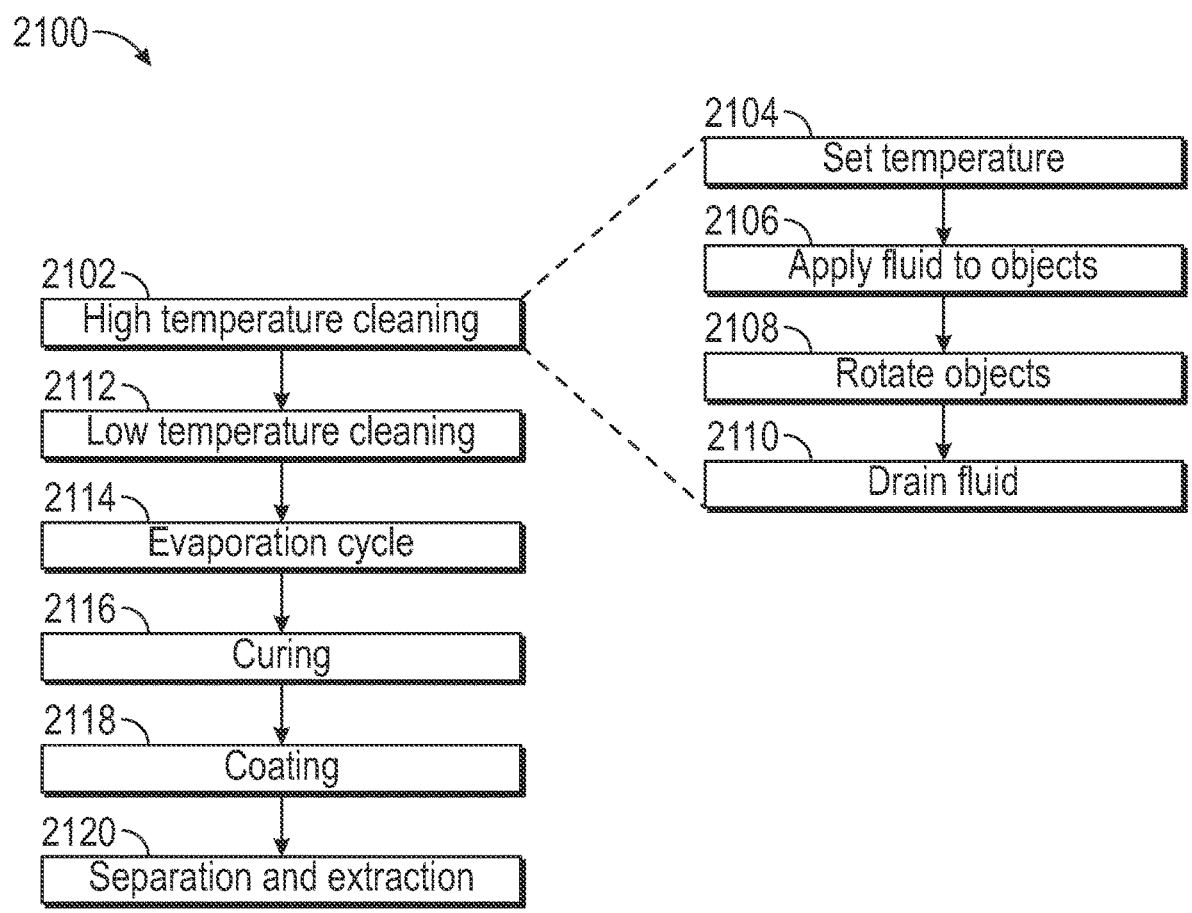
FIG. 21 is a flow diagram illustrating a method for post-processing additively manufactured objects, in accordance with embodiments of the present technology.

FIG. 21 is a flow diagram illustrating a method 2100 for post-processing additively manufactured objects, in accordance with embodiments of the present technology. The method 2100 can be performed using any embodiment of the systems and devices described herein, such as any of the embodiments described with respect to FIGS. 4A-20. In some embodiments, some or all of the steps of the method 2100 are performed using a single system that is capable of performing multiple post-processing operations. Optionally, some or all of the steps of the method 2100 can be implemented as computer-readable instructions (e.g., program code) that are configured to be executed by one or more processors of a controller (e.g., the controller 432 of FIG. 4A).

The method 2100 begins at block 2102 with performing a high temperature cleaning cycle on one or more additively manufactured objects to remove excess material from the objects. The high temperature cleaning cycle can include multiple sub-steps. For example, at block 2104, the method 2100 includes setting the temperature for the high temperature cleaning cycle. The temperature can be an environmental temperature for heating the entire environment surrounding the objects, a local temperature to which the objects are to be heated, or a combination thereof. As previously described, the temperature can be relatively high to increase the viscosity of the excess material on the objects, such as a temperature greater than or equal to 30° C., 40° C., 50° C., 60° C., 70° C., 80° C., 90° C., 100° C., 110° C., or 120° C. The temperature can be set by a temperature management mechanism including a heat source or other energy source configured for heating the ambient environment, the objects, and/or the excess material on the objects, e.g., as previously described with respect to FIGS. 5A-9.

Optionally, at block 2106, the high temperature cleaning cycle can include applying a fluid (e.g., water, solvent, or other wash fluid) to the objects to facilitate removal of excess material. The fluid can be sprayed onto the surfaces of the objects (e.g., as described with respect to FIG. 12), or the objects can be immersed in the fluid (e.g., as described with respect to FIGS. 11A and 11B). In other embodiments, block 2106 can be omitted from the high temperature cycle.

At block 2108, the high temperature cleaning cycle includes rotating the objects to remove the excess material from the objects by centrifugal separation. As described elsewhere herein, the objects can be mounted to a rotor (e.g., the rotor 402 of FIGS. 4A-4E) that spins the objects at a desired rotational speed. In some embodiments, the rotational speed for the high temperature cleaning cycle is relatively low, since the objects may be more susceptible to deformation when heated. For example, the rotation speed can be no more than 400 RPM, 300 RPM, 200 RPM, 100 RPM, or 50 RPM. Optionally, the objects can be rotated around multiple rotational axes during the process of block 2108 to further enhance cleaning, e.g., as previously described with respect to FIGS. 15A-20.

At block 2110, the fluid that was applied to the objects can be drained from the chamber. Block 2110 can be omitted if no fluid was applied.

The method 2100 can then continue at block 2112 with performing a low temperature cleaning cycle on the additively manufactured objects. The sub-steps of the low temperature cycle can be generally similar to the sub-steps of the high temperature cycle, except as described below. For example, the low temperature cycle can also include setting the temperature (e.g., as described above with respect to block 2104), except that the temperature is set to a lower value, such as less than or equal to 110° C., 100° C., 90° C., 80° C., 70° C., 60° C., 50° C., 40° C., 30° C., 20° C., 10° C., or 0° C. The temperature can be set by a temperature management mechanism including a cooling device for cooling the ambient environment and/or the objects, e.g., as previously described with respect to FIGS. 6-9.

The low temperature cycle can also include rotating the objects to remove any excess material that was not removed during the high temperature cycle. The rotation during the low temperature cycle can be performed as described above with respect to block 2108, except that the rotational speed can be higher since the objects may be less susceptible to deformation when cooled. For example, the rotational speed can be greater than or equal to 100 RPM, 200 RPM, 300 RPM, 400 RPM, or 500 RPM. The objects can the objects can be rotated around multiple rotational axes during the low temperature cycle, e.g., as previously described with respect to FIGS. 15A-20.

Optionally, the low temperature cycle can include applying a fluid to the objects and/or draining the fluid, as described above with respect to blocks 2106 and 2110. In other embodiments, these processes can be omitted from the low temperature cycle.

At block 2114, the method 2100 can optionally include performing an evaporation cycle on the objects. This process can involve heating the objects to remove any residual fluid (e.g., wash fluid, solvent from the additive manufacturing process) on the objects. The temperature used can be the same as the temperature for the high temperature cycle, or can be a different (e.g., lower temperature). For example, the temperature can be greater than or equal to greater than or equal to 30° C., 40° C., 50° C., 60° C., 70° C., 80° C., 90° C., 100° C., 110° C., or 120° C. The heating can be performed by the same temperature management mechanism used in the high temperature cycle, or a different temperature management mechanism.

Alternatively or in combination, block 2114 can include rotating the objects to promote even heating and evaporation. The rotation can be performed at any suitable speed such as at least 50 RPM, 100 RPM, 200 RPM, 300 RPM, 400 RPM, or 500 RPM. The objects can be rotated around a single rotational axis, or around multiple axes. In other embodiments, the objects can remain stationary during the evaporation cycle.

Optionally, block 2114 can include other processes to facilitate evaporation, such as applying a vacuum to the objects, blowing compressed gas on the objects, and/or activating a fan to promote air flow around the objects. In other embodiments, however, block 2114 is optional and can be omitted.

At block 2116, the method 2100 can optionally include curing the objects. The curing can be performed to convert the objects from a partially cured green state to a fully cured final state. The curing can be performed by irradiating the objects, heating the objects, or a combination thereof, as previously described with respect to FIGS. 5A-7D. Optionally, the objects can be rotated during the curing process to promote uniform energy application. The rotation can be performed at a relatively low speed, such as no more than 100 RPM, 90 RPM, 80 RPM, 70 RPM, 60 RPM, 50 RPM, 40 RPM, 30 RPM, 20 RPM, 10 RPM, or 5 RPM. The objects can be rotated around a single rotational axis, or around multiple axes. In other embodiments, the objects can remain stationary during the curing process.

At block 2118, the method 2100 can optionally include coating the objects with one or more materials. The coating can be performed using the techniques described above with respect to FIGS. 12 and 13, or any other suitable technique. Optionally, the objects can be rotated to facilitate uniform coating. The rotation can be performed at a relatively low speed, such as no more than 100 RPM, 90 RPM, 80 RPM, 70 RPM, 60 RPM, 50 RPM, 40 RPM, 30 RPM, 20 RPM, 10 RPM, or 5 RPM. The objects can be rotated around a single rotational axis, or around multiple axes. In other embodiments, the objects can remain stationary during the coating process.

At block 2120, the method 2100 can optionally include separating and extracting the objects. For example, the objects can be rotated at rotation speeds that produce forces sufficient to break the support structures connecting the objects to an underlying substrate (e.g., a build platform), such as speeds of at least 50 RPM, 100 RPM, 150 RPM, 200 RPM, 250 RPM, 300 RPM, 350 RPM, 400 RPM, 450 RPM, or 500 RPM. The rotation can break all of the support structures so that the objects are completely separated from the build platform, or only some of the support structures so that the objects remain attached to the build platform but can be easily detached in subsequent process steps. The rotation can be performed in air, or while the objects are immersed in a fluid as described with respect to FIGS. 11A and 11B. Alternatively or in combination, the separation can be performed using a shape memory build platform, as previously described with respect to FIGS. 10A and 10B.

The method 2100 can be modified in many different ways. For example, the ordering of blocks 2102 and 2112 can be reversed, such that the high temperature cleaning cycle is performed after the low temperature cycle. As another example, the processes of blocks 2114, 2116, and 2118 can be performed in any order. In some embodiment, some of the processes of the method 2100 can be repeated, such as the high temperature cleaning cycle of block 2102 and/or the low temperature cleaning cycle of block 2112. Optionally, any of the processes of the method 2100 can be omitted. For example, the method 2100 can include a high temperature cleaning cycle only, or a low temperature cleaning cycle only.

In some embodiments, the method 2100 includes additional processes not shown in FIG. 21. For example, the method 2100 can include additional cleaning cycles that occur before or after block 2102 and/or block 2112, which can be performed at any suitable temperature. As another example, the method 2100 can include collecting the excess material removed from the objects, which can occur at any point during and/or after the high and low temperature cleaning cycles. The collection can be performed using any of the techniques described herein, e.g., with respect to FIG. 14. In yet another example, the method 2100 can include heating, cooling, and/or curing a targeted portion of the objects to selectively alter a material property thereof, such as to weaken the support structures of the object. In such embodiments, the heating, cooling, and/or curing can occur at any point after blocks 2102 and 2112, and/or before block 2120.

In some embodiments, the systems of the present technology include one or more sensors configured to monitor various aspects of the post-processing operations disclosed herein. For example, the system can include at least one sensor configured to provide sensor data indicative of the cleaning status of some or all of the additively manufactured objects, such as the amount of excess material removed from the objects and/or the amount of excess material remaining on the objects. As another example, in embodiments where the system is configured to perform curing, the system can include at least one sensor configured to provide sensor data indicative of the curing status of some or all of the additively manufactured objects, such as whether the objects are uncured, partially cured, or fully cured, as well as the locations of uncured, partially cured, and/or fully cured regions in the objects. In a further example, the system can include sensors configured to provide monitoring and feedback on other post-processing operations, such as the actual temperature of the environment and/or the objects, the fluid levels within the chamber, the moisture levels within the chamber, the amount of material (e.g., wash fluid, coating material) applied to the objects, whether the rotor is balanced or imbalanced, errors or malfunctions, and/or any other relevant parameters.

Figure 22:
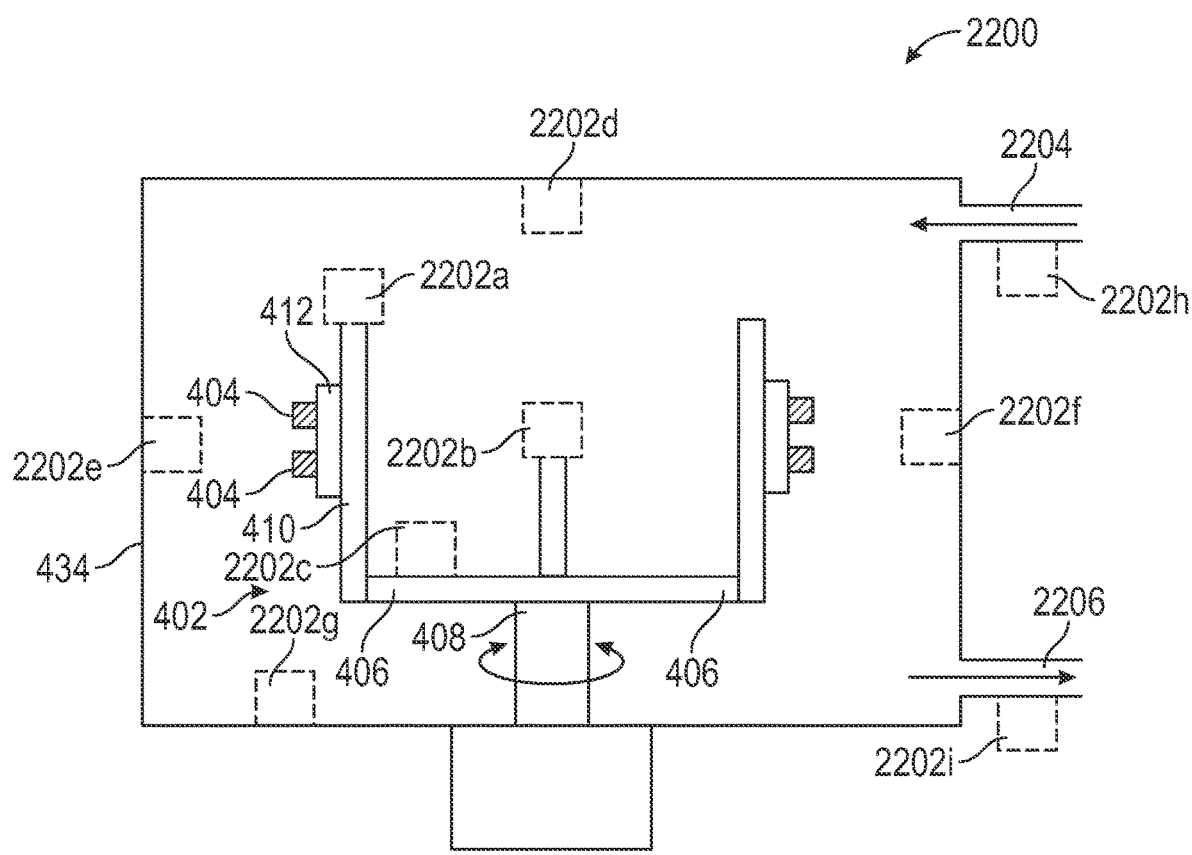
FIG. 22 is a partially schematic illustration of a system for post-processing additively manufactured objects showing example locations for sensors, in accordance with embodiments of the present technology.

FIG. 22 is a partially schematic illustration of a system 2200 for post-processing additively manufactured objects showing example locations for sensors, in accordance with embodiments of the present technology. The system 2200 can include sensors at various locations, such as: a sensor 2202a coupled to the mounting structure 410, a sensor 2202b coupled to the rotor 402 at or near the center of rotation, a sensor 2202c coupled to the arm 406 and spaced apart from the center of rotation, a sensor 2202d coupled to the upper portion of the housing 434 (e.g., to the lid 436—not shown), a sensor 2202e coupled to a first lateral side of the housing 434, a sensor 2202f coupled to a second lateral side of the housing 434, a sensor 2202g coupled to the bottom portion of the housing 434, a sensor 2202h coupled to an inlet 2204 for introducing a substance (e.g., wash fluid, coating material, gas) into the housing 434, and/or a sensor 2202i coupled to an outlet 2206 for removing a substance (e.g., wash fluid, coating material, gas, excess material removed from the objects 404) from the housing 434.

The systems described herein can include any number of sensors, such as one, two, three, four, five, ten, 15, 20, or more sensors. Some or all of the sensors can be the same sensor type, or some or all of the sensors can be different sensor types. Examples of sensors suitable for use with the systems herein include, but are not limited to, optical sensors, force sensors, weight sensors, strain sensors, ultrasonic sensors, temperature sensors, radiation sensors, chemical sensors, fluid sensors, moisture sensors, gas sensors, pressure sensors, flow sensors, time-of-flight sensors, proximity sensors, contact sensors, and location sensors.

For example, the systems herein can include one or more cameras configured to generate image data of the additively manufactured objects. The cameras can be positioned at a moving location (e.g., at the location of the sensor 2202a or 2202c in FIG. 22) or at a stationary location (e.g., at the location of the sensors 2202b, 2202d, 2202e, 2202f, or 2202g). In some embodiments, it may be difficult for a stationary camera to obtain accurate images of a moving object, or for a moving camera to obtain images of a stationary object. Accordingly, if imaging is to be performed while the objects are rotating, the cameras can be positioned at a location that moves along with the objects. Alternatively or in combination, imaging can be performed while the cameras and the objects are stationary (e.g., between rotation cycles).

The cameras can be configured to image all of the objects within the system, or a selected subset of the objects. For example, the cameras can image objects at certain locations that are representative of the remaining locations. The cameras can also image objects located at "dead spots," such that if those objects are cleaned or cured, the objects at other locations in the system are likely to be cleaned or cured as well. In some embodiments, the cameras are coupled to actuators that move the cameras to different positions and/or orientations to image objects at different locations within the system. The system can also reposition the objects (e.g., by spinning the rotor and/or by moving the objects as described above with respect to FIGS. 15A-20) to bring objects at different locations into the field of view of the cameras. This approach can be advantageous for reducing the number of cameras needed to image the objects.

In some embodiments, the image data produced by the cameras are used to assess the cleaning status of the objects. For example, the images can be analyzed using computer vision techniques and/or machine learning algorithms to determine the amount and/or locations of excess material remaining on the objects. This approach can be used in situations where the visual characteristics of the excess material (e.g., color, opacity, reflectivity) differ from the visual characteristics of the objects. Optionally, the cameras can image the objects using non-visible wavelengths (e.g., UV, infrared) if the visual contrast between the excess material and the objects is more visible at those wavelengths.

As another example, the cleaning status of the objects can be determined by comparing the images of the objects to reference images. The reference images can depict the object in a cleaned state without any excess material. In some embodiments, the cameras obtain images of the object from multiple viewpoints, and then photogrammetry techniques are used to reconstruct a 3D representation of the object from the images. The 3D representation of the actual object can then be compared to the original 3D digital model of the object used in the additive manufacturing process. Optionally, the object can include a visible identifier or fiducial marking that can be used to determine the specific identity of the object and retrieve the corresponding digital model (e.g., from a treatment planning database). Any structures that are present in the 3D representation but not the original 3D digital model can be assumed to be excess material remaining on the object.

Alternatively or in combination, the image data produced by the cameras can be used to assess the curing status of the objects. For example, the images can be analyzed using computer vision techniques and/or machine learning algorithms to determine the locations of uncured, partially cured, or fully cured regions on the object. This approach can be used in situations where the visual characteristics (e.g., color, opacity, reflectivity) of the uncured, partially cured, and/or fully cured regions differ from each other. differ from the visual characteristics of the objects. Optionally, the cameras can image the objects using non-visible wavelengths (e.g., UV, infrared) if the visual contrast between the uncured, partially cured, and/or fully cured regions would be enhanced at those wavelengths.

In some embodiments, the systems described herein include at least one sensor configured to monitor cleaning status of the objects by measuring an amount of excess material in the effluent removed from the system. This approach can be used in embodiments where a wash fluid (e.g., water, solvent) is applied to the objects during the cleaning process, e.g., as previously described with respect to FIGS. 11A, 11B, and 12. In such embodiments, the sensor can be positioned at or near an outlet for removing the effluent from the system (e.g., at the location of the sensor 2202*i* in FIG. 22).

The amount of excess material in the effluent can be detected in various ways. For example, the sensor can measure the optical properties of the effluent, such as the refractive index, opacity, and/or color. The sensor can also use spectrophotometric techniques to determine the concentration of the excess material in the effluent, such as by measuring the absorbance of the effluent at various wavelengths. Additional examples of measurement techniques that may be used include Fourier-transform infrared spectroscopy (FTIR) and gel permeation chromatography (GPC).

In some embodiments, the cleaning status of the objects is determined based on the changes in the amount of excess material in the effluent over time. In a typical cleaning cycle, the amount of excess material is expected to initially increase as material is removed from the objects, then gradually decrease as the amount of material remaining on the objects decreases. Accordingly, the objects can be considered to be sufficiently cleaned when the concentration of excess material in the effluent falls below a particular threshold and/or remains below the threshold for a specified period of time.

In some embodiments, the systems described herein use ultrasound to determine the cleaning status of the objects. For example, in embodiments where the excess material accumulates on a surface, such as the liner (e.g., the liner 1402 of FIG. 14) or a wall of the housing, ultrasound can be used to measure the thickness of the material on the surface to estimate the total amount of material removed. Optionally, ultrasound can be used to monitor the thickness of the material over time, and the objects can be considered sufficiently clean when the thickness stops increasing.

As another example, ultrasound can be used to sense changes in modal frequency of the objects that correlate to cleaning status. In some embodiments, the resonant frequency of the objects changes as excess material is removed. Accordingly, ultrasonic vibrations can be applied to the objects (e.g., to the substrate supporting the objects) to identify the current resonant frequency. The objects can be considered clean when the resonant frequency matches a target value or falls within a target range corresponding to little or no remaining excess material on the object. This technique can be applied while the objects are stationary, or while the objects or rotating. In embodiments where the ultrasound measurements are performed while the objects are rotating, any noise due to the rotation can be measured (e.g., using a separate sensor coupled to a different portion of the rotor) and subtracted from the final signal to be analyzed.

Figure 23:
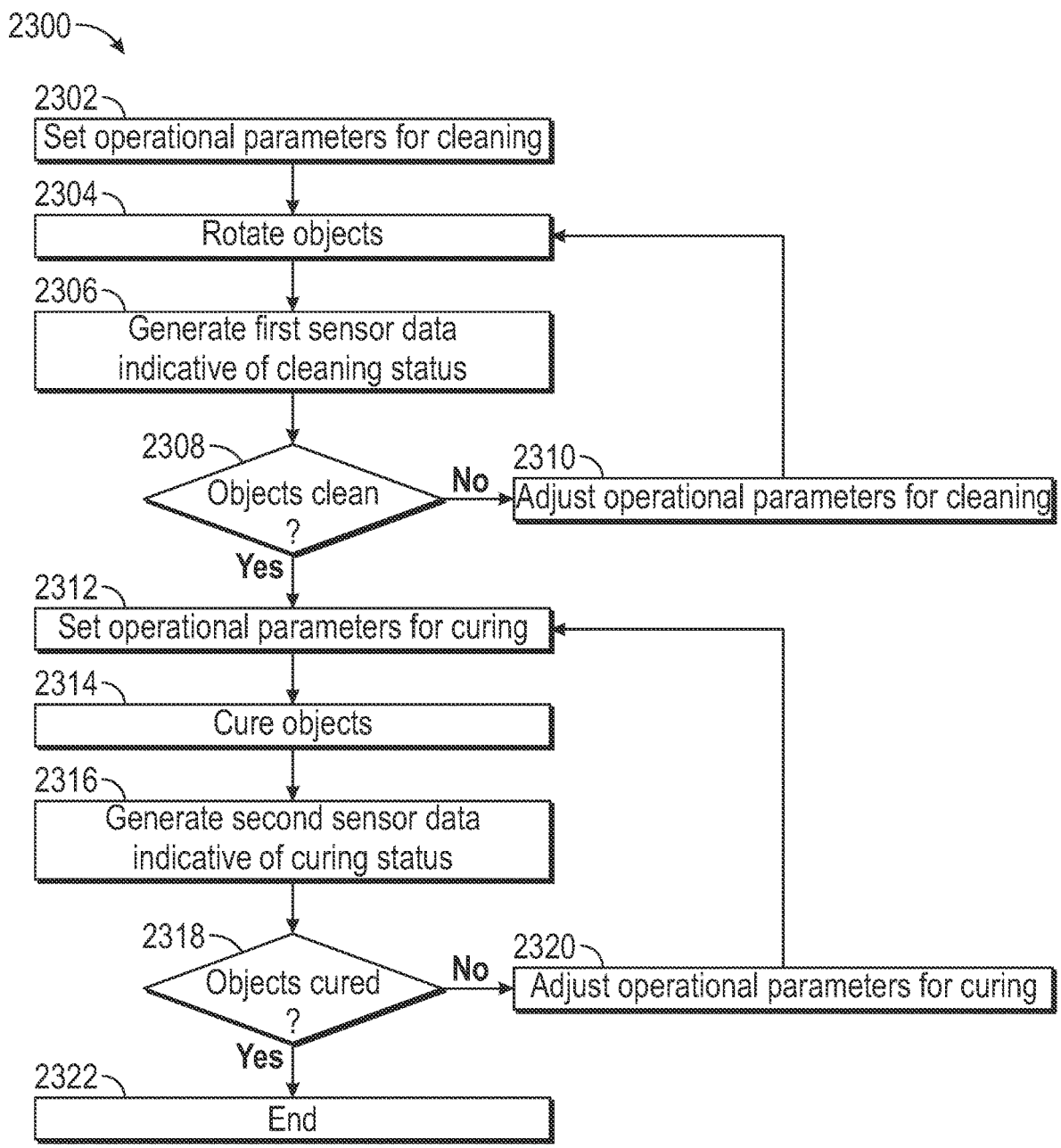
FIG. 23 is a flow diagram illustrating a method for post-processing additively manufactured objects with sensor feedback, in accordance with embodiments of the present technology.

FIG. 23 is a flow diagram illustrating a method 2300 for post-processing additively manufactured objects with sensor feedback, in accordance with embodiments of the present technology. The method 2300 can be performed using any of the systems and devices described herein, such as any of the embodiments described with respect to FIGS. 4A-22. In some embodiments, some or all of the steps of the method 2300 are implemented as computer-readable instructions (e.g., program code) that are configured to be executed by one or more processors of a controller (e.g., the controller 432 of FIG. 4A).

The method 2300 begins at block 2302 with setting one or more operational parameters for cleaning the additively manufactured objects. The operational parameters for cleaning can include any of the parameters described elsewhere herein, such as temperature (e.g., environmental temperature and/or local temperature), rotation speed, rotation direction, rotation duration, number of rotation cycles, positioning of adjustable components (e.g., the locations of the adjustable mounting structures 2002 of FIG. 20), and the like. For example, the operational parameters can be any of the parameters described above with respect to the high temperature or lower temperature cleaning cycles of the method 2100 of FIG. 21.

At block 2304, the method 2300 continues with rotating the additively manufactured objects to remove excess material. The rotation can be performed in accordance with the operational parameters set in block 2302 and using techniques described elsewhere herein.

At block 2306, the method 2300 can include generating first sensor data indicative of cleaning status of the objects. The first sensor data can be produced by one or more sensors, such as any of the sensor types described herein.

The sensors can produce the first sensor data during and/or after the objects are rotated in block 2306.

At block 2308, the method 2300 includes evaluating whether the objects are clean, based on the first sensor data. If the objects are determined to be insufficiently clean (e.g., too much excess material remains on the objects and/or not enough excess material has been removed), the method 2300 can proceed to block 2310 with adjusting at least some of the operational parameters for cleaning the objects. The adjustments can include, for example, increasing the forces applied to the objects (e.g., by increasing the rotation speed and/or moving the adjustable components) and/or decreasing the viscosity of the excess material (e.g., by increasing the temperature). The adjustments can also include altering the rotation direction, duration, and/or number of rotation cycles. The method 2300 can then return to block 2304 with rotating the objects according to the adjusted operational parameters. Alternatively, block 2310 can be omitted, such that the rotation is repeated using the same operational parameters as originally set in block 2302.

If the objects are determined to be sufficiently clean, the method 2300 can end, or can optionally proceed to block 2312 with setting one or more operational parameters for curing the additively manufactured objects. As described herein, the curing can be a post-curing process configured to convert the objects from a green state to a final state ready for use. The operational parameters for curing can include any of the parameters described elsewhere herein, such as temperature (e.g., environmental temperature and/or local temperature), energy output, energy wavelength, rotation speed, rotation direction, rotation duration, number of rotation cycles, positioning of adjustable components (e.g., the locations of the adjustable mounting structures 2002 of FIG. 20), and the like.

At block 2314, the method 2300 continues with curing the objects. The curing can be performed according to the operational parameters set in block 2312 and using techniques described elsewhere herein.

At block 2316, the method 2300 can include generating second sensor data indicative of curing status of the objects. The second sensor data can be produced by one or more sensors, such as any of the sensor types described herein. The sensors used to produce the second sensor data can be the same as the sensors used to produce first sensor data in block 2306, or can be different sensors. The sensors can produce the second sensor data during and/or after curing of the objects in block 2314.

At block 2318, the method 2300 includes evaluating whether the objects are cured, based on the second sensor data. If the objects are determined to be insufficiently cured, the method 2300 can proceed to block 2320 with adjusting at least some of the operational parameters for curing the objects. The adjustments can include, for example, increasing the curing energy output, adjusting the curing energy wavelength, and/or increasing the temperature. The adjustments can also include altering the rotation direction, duration, number of rotation cycles, and/or positioning of adjustable components. The method 2300 can then return to block 2314 with curing the objects according to the adjusted operational parameters. Alternatively, block 2314 can be omitted, such that the curing is repeated using the same operational parameters as originally set in block 2312.

If the objects are determined to be sufficiently cured, the method 2300 can end at block 2320.

In some embodiments, the systems described herein include a robotic assembly or other automated device for transferring additively manufactured objects between various locations. For example, a system can include a first robotic assembly configured to receive additively manufactured objects produced by an additive manufacturing device and load the objects into a rotor (e.g., the rotor 402 of the system 400 of FIG. 4A). In some embodiments, the additive manufacturing device fabricates objects on a tray containing one or more build platforms, and the tray is ejected from the device when the additive manufacturing process is complete. The tray can optionally be transferred from the device via a conveyer belt to a hopper, rack, or other temporary storage location. The first robotic assembly can then pick up individual build platforms from the tray and load them onto the rotor. Alternatively, the robotic assembly can load the entire tray onto the rotor. In embodiments where the rotor is configured to receive multiple build platforms and/or trays, the rotor can automatically rotate to predetermined positions so the first robotic assembly can automatically load each build platform or tray into the next empty space in the rotor, e.g., using indexing mechanisms and techniques known to those of skill in the art.

Optionally, the systems herein can include a second robotic assembly configured to unload the additively manufactured objects from the rotor once the material removal and/or other post-processing operations are complete. For example, the second robotic assembly can pick up individual build platforms (or a tray carrying multiple build platforms) and transfer them to another location for additional post-processing, packaging, and/or storage. In embodiments where the rotor is configured to receive multiple build platforms and/or trays, the rotor can automatically rotate to predetermined positions so the second robotic assembly can automatically unload each build platform or tray from the next occupied space on the rotor, e.g., using indexing mechanisms and techniques known to those of skill in the art. Optionally, the same robotic assembly can be used to load and unload the objects from the rotor.

In some embodiments, the systems herein use relatively simple mechanisms to secure the build platforms (or trays carrying build platforms) to the rotor, such as mechanisms that can be locked or unlocked using unidirectional movements. This approach may make it easier to automate loading and/or unloading of the rotor, e.g., by simplifying the movements performed by the robotic assembly and/or by reducing the number of steps needed to position and lock the build platforms or trays in place.

Figure 24A:
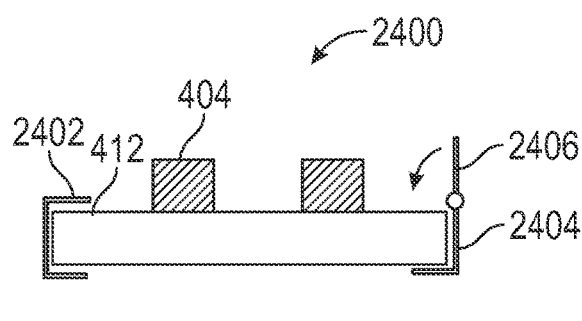
FIGS. 24A and 24B are partially schematic illustrations of a clamp mechanism for securing a substrate carrying additively manufactured objects, in accordance with embodiments of the present technology.
Figure 24B:
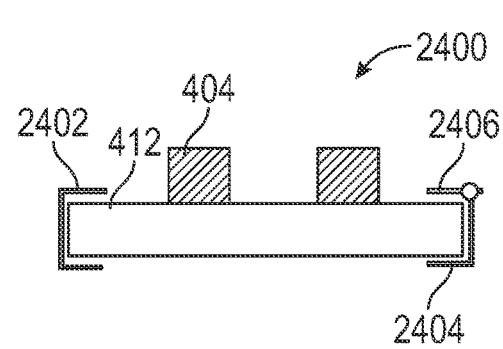

FIGS. 24A and 24B are partially schematic illustrations of a clamp mechanism 2400 for securing a substrate 412 (e.g., a build platform or tray) carrying additively manufactured objects 404, in accordance with embodiments of the present technology. The clamp mechanism 2400 includes a fixed clamp 2402 and an adjustable clamp 2404 configured to secure opposite sides of the substrate 412. The adjustable clamp 2404 can include a movable clamp member 2406 that is movable between an open configuration (FIG. 24A) and a closed configuration (FIG. 24B). To load the substrate 412, the clamp member 2406 can be placed in the open configuration so the substrate 412 can be inserted into the clamp mechanism 2400. As shown in FIG. 24B, the clamp member 2406 can be moved to the closed configuration so that both sides of the substrate 412 are fastened in place. In some embodiments, the clamp member 2406 is spring-loaded or otherwise biased to automatically close when the substrate 412 is inserted. Alternatively, the clamp member 2406 can be coupled to an actuator that closes the clamp member 2406 in response to sensor data, a control signal, or other indication that the substrate 412 has been loaded.

Figure 25A:
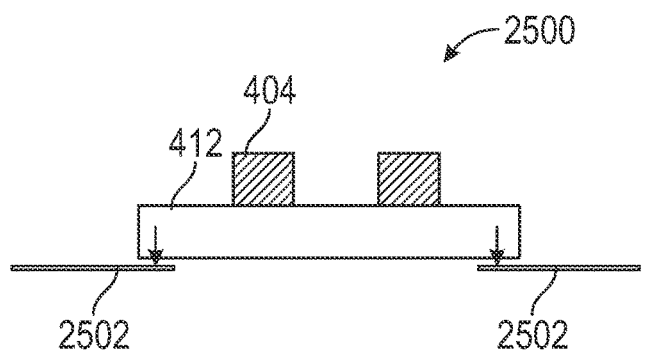
FIGS. 25A and 25B are partially schematic illustrations of another clamp mechanism for securing a substrate carrying additively manufactured objects, in accordance with embodiments of the present technology.
Figure 25B:
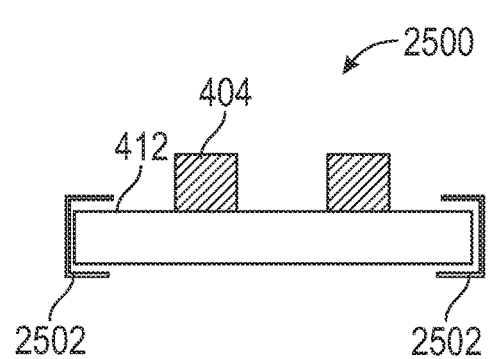

FIGS. 25A and 25B are partially schematic illustrations of another clamp mechanism 2500 for securing a substrate 412 carrying additively manufactured objects 404, in accordance with embodiments of the present technology. The clamp mechanism 2500 includes a pair of bistable clamps 2502 configured to secure opposite sides of the substrate 412. The bistable clamps 2502 can initially be in an open configuration (FIG. 25A) to permit loading of the substrate 412. When the substrate 412 is pushed against the bistable clamps 2502, the exerted force can cause the bistable clamps 2502 to automatically transition into a closed configuration (FIG. 25B) to secure the substrate 412. This configuration allows the substrate 412 to be locked in place with a simple, unidirectional movement.

Figure 26:
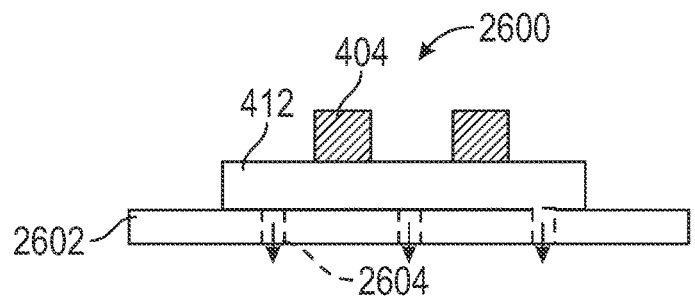
FIG. 26 is a partially schematic illustration of a vacuum mechanism for securing a substrate carrying additively manufactured objects, in accordance with embodiments of the present technology.

FIG. 26 is a partially schematic illustration of a vacuum mechanism 2600 for securing a substrate 412 carrying additively manufactured objects 404, in accordance with embodiments of the present technology. The vacuum mechanism 2600 includes a plate 2602 including one or more vacuum ports 2604. During operation, the substrate 412 can be positioned against the plate 2602 and over the ports 2604. Optionally, the plate 2602 can include guides (not shown) to facilitate proper placement of the substrate 412 on the plate 2602. Subsequently, a vacuum can be applied to the substrate 412 via the ports 2604 to secure the substrate 412 to the plate 2602. The vacuum can be automatically activated in response to sensor data, control signals, or other indication that the substrate 412 has been loaded onto the plate 2602.

III. Orthodontic Appliances and Associated Methods

Figure 27A:
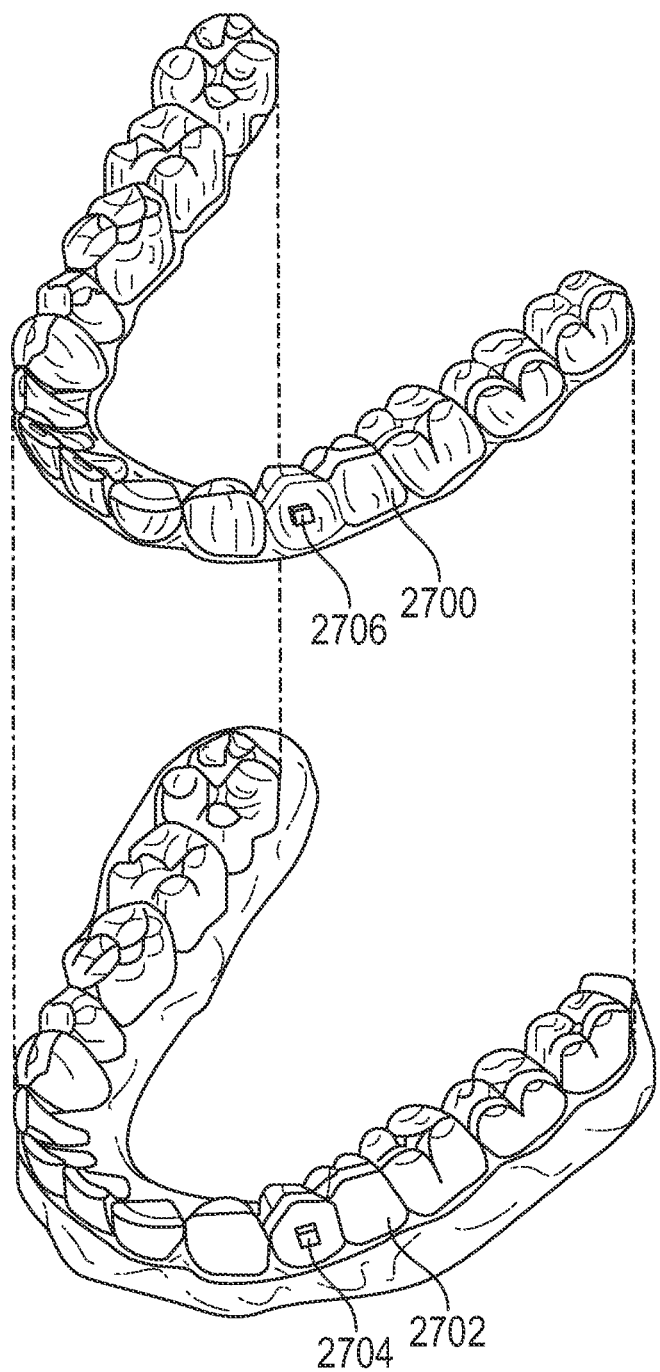
FIG. 27A illustrates a representative example of a tooth repositioning appliance configured in accordance with embodiments of the present technology.

FIG. 27A illustrates a representative example of a tooth repositioning appliance 2700 configured in accordance with embodiments of the present technology. The appliance 2700 can be manufactured and post-processed using any of the systems, methods, and devices described herein. The appliance 2700 (also referred to herein as an "aligner") can be worn by a patient in order to achieve an incremental repositioning of individual teeth 2702 in the jaw. The appliance 2700 can include a shell (e.g., a continuous polymeric shell or a segmented shell) having teeth-receiving cavities that receive and resiliently reposition the teeth. The appliance 2700 or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. In some embodiments, direct fabrication involves forming an object (e.g., an appliance or a portion thereof) without using a physical template (e.g., mold, mask etc.) to define the object geometry.

The appliance 2700 can fit over all teeth present in an upper or lower jaw, or less than all of the teeth. The appliance 2700 can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance 2700 can be a generic appliance configured to receive the teeth, but not necessarily shaped to match the topography of the patient's teeth. In some cases, only certain teeth received by the appliance 2700 are repositioned by the appliance 2700 while other teeth can provide a base or anchor region for holding the appliance 2700 in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In preferred embodiments, no wires or other means are provided for holding the appliance 2700 in place over the teeth. In some cases, however, it may be desirable or necessary to provide individual attachments 2704 or other anchoring elements on teeth 2702 with corresponding receptacles 2706 or apertures in the appliance 2700 so that the appliance 2700 can apply a selected force on the tooth. Representative examples of appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (sec, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 27B:
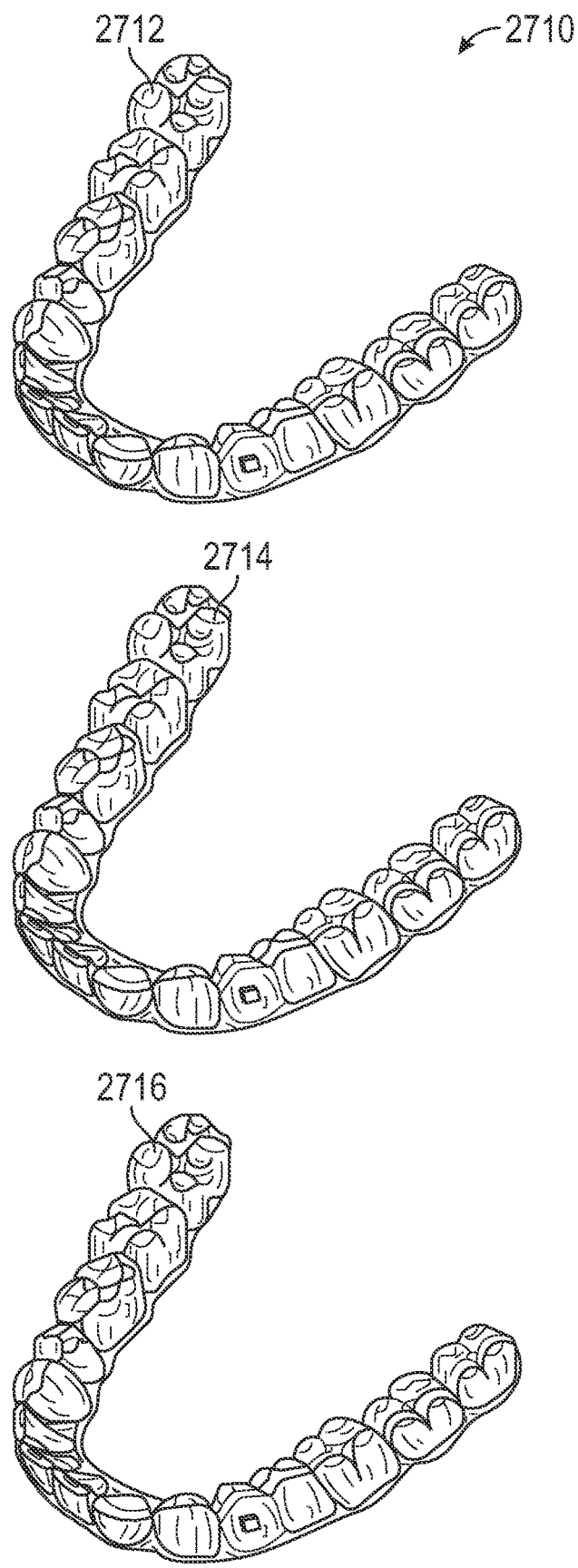
FIG. 27B illustrates a tooth repositioning system including a plurality of appliances, in accordance with embodiments of the present technology

FIG. 27B illustrates a tooth repositioning system 2710 including a plurality of appliances 2712, 2714, 2716, in accordance with embodiments of the present technology. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 2710 can include a first appliance 2712 corresponding to an initial tooth arrangement, one or more intermediate appliances 2714 corresponding to one or more intermediate arrangements, and a final appliance 2716 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 27C:
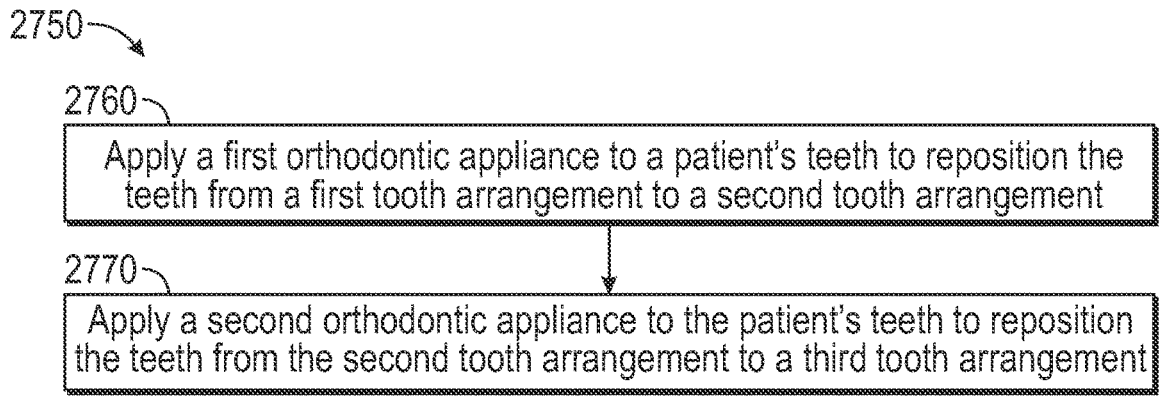
FIG. 27C illustrates a method of orthodontic treatment using a plurality of appliances, in accordance with embodiments of the present technology.

FIG. 27C illustrates a method 2750 of orthodontic treatment using a plurality of appliances, in accordance with embodiments of the present technology. The method 2750 can be practiced using any of the appliances or appliance sets described herein. In block 2760, a first orthodontic appliance is applied to a patient's teeth in order to reposition the teeth from a first tooth arrangement to a second tooth arrangement. In block 2770, a second orthodontic appliance is applied to the patient's teeth in order to reposition the teeth from the second tooth arrangement to a third tooth arrangement. The method 2750 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 28:
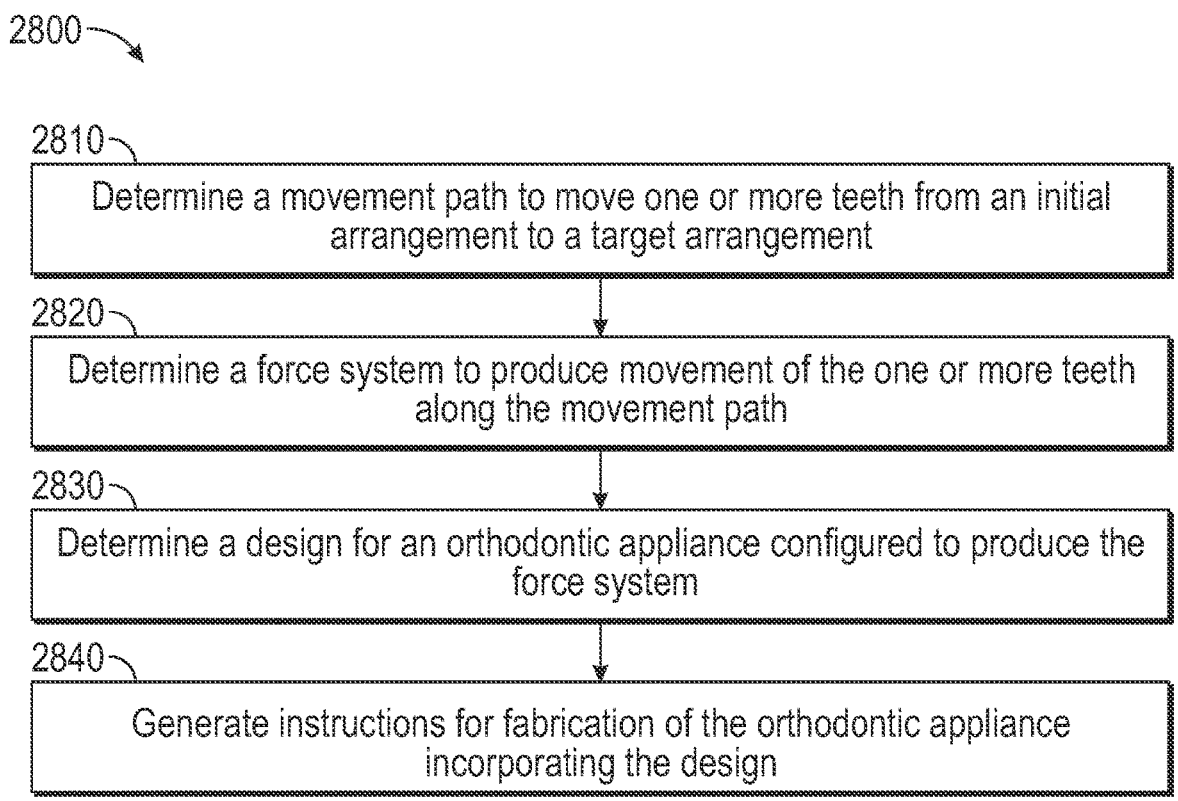
FIG. 28 illustrates a method for designing an orthodontic appliance, in accordance with embodiments of the present technology.

FIG. 28 illustrates a method 2800 for designing an orthodontic appliance, in accordance with embodiments of the present technology. The method 2800 can be applied to any embodiment of the orthodontic appliances described herein. Some or all of the steps of the method 2800 can be performed by any suitable data processing system or device, e.g., one or more processors configured with suitable instructions.

In block 2810, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 2820, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 2830, a design for an orthodontic appliance configured to produce the force system is determined. The design can include the appliance geometry, material composition, and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 2840, instructions for fabrication of the orthodontic appliance incorporating the design are generated. The instructions can be configured to control a fabrication system or device in order to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 2800 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 2800 may be performed with any suitable fabrication system or device, such as the embodiments described herein. Some of the steps may be optional, and the order of the steps can be varied as desired.

Figure 29:
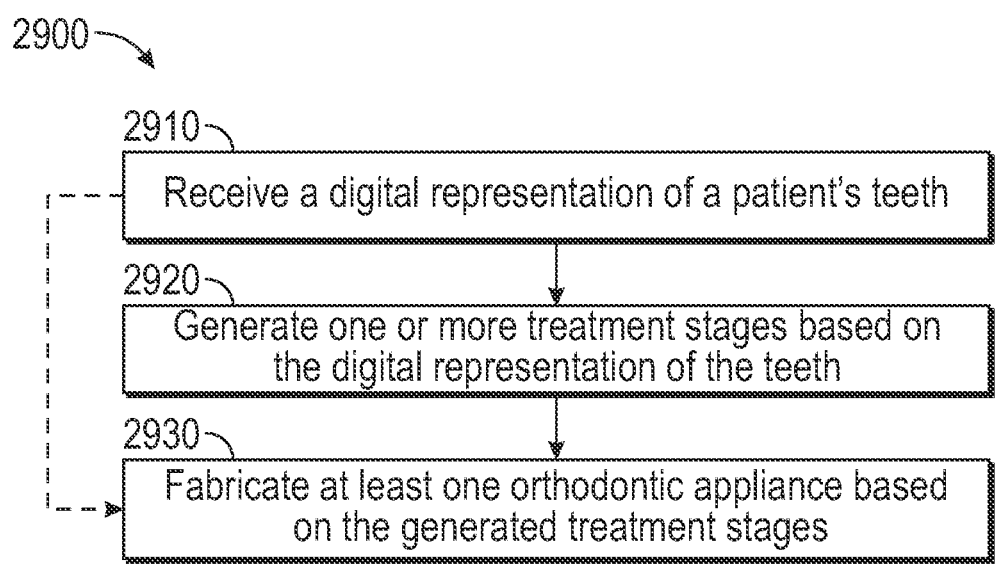
FIG. 29 illustrates a method for digitally planning an orthodontic treatment and/or design or fabrication of an appliance, in accordance with embodiments of the present technology.

FIG. 29 illustrates a method 2900 for digitally planning an orthodontic treatment and/or design or fabrication of an appliance, in accordance with embodiments. The method 2900 can be applied to any of the treatment procedures described herein and can be performed by any suitable data processing system.

In block 2910, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 2920, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 2930, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 29, design and/or fabrication of an orthodontic appliance, and perhaps a particular orthodontic treatment, may include use of a representation of the patient's teeth (e.g., including receiving a digital representation of the patient's teeth (block 2910)), followed by design and/or fabrication of an orthodontic appliance based on a representation of the patient's teeth in the arrangement represented by the received representation.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537,406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment fabrication templates, e.g., appliances used to position pre-fabricated attachments on a person's teeth in accordance with one or more aspects of a treatment plan. Examples of attachment fabrication templates can be found at least in: U.S. application Ser. No. 17/249,218, entitled, "Flexible 3D Printed Orthodontic Device," filed Feb. 24, 2021; U.S. application Ser. No. 16/366,686, entitled, "Dental Attachment Placement Structure," filed Mar. 27, 2019; U.S. application Ser. No. 15/674,662, entitled, "Devices and Systems for Creation of Attachments," filed Aug. 11, 2017; U.S. Pat. No. 11,103,330, entitled, "Dental Attachment Placement Structure," filed Jun. 14, 2017; U.S. application Ser. No. 14/963,527, entitled, "Dental Attachment Placement Structure," filed Dec. 9, 2015; U.S. application Ser. No. 14/939,246, entitled, "Dental Attachment Placement Structure," filed Nov. 12, 2015; U.S. application Ser. No. 14/939,252, entitled, "Dental Attachment Formation Structures," filed Nov. 12, 2015; and U.S. Pat. No. 9,700,385, entitled, "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. Examples of incremental palatal expanders can be found at least in: U.S. application Ser. No. 16/380,801, entitled, "Releasable Palatal Expanders," filed Apr. 10, 2019; U.S. application Ser. No. 16/022,552, entitled, "Devices, Systems, and Methods for Dental Arch Expansion," filed Jun. 28, 2018; U.S. Pat. No. 11,045,283, entitled, "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled, "Methods and Apparatuses for Customizing a Rapid Palatal Expander," filed Dec. 4, 2017; and U.S. Pat. No. 7,192,273, entitled, "System and Method for Palatal Expansion," filed Aug. 7, 2003; all of which are incorporated by reference herein in their entirety.

Examples

The following examples are included to further describe some aspects of the present technology, and should not be used to limit the scope of the technology.

1. A method comprising:
   receiving a plurality of additively manufactured objects having excess material thereon;
   removing the excess material from the plurality of additively manufactured objects by rotating the plurality of additively manufactured objects; and
   adjusting an environmental temperature while rotating the plurality of additively manufactured objects according to a dynamic temperature profile that facilitates removal of the excess material from the plurality of additively manufactured objects, wherein the dynamic temperature profile comprises (a) a first temperature configured to decrease a viscosity of the excess material, and (b) a second temperature configured to increase a stiffness of the plurality of additively manufactured objects.

2. The method of Example 1, wherein the plurality of additively manufactured objects comprise a partially cured polymeric resin, and the excess material comprises uncured polymeric resin.

3. The method of Example 2, wherein the uncured polymeric resin comprises a viscosity of at least 15 Pa-s at 20° C.

4. The method of any one of Examples 1 to 3, wherein the first temperature is greater than the second temperature.

5. The method of any one of Examples 1 to 4, wherein the dynamic temperature profile comprises increasing or decreasing the environmental temperature over time.

6. The method of any one of Examples 1 to 5, wherein the dynamic temperature profile comprises varying the environmental temperature based on a rotation speed of the plurality of additively manufactured objects.

7. The method of any one of Examples 1 to 6, wherein the dynamic temperature profile comprises setting the environmental temperature to the first temperature during a first time period in which the plurality of additively manufactured objects are rotated at a first rotation speed, and setting the environmental temperature to the second temperature during a second time period in which the plurality of additively manufactured objects are rotated at a second rotation speed.

8. The method of Example 7, wherein the second temperature is lower than the first temperature, and the second rotation speed is higher than the first rotation speed.

9. The method of Example 7 or 8, wherein the first time period occurs before the second time period.

10. The method of any one of Examples 1 to 9, further comprising:
    receiving sensor data indicative of a cleaning status of the plurality of additively manufactured objects; and
    adjusting the environmental temperature based on the cleaning status.

11. The method of any one of Examples 1 to 10, wherein the environmental temperature is adjusted using one or more of the following: an infrared radiation source, a heated fluid, a heated gas, a heat sink, a heating plate, or a heat exchanger.

12. The method of Example 11, wherein the environmental temperature is adjusted by immersing the plurality of additively manufactured objects in the heated fluid while rotating the plurality of additively manufactured objects.

13. The method of any one of Examples 1 to 12, wherein the environmental temperature is adjusted using one or more of the following: a thermoelectric cooler, a cold plate, a cold gas, or a cold fluid.

14. The method of any one of Examples 1 to 13, further comprising curing the plurality of additively manufactured objects by applying radiation to the plurality of additively manufactured objects while rotating the plurality of additively manufactured objects.

15. The method of any one of Examples 1 to 14, wherein the plurality of additively manufactured objects are rotated around two or more axes of rotation.

16. The method of any one of Examples 1 to 15, further comprising applying a material to the plurality of additively manufactured objects while rotating the plurality of additively manufactured objects.

17. The method of Example 16, wherein the material comprises a wash fluid.

18. The method of Example 16 or 17, wherein the material comprises a coating.

19. The method of any one of Examples 1 to 18, further comprising collecting at least some of the excess material removed from the plurality of additively manufactured objects.

20. The method of Example 19, further comprising reusing the collected excess material in a subsequent additive manufacturing process.
21. The method of any one of Examples 1 to 20, wherein the plurality of additively manufactured objects are produced by a stereolithography process.
22. The method of any one of Examples 1 to 21, wherein the plurality of additively manufactured objects comprise a plurality of orthodontic appliances.
23 The method of Example 22, wherein the plurality of orthodontic appliances are configured to reposition a patient's teeth from an initial arrangement toward a target arrangement.
24. The method of Example 23, wherein the plurality of orthodontic appliances are manufactured based on a digital treatment plan representing a series of tooth arrangements for repositioning the patient's teeth from the initial arrangement toward the target arrangement.
25. A system for processing additively manufactured objects, the system comprising:
   a rotor configured to support a plurality of additively manufactured objects having excess material thereon;
   an actuator configured to spin the rotor so as to remove the excess material from the plurality of additively manufactured objects; and
   a temperature management mechanism configured to produce a dynamic temperature profile that facilitates removal of the excess material from the plurality of additively manufactured objects by one or more of (a) decreasing a viscosity of the excess material or (b) increasing a stiffness of the plurality of additively manufactured objects.
26. The system of Example 25, wherein the plurality of additively manufactured objects are produced by a stereolithography process.
27. The system of Example 25 or 26, wherein the plurality of additively manufactured objects comprise a partially cured polymeric resin, and the excess material comprises uncured polymeric resin.
28. The system of Example 27, wherein the uncured polymeric resin comprises a viscosity of at least 15 Pa-s at 20° C.
29 The system of any one of Examples 25 to 28, wherein the dynamic temperature profile comprises a first temperature during a first time period in which the rotor spins at a first rotation speed, and a second temperature during a second time period in which the rotor spins at a second rotation speed.
30. The system of Example 29, wherein the second temperature is lower than the first temperature, and the second rotation speed is higher than the first rotation speed.
31 The system of Example 29 or 30, wherein the first time period occurs before the second time period.
32. The system of any one of Examples 25 to 31, wherein the dynamic temperature profile comprises an increasing or decreasing temperature profile.
33. The system of any one of Examples 25 to 32, wherein the actuator is configured to vary a rotation speed of the rotor in coordination with the dynamic temperature profile.
34. The system of any one of Examples 25 to 33, further comprising a sensor configured to monitor a cleaning status of the plurality of additive manufactured objects, wherein the dynamic temperature profile is adjusted based on the cleaning status.
35 The system of any one of Examples 25 to 34, wherein the temperature management mechanism comprises a heat source configured to heat the excess material to decrease the viscosity thereof.
36. The system of Example 35, wherein the heat source comprises one or more of the following: an infrared radiation source, a heated fluid, a heated gas, a heat sink, a heating plate, or a heat exchanger.
37. The system of Example 35, wherein the heat source is configured to produce heat from braking of the rotor.
38. The system of Example 35 or 36, wherein the temperature management mechanism comprises at least one reflector configured to direct heat toward the plurality of additively manufactured objects.
39 The system of any one of Examples 25 to 38, wherein the temperature management mechanism comprises a cooling device configured to cool the plurality of additively manufactured objects to increase the stiffness thereof.
40. The system of Example 39, wherein the cooling device comprises a thermoelectric cooler, a cold plate, a cold gas, or a cold fluid.
41. The system of any one of Examples 25 to 40, wherein the rotor is configured to rotate the plurality of additively manufactured objects around at least two different axes of rotation.
42 The system of any one of Examples 25 to 41, wherein the rotor includes a plurality of arms, each arm having a mounting structure configured to carry a subset of the additively manufactured objects.
43 The system of Example 42, wherein the rotor is rotatable around a first axis of rotation, and the mounting structure is rotatable around a second axis of rotation.
44. The system of Example 42 or 43, wherein the mounting structure comprises a gimbal assembly.
45. The system of any one of Examples 42 to 44, wherein the mounting structure comprises a rotatable drum.
46. The system of any one of Examples 25 to 45, further comprising a radiation source configured to at least partially cure the plurality of additively manufactured objects.
47. The system of any one of Examples 25 to 46, further comprising a material source configured to apply a material to the plurality of additively manufactured objects.
48. The system of Example 47, wherein the material comprises a wash fluid.
49. The system of Example 47 or 48, wherein the material comprises a coating.
50. The system of any one of Examples 25 to 49, further comprising a collection device configured to collect at least some of the excess material removed from the plurality of additively manufactured objects.
51 The system of Example 50, wherein the collection device comprises an absorbent lining.
52. The system of any one of Examples 25 to 51, wherein the plurality of additively manufactured objects are produced by an additive manufacturing device, and further comprising a robotic assembly configured to transfer the plurality of additively manufactured objects from the additive manufacturing device to the rotor.
53. The system of Example 52, further comprising a second robotic assembly configured to transfer the plurality of additively manufactured objects from the rotor to another location for additional processing.

54. A non-transitory computer-readable storage medium comprising instructions that, when executed by one or more processors of a computing system, cause the computing system to perform operations comprising:
receiving an indication that a plurality of additively manufactured objects having excess material thereon are loaded on a rotor;
actuating the rotor to rotate the plurality of additively manufactured objects to remove the excess material from the plurality of additively manufactured objects; and
adjusting an environmental temperature while the plurality of additively manufactured objects are being rotated, wherein the adjustment facilitates removal of the excess material from the plurality of additively manufactured objects by one or more of (a) decreasing a viscosity of the excess material or (b) increasing a stiffness of the plurality of additively manufactured objects.

55. A method comprising:
receiving a plurality of additively manufactured objects on a rotor, wherein the plurality of additively manufactured objects have excess material thereon;
removing the excess material from the plurality of additively manufactured objects by rotating the plurality of additively manufactured objects via the rotor; and
applying energy to the plurality of additively manufactured objects to cure a portion of each additively manufactured object while the plurality of additively manufactured objects are on the rotor.

56. The method of Example 55, wherein the plurality of additively manufactured objects comprise a partially cured polymeric resin, and the excess material comprises uncured polymeric resin.

57. The method of Example 56, wherein the uncured polymeric resin comprises a viscosity of at least 15 Pa-s at 20° C.

58. The method of Example 56 or 57, wherein the energy applied by the energy source is configured to fully cure the partially cured polymeric resin.

59. The method of any one of Examples 55 to 58, wherein the energy cures the entirety of each additively manufactured object.

60. The method of any one of Examples 55 to 58, wherein the energy selectively cures the portion of each additively manufactured object while leaving a remaining portion of each additively manufactured object in a partially cured or uncured state.

61 The method of Example 60, wherein the portion and the remaining portion of each additively manufactured object comprise different materials, and the energy comprises a wavelength configured to selectively target the material of the portion of each additively manufactured object.

62 The method of Example 60 or 61, wherein the portion and the remaining portion of each additively manufactured object comprise different thermal conductivities, such that the energy preferentially heats the portion of each additively manufactured object.

63. The method of any one of Examples 60 to 62, wherein the energy is applied via an energy source, and the portion of each additively manufactured object is located closer to the energy source than the remaining portion of each manufactured object.

64. The method of any one of Examples 60 to 63, wherein the selectively cured portion of each additively manufactured object is more brittle than the remaining portion of each additively manufactured object.

65. The method of Example 64, further comprising rotating the plurality of additively manufactured objects after the energy is applied to at least partially fracture the selectively cured portion of each additively manufactured object.

66. The method of any one of Examples 60 to 65, wherein:
each additively manufactured object comprises a sacrificial section coupled to a functional section,
the selectively cured portion of each additively manufactured object comprises the sacrificial section, and
the remaining portion of each additively manufactured object comprises the functional section.

67 The method of any one of Examples 55 to 66, wherein the energy comprises one or more of the following: microwave radiation, infrared radiation, visible radiation, or ultraviolet radiation.

68. The method of any one of Examples 55 to 67, further comprising:
receiving sensor data indicative of a curing status of the plurality of additively manufactured objects; and
adjusting the energy applied to the plurality of additively manufactured objects based on the curing status.

69. The method of any one of Examples 55 to 68, wherein the plurality of additively manufactured objects are rotated at a first rotation speed to remove the excess material, and further comprising rotating the plurality of additively manufactured objects at a second rotation speed while applying the energy to the plurality of additively manufactured objects.

70. The method of Example 69, wherein the second rotation speed is slower than the first rotation speed.

71. The method of any one of Examples 55 to 70, wherein the plurality of additively manufactured objects are rotated around two or more axes of rotation.

72. The method of any one of Examples 55 to 71, further comprising:
immersing the plurality of additively manufactured objects in a liquid, and
rotating the plurality of additively manufactured objects while immersed in the liquid.

73 The method of any one of Examples 55 to 72, further comprising applying a material to the plurality of additively manufactured objects.

74. The method of any one of Examples 55 to 73, further comprising collecting at least some of the excess material removed from the plurality of additively manufactured objects.

75. The method of Example 74, further comprising reusing the collected excess material in a subsequent additive manufacturing process.

76. The method of any one of Examples 55 to 75, further comprising transferring the plurality of additively manufactured objects to another location for additional processing.

77. The method of any one of Examples 55 to 76, wherein the plurality of additively manufactured objects are produced by a stereolithography process.

78. The method of any one of Examples 55 to 77, wherein the plurality of additively manufactured objects comprises a plurality of orthodontic appliances.

79. The method of Example 78, wherein the plurality of orthodontic appliances are configured to reposition a patient's teeth from an initial arrangement toward a target arrangement.

80. The method of Example 79, wherein the plurality of orthodontic appliances are manufactured based on a digital treatment plan representing a series of tooth arrangements for repositioning the patient's teeth from the initial arrangement toward the target arrangement.

81. A system for processing additively manufactured objects, the system comprising:
a rotor configured to support a plurality of additively manufactured objects having excess material thereon;
an actuator configured to spin the rotor so as to remove the excess material from the plurality of additively manufactured objects; and
an energy source configured to apply energy to the plurality of additively manufactured objects to selectively alter a material property of a portion of each additively manufactured object.

82. The system of Example 81, wherein the plurality of additively manufactured objects are produced by a stereolithography process.

83. The system of Example 81 or 82, wherein the plurality of additively manufactured objects comprise a partially cured polymeric resin, and the excess material comprises uncured polymeric resin.

84. The system of Example 83, wherein the uncured polymeric resin comprises a viscosity of at least 15 Pa-s at 20° C.

85. The system of Example 83 or 84, wherein the energy applied by the energy source is configured to fully cure the partially cured polymeric resin.

86. The system of any one of Examples 81 to 85, wherein the energy source is configured to selectively cure the portion of each additively manufactured object while leaving a remaining portion of each additively manufactured object in a partially cured or uncured state.

87. The system of Example 86, wherein the cured portion of each additively manufactured object is more brittle than the remaining portion of each additively manufactured object.

88. The system of Example 86 or 87, wherein:
each additively manufactured object comprises a support structure coupled to a functional structure,
the cured portion of each additively manufactured object includes the support structure, and
the remaining portion of each additively manufactured object includes the functional structure.

89. The system of Example 88, wherein the functional structure comprises an orthodontic appliance.

90. The system of any one of Examples 81 to 89, wherein the energy source comprises a radiation source.

91. The system of Example 90, wherein the radiation source is configured to emit one or more of the following: microwave radiation, infrared radiation, visible radiation, or ultraviolet radiation.

92. The system of Example 90 or 91, further comprising at least one reflector configured to direct the radiation toward the plurality of additively manufactured objects.

93. The system of any one of Examples 90 to 92, wherein:
the portion of each additively manufactured object comprises a first material,
a remaining portion of each additively manufactured object comprises a second material, and
the radiation source is configured to produce radiation comprising a wavelength that selectively targets the first material.

94. The system of any one of Examples 81 to 93, wherein the energy source comprises a heat source.

95. The system of Example 94, wherein the heat source comprises one or more of the following: an infrared radiation source, a heat sink, a heating plate, a heated gas, or a heated fluid.

96. The system of Example 94 or 95, wherein the heat source is configured to produce heat from braking of the rotor.

97. The system of any one of Examples 94 to 96, wherein:
the portion of each additively manufactured object comprises a first material, and
a remaining portion of each additively manufactured object comprises a second material, the second material comprising a lower thermal conductivity than the first material.

98. The system of any one of Examples 94 to 97, wherein each additively manufactured object comprises a thermal insulator separating the portion from a remaining portion of each additively manufactured object.

99 The system of any one of Examples 81 to 98, further comprising a sensor configured to monitor a curing status of the plurality of additively manufactured objects, wherein the energy applied by the energy source is adjusted based on the curing status.

100. The system of any one of Examples 81 to 99, wherein the rotor is configured to rotate the plurality of additively manufactured objects around at least two different axes of rotation.

101. The system of any one of Examples 81 to 100, wherein the rotor comprises a plurality of arms, each arm having a mounting structure configured to carry a subset of the additively manufactured objects.

102. The system of Example 101, wherein the rotor is rotatable around a first axis of rotation, and the mounting structure is rotatable around a second axis of rotation.

103. The system of Example 101 or 102, wherein the mounting structure comprises a gimbal assembly.

104. The system of Example 101 or 102, wherein the mounting structure comprises a rotatable drum.

105. The system of any one of Examples 81 to 104, further comprising a material source configured to apply a material to the plurality of additively manufactured objects.

106. The system of any one of Examples 81 to 105, further comprising a collection device configured to collect at least some of the excess material removed from the plurality of additively manufactured objects.

107. The system of any one of Examples 81 to 106, wherein the plurality of additively manufactured objects are produced by an additive manufacturing device, and further comprising a robotic assembly configured to transfer the plurality of additively manufactured objects from the additive manufacturing device to the rotor.

108. The system of Example 107, further comprising a second robotic assembly configured to transfer the plurality of additively manufactured objects from the rotor to another location for additional processing.

109. A non-transitory computer-readable storage medium comprising instructions that, when executed by one or more processors of a computing system, cause the computing system to perform operations comprising:

receiving an indication that a plurality of additively manufactured objects having excess material thereon are loaded on a rotor;

actuating the rotor to rotate the plurality of additively manufactured objects to remove the excess material from the plurality of additively manufactured objects; and applying energy to the plurality of additively manufactured objects while the plurality of additively manufactured objects are being rotated to selectively alter a material property of a portion of each additively manufactured object.

110. A method comprising:

receiving a plurality of additively manufactured objects having excess material thereon;

removing the excess material from the plurality of additively manufactured objects by rotating the plurality of additively manufactured objects;

receiving sensor data indicative of a cleaning status of the plurality of additively manufactured objects; and adjusting, based on the sensor data, an operational parameter that enhances removal of the excess material from the plurality of additively manufactured objects.

111. The method of Example 110, wherein the plurality of additively manufactured objects comprise a partially cured polymeric resin, and the excess material comprises uncured polymeric resin.

112. The method of Example 111, wherein the uncured polymeric resin has a viscosity of at least 15 Pa-s at 20° C.

113. The method of any one of Examples 110 to 112, wherein the sensor data is generated by one or more of the following: an optical sensor, a force sensor, a weight sensor, an ultrasonic sensor, a temperature sensor, a radiation sensor, or a chemical sensor.

114. The method of any one of Examples 110 to 113, wherein the sensor data is indicative of an amount of the excess material removed from the plurality of additively manufactured objects.

115. The method of any one of Examples 110 to 114, wherein the sensor data is indicative of an amount of the excess material remaining on the plurality of additively manufactured objects.

116. The method of any one of Examples 110 to 115, wherein the sensor data comprises image data of the plurality of additively manufactured objects.

117. The method of Example 116, further comprising comparing the image data to reference image data to determine the cleaning status of the plurality of additively manufactured objects.

118. The method of any one of Examples 110 to 117, further comprising collecting at least some of the excess material removed from the plurality of additively manufactured objects.

119. The method of Example 118, wherein the sensor data comprises a measurement of an amount of the collected excess material.

120. The method of Example 118 or 119, further comprising reusing the collected excess material in a subsequent additive manufacturing process.

121. The method of any one of Examples 110 to 120, wherein the operational parameter comprises one or more of the following: a rotation speed of the rotor, a rotation direction of the rotor, a rotation duration of the rotor, or a number of rotation cycles of the rotor.

122. The method of any one of Examples 110 to 121, wherein the rotor comprises a plurality of adjustable mounting structures, each adjustable mounting structure supporting a subset of the additively manufactured objects, and the operational parameter comprises a position of the adjustable mounting structure.

123. The method of any one of Examples 110 to 122, wherein the operational parameter comprises an environmental temperature.

124. The method of any one of Examples 110 to 123, further comprising applying energy to the plurality of additively manufactured objects to cure at least a portion thereof.

125. The method of Example 124, further comprising:

receiving second sensor data indicative of a curing status of the plurality of additively manufactured objects; and adjusting, based on the second sensor data, a second operational parameter that enhances curing of the plurality of additively manufactured objects.

126. The method of Example 125, wherein the second operational parameter comprises one or more of the following: a rotation speed of the rotor, a rotation direction of the rotor, a rotation duration of the rotor, or a number of rotation cycles of the rotor, an environmental temperature, or an energy output of the energy source.

127. The method of any one of Examples 110 to 126, wherein the plurality of additively manufactured objects are rotated around two or more axes of rotation.

128. The method of any one of Examples 110 to 127, further comprising applying a material to the plurality of additively manufactured objects.

129. The method of any one of Examples 110 to 128, further comprising transferring the plurality of additively manufactured objects to another location for additional processing.

130. The method of any one of Examples 110 to 129, wherein the plurality of additively manufactured objects are produced by a stereolithography process.

131. The method of any one of Examples 110 to 130, wherein the plurality of additively manufactured objects comprises a plurality of orthodontic appliances.

132. The method of Example 131, wherein the plurality of orthodontic appliances are configured to reposition a patient's teeth from an initial arrangement toward a target arrangement.

133. The method of Example 132, wherein the plurality of orthodontic appliances are manufactured based on a digital treatment plan representing a series of tooth arrangements for repositioning the patient's teeth from the initial arrangement toward the target arrangement.

134. A system for processing additively manufactured objects, the system comprising:

a rotor configured to support a plurality of additively manufactured objects having excess material thereon;

an actuator configured to spin the rotor so as to remove the excess material from the plurality of additively manufactured objects;

one or more sensors configured to generate sensor data indicative of a cleaning status of the plurality of additively manufactured objects; and a controller operably coupled to the one or more sensors and configured to adjust, based on the sensor data, an operational parameter that enhances removal of the excess material from the plurality of additively manufactured objects.
135. The system of Example 134, wherein the plurality of additively manufactured objects are produced by a stereolithography process.
136. The system of Example 134 or 135, wherein the plurality of additively manufactured objects comprise a partially cured polymeric resin, and the excess material comprises uncured polymeric resin.
137. The system of Example 136, wherein the uncured polymeric resin comprises a viscosity of at least 15 Pa-s at 20° C.
138. The system of any one of Examples 134 to 137, wherein the one or more sensors comprise at least one sensor configured to measure an amount of the excess material removed from the plurality of additively manufactured objects.
139. The system of any one of Examples 134 to 138, wherein the one or more sensors comprise at least one sensor configured to measure an amount of the excess material remaining on the plurality of additively manufactured objects.
140. The system of any one of Examples 134 to 139, wherein the one or more sensors comprise one or more of the following: an optical sensor, a force sensor, a weight sensor, an ultrasonic sensor, a temperature sensor, a radiation sensor, or a chemical sensor.
141. The system of any one of Examples 134 to 140, wherein the one or more sensors comprise at least one sensor configured to generate image data of the plurality of additively manufactured objects.
142. The system of Example 141, wherein the controller is configured to compare the image data to reference image data to determine the cleaning status of the plurality of additively manufactured objects.
143. The system of any one of Examples 134 to 142, further comprising a collection device configured to collect at least some of the excess material removed from the plurality of additively manufactured objects.
144. The system of Example 143, wherein the one or more sensors comprise at least one sensor configured to measure an amount of excess material collected by the collection device.
145. The system of any one of Examples 134 to 144, wherein the operational parameter comprises one or more of the following: a rotation speed of the rotor, a rotation direction of the rotor, a rotation duration of the rotor, or a number of rotation cycles of the rotor.
146. The system of any one of Examples 134 to 145, wherein the rotor comprises a plurality of adjustable mounting structures, each adjustable mounting structure supporting a subset of the additively manufactured objects, and the operational parameter comprises a position of the adjustable mounting structure.
147. The system of any one of Examples 134 to 146, wherein the operational parameter comprises an environmental temperature.
148. The system of Example 147, further comprising a heat source, wherein the controller is configured to adjust the environmental temperature by controlling a heat output of the heat source.
149. The system of Example 147 or 148, further comprising a cooling device, wherein the controller is configured to adjust the environmental temperature by controlling a cooling output of the cooling device.
150. The system of any one of Examples 134 to 149, further comprising an energy source configured to apply energy to the plurality of additively manufactured objects to cure at least a portion thereof.
151. The system of Example 150, further comprising one or more second sensors configured to generate second sensor data indicative of a curing status of the plurality of additively manufactured objects.
152. The system of Example 151, wherein the one or more second sensors comprise one or more of the following: an optical sensor, an ultrasonic sensor, a temperature sensor, or a radiation sensor.
153. The system of Example 151 or 152, wherein the controller is configured to adjust, based on the second sensor data, a second operational parameter that enhances curing of the plurality of additively manufactured objects.
154. The system of Example 153, wherein the second operational parameter comprises one or more of the following: a rotation speed of the rotor, a rotation direction of the rotor, a rotation duration of the rotor, or a number of rotation cycles of the rotor, an environmental temperature, or an energy output of the energy source.
155. The system of any one of Examples 134 to 154, wherein the rotor is configured to rotate the plurality of additively manufactured objects around at least two different axes of rotation.
156. The system of any one of Examples 134 to 155, wherein the rotor comprises a plurality of arms, each arm comprising a mounting structure carrying a subset of the additively manufactured objects.
157. The system of Example 156, wherein the mounting structure comprises a gimbal assembly.
158. The system of Example 156 or 157, wherein the mounting structure comprises a rotatable drum.
159. The system of any one of Examples 134 to 158, further comprising a material source configured to apply a material to the plurality of additively manufactured objects.
160. The system of any one of Examples 134 to 159, wherein the plurality of additively manufactured objects are produced by an additive manufacturing device, and further comprising a robotic assembly configured to transfer the plurality of additively manufactured objects from the additive manufacturing device to the rotor.
161. The system of Example 160, further comprising a second robotic assembly configured to transfer the plurality of additively manufactured objects from the rotor to another location for additional processing.
162. A non-transitory computer-readable storage medium comprising instructions that, when executed by one or more processors of a computing system, cause the computing system to perform operations comprising:
receiving an indication that a plurality of additively manufactured objects having excess material thereon are loaded on a rotor;
actuating the rotor to rotate the plurality of additively manufactured objects to remove the excess material from the plurality of additively manufactured objects;
receiving sensor data indicative of a cleaning status of the plurality of additively manufactured objects; and adjusting, based on the sensor data, an operational parameter that enhances removal of the excess material from the plurality of additively manufactured objects.

163. A system for processing additively manufactured objects, the system comprising:
a plurality of containers configured to receive a plurality of additively manufactured object having excess material thereon;
a rotor comprising a central shaft and a plurality of arms, each arm comprising a first end and a second end opposite the first end, wherein the first end of each arm is coupled to the central shaft and a second end of each arm is coupled to a respective container of the plurality of containers;
an actuator configured to spin the rotor so as to remove the excess material from the plurality of additively manufactured objects; and
at least one heat source carried on the rotor, wherein the at least heat source is configured to heat the excess material to decrease a viscosity thereof.

164. The system of Example 163, wherein the plurality of additively manufactured objects comprise a partially cured polymeric resin, and the excess material comprises uncured polymeric resin.

165. The system of Example 164, wherein the uncured polymeric resin comprises a viscosity of at least 15 Pa-s at 20° C.

166. The system of any one of Examples 163 to 165, wherein the plurality of containers comprise a plurality of boxes.

167. The system of any one of Examples 163 to 166, wherein each container is coupled to the second end of the corresponding arm via a mounting structure.

168. The system of Example 167, wherein each container is at a fixed angle relative to the corresponding mounting structure.

169. The system of Example 167 or 168, wherein the mounting structure is not orthogonal to the corresponding arm.

170. The system of any one of Examples 163 to 169, wherein each container is configured to receive a build platform supporting a subset of the plurality of additively manufactured objects.

171. The system of Example 170, wherein the build platform is supported within the container by brackets.

172. The system of any one of Examples 163 to 171, wherein the at least one heat source comprises a plurality of heat sources.

173. The system of Example 172, wherein each heat source is coupled to a respective arm of the plurality of arms via a mounting structure.

174. The system of Example 172 or 173, wherein each heat source is configured to provide localized heating to a subset of the plurality of additively manufactured objects.

175. The system of any one of Examples 163 to 174, wherein the at least one heat source is configured to heat the excess material to a temperature of at least 50° C.

176. The system of any one of Examples 163 to 175, wherein the temperature is below a post-curing temperature of the plurality of additively manufactured objects.

177. The system of any one of Examples 163 to 176, wherein the at least one heat source is configured to heat the excess material while the actuator spins the rotor.

178. The system of any one of Examples 163 to 177, wherein the rotor is configured to rotate the plurality of additively manufactured objects around at least two different axes of rotation.

179. The system of any one of Examples 163 to 178, further comprising a collection device configured to collect at least some of the excess material removed from the plurality of additively manufactured objects.

180. The system of Example 179, wherein the collection device comprises the plurality of containers.

181. The system of any one of Examples 163 to 180, further comprising at least one temperature sensor configured to monitor a temperature of the plurality of additively manufactured objects.

182. The system of any one of Examples 163 to 181, wherein the plurality of additively manufactured objects comprise a plurality of orthodontic appliances.

CONCLUSION

Although many of the embodiments are described above with respect to systems, devices, and methods for post-processing additively manufactured objects, the technology is applicable to other applications and/or other approaches, such as post-processing objects fabricated by subtractive manufacturing or other manufacturing techniques. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-29.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

To the extent any materials incorporated herein by reference conflict with the present disclosure, the present disclosure controls.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A system for processing additively manufactured objects, the system comprising:
   a rotor configured to support a plurality of additively manufactured objects having excess material thereon;
   an actuator configured to spin the rotor;
   an energy source configured to output energy; and
   a controller configured to:
      cause the actuator to spin the rotor to remove the excess material from the plurality of additively manufactured objects, and
      cause the energy source to apply the energy to a selected portion of each of the plurality of additively manufactured objects to alter a material property of the selected portion from a first state to a second state while leaving a material property in a remaining portion of each of the plurality of additively manufactured objects in the first state, wherein the energy is applied while the plurality of additively manufactured objects are on the rotor.

2. The system of claim 1, wherein the plurality of additively manufactured objects comprise a partially cured polymeric resin, and the excess material comprises uncured polymeric resin.

3. The system of claim 2, wherein the uncured polymeric resin has a viscosity of at least 15 Pa-s at 20° C.

4. The system of claim 2, wherein the energy applied by the energy source is configured to increase a degree of curing of the partially cured polymeric resin.

5. The system of claim 1, wherein the first state comprises a partially cured or uncured state, and wherein the second state comprises a cured state.

6. The system of claim 1, wherein the energy source comprises a radiation source configured to produce radiation.

7. The system of claim 6, wherein the radiation source is configured to emit one or more of the following: microwave radiation, infrared radiation, visible radiation, or ultraviolet radiation.

8. The system of claim 6, further comprising at least one reflector configured to direct the radiation toward the plurality of additively manufactured objects.

9. The system of claim 6, wherein:
   the selected portion of each of the plurality of additively manufactured objects comprises a first material,
   the remaining portion of each of the plurality of additively manufactured objects comprises a second material, and
   the radiation produced by the radiation source comprises a wavelength that selectively targets the first material.

10. The system of claim 1, wherein the energy source comprises a heat source.

11. The system of claim 10, wherein the heat source comprises one or more of the following: an infrared radiation source, a heat sink, a heating plate, a heated gas, or a heated fluid.

12. The system of claim 10, wherein the heat source is configured to produce heat from braking of the rotor.

13. The system of claim 10, wherein:
   the selected portion of each of the plurality of additively manufactured objects comprises a first material, and
   the remaining portion of each of the plurality of additively manufactured objects comprises a second material, the second material comprising a lower thermal conductivity than the first material.

14. The system of claim 10, wherein each of the plurality of additively manufactured objects comprises a thermal insulator separating the selected portion from the remaining portion of each of the plurality of additively manufactured objects.

15. The system of claim 1, further comprising a sensor configured to monitor a curing status of the plurality of additively manufactured objects, wherein the energy applied by the energy source is adjusted based on the curing status.

16. The system of claim 1, wherein the rotor is configured to rotate the plurality of additively manufactured objects around at least two different axes of rotation.

17. The system of claim 1, wherein the rotor comprises a plurality of arms, each arm having a mounting structure configured to carry a subset of the additively manufactured objects.

18. The system of claim 17, wherein the rotor is rotatable around a first axis of rotation, and the mounting structure is rotatable around a second axis of rotation.

19. The system of claim 1, further comprising a material source configured to apply a material to the plurality of additively manufactured objects.

20. The system of claim 1, further comprising a collection device configured to collect at least some of the excess material removed from the plurality of additively manufactured objects.

21. A system for processing a plurality of additively manufactured objects, the system comprising:
- a controller;
- an energy source coupled to the controller, wherein the energy source is operative to apply energy in response to instructions from the controller, and wherein the instructions cause the energy source to apply the energy to a selected portion of each of the plurality of additively manufactured objects to alter a material property of the selected portion from a first state to a second state while leaving the material property in a remaining portion of each of the plurality of additively manufactured objects in the first state;
- an actuator coupled to the controller, wherein the actuator is operative to deliver mechanical energy in response to a drive signal from the controller; and
- a rotor coupled to the actuator, wherein the rotor comprises one or more mounting structures shaped to mount the plurality of additively manufactured objects thereon, and wherein the rotor is operative to rotate about an axis of rotation in response to the mechanical energy from the actuator, thereby removing excess material from the plurality of additively manufactured objects,
- wherein the energy is applied while the plurality of additively manufactured objects are on the rotor.

22. The system of claim 21, wherein the energy comprises curing radiation.

23. The system of claim 21, wherein the energy comprises thermal or light energy.

24. The system of claim 21, wherein the axis of rotation is parallel to a base of the one or more mounting structures.

25. The system of claim 21, wherein the drive signal comprises a plurality of pulses.

26. The system of claim 21, wherein the excess material comprises uncured resin.

27. A system for processing a plurality of additively manufactured objects, the system comprising:
- a controller;
- an energy source coupled to the controller, wherein the energy source is operative to apply energy in response to instructions from the controller, and wherein the instructions cause the energy source to apply the energy to a selected portion of each of the plurality of additively manufactured objects to alter a material property of the selected portion from a first state to a second state while leaving the material property in a remaining portion of each of the plurality of additively manufactured objects in the first state;
- an actuator coupled to the controller, wherein the actuator is operative to deliver mechanical energy in response to a drive signal from the controller;
- one or more mounting structures shaped to mount the plurality of additively manufactured objects thereon; and
- means for rotating the one or mounting structures about an axis of rotation in response to the mechanical energy from the actuator, thereby removing excess material from the plurality of additively manufactured objects,
- wherein the energy is applied while the plurality of additively manufactured objects are on the one or more mounting structures.

* * * * *

UNITED STATES PATENT AND TRADEMARK OFFICE
CERTIFICATE OF CORRECTION

| | | |
|---|---|---|
| PATENT NO. | : 12,350,885 B2 | Page 1 of 1 |
| APPLICATION NO. | : 18/593534 | |
| DATED | : July 8, 2025 | |
| INVENTOR(S) | : Viswanath Meenakshisundaram et al. | |

It is certified that error appears in the above-identified patent and that said Letters Patent is hereby corrected as shown below:

In the Claims

In Column 66, in Claim 27, Line 25, delete "one or" and insert -- one or more --, therefor.

Signed and Sealed this
Sixth Day of January, 2026

John A. Squires
*Director of the United States Patent and Trademark Office*